(12) United States Patent
Mistry

(10) Patent No.: US 10,846,598 B2
(45) Date of Patent: Nov. 24, 2020

(54) PATTERN MATCHING

(71) Applicant: British Telecommunications Public Limited Company, London (GB)

(72) Inventor: James Mistry, London (GB)

(73) Assignee: British Telecommunications Public Limited Company, London (GB)

( * ) Notice: Subject to any disclaimer, the term of this patent is extended or adjusted under 35 U.S.C. 154(b) by 735 days.

(21) Appl. No.: 15/512,319

(22) PCT Filed: Sep. 22, 2015

(86) PCT No.: PCT/EP2015/071784
§ 371 (c)(1),
(2) Date: Mar. 17, 2017

(87) PCT Pub. No.: WO2016/046232
PCT Pub. Date: Mar. 31, 2016

(65) Prior Publication Data
US 2017/0278001 A1    Sep. 28, 2017

(30) Foreign Application Priority Data

Sep. 26, 2014   (EP) .................................... 14275201

(51) Int. Cl.
*G06N 5/00*     (2006.01)
*G06N 5/02*     (2006.01)
*G06F 16/903*   (2019.01)

(52) U.S. Cl.
CPC ....... *G06N 5/022* (2013.01); *G06F 16/90344* (2019.01)

(58) Field of Classification Search
CPC ................................................ G06F 16/90344
See application file for complete search history.

(56) References Cited

U.S. PATENT DOCUMENTS 6,424,983 B1    7/2002  Schabes
8,516,456 B1 *  8/2013  Starovoitov ............ G06F 8/427
                                                   717/141

(Continued)

OTHER PUBLICATIONS

International Search Report for corresponding International Application No. PCT/EP2015/071784 dated Nov. 20, 2015; 4 pages.

(Continued)

*Primary Examiner* — Grace Park
(74) *Attorney, Agent, or Firm* — Patterson Thuente Pedersen, P.A.

(57) ABSTRACT

A computer implemented method to determine whether a verification is to be performed of the satisfaction of one or more mapping conditions mapping a first state in a first pattern matching automaton to a second state in the first automaton, the verification being based on patterns matched by a second pattern matching automaton having states corresponding to wildcard symbols in the first automaton, the method comprising: associating, with the first state, a minimum number of patterns required to be matched by the second automaton to satisfy a mapping condition of the state; providing a pattern match counter in association with the second automaton, the counter being arranged to count a number of patterns matched by the second automaton; providing a verifier in association with the first automaton, the verifier being arranged to perform the verification, the verifier being responsive to the counter.

13 Claims, 24 Drawing Sheets

(56) References Cited

U.S. PATENT DOCUMENTS

| | | | |
|---|---|---|---|
| 8,572,106 | B1 | 10/2013 | Estan |
| 9,330,344 | B2 | 5/2016 | Orchard et al. |
| 9,652,529 | B1 | 5/2017 | Elbaz |
| 2003/0135361 | A1 | 7/2003 | Glushnev |
| 2005/0012521 | A1* | 1/2005 | Sharangpani ..... G06F 16/90344 326/46 |
| 2005/0027513 | A1 | 2/2005 | Kanno |
| 2007/0192863 | A1 | 8/2007 | Kapoor |
| 2008/0071757 | A1* | 3/2008 | Ichiriu .................. G06F 16/951 |
| 2008/0162111 | A1 | 7/2008 | Bangalore |
| 2008/0208854 | A1 | 8/2008 | Badr |
| 2008/0263665 | A1 | 10/2008 | Ma et al. |
| 2009/0207433 | A1 | 8/2009 | Wang |
| 2013/0041921 | A1* | 2/2013 | Cooper ............... G06F 16/3338 707/780 |
| 2014/0067370 | A1 | 3/2014 | Brun |
| 2015/0067836 | A1* | 3/2015 | Billa ................. G06F 16/90344 726/22 |
| 2015/0310014 | A1 | 10/2015 | Yishay |
| 2017/0277811 | A1 | 9/2017 | Mistry |
| 2017/0293612 | A1 | 10/2017 | Mistry |

OTHER PUBLICATIONS

Written Opinion of the International Searching Authority for corresponding International Application No. PCT/EP2015/071784 dated Nov. 20, 2015; 6 pages.
International Search Report for related International Application No. PCT/EP2015/071774 dated Nov. 20, 2015; 4 pages.
Written Opinion of the International Searching Authority for related International Application No. PCT/EP2015/071774 dated Nov. 20, 2015; 7 pages.
International Search Report for related International Application No. PCT/EP2015/071786 dated Nov. 20, 2015; 4 pages.
Written Opinion of the International Searching Authority for related International Application No. PCT/EP2015/071786 dated Nov. 20, 2015; 6 pages.
Aho et al., "Efficient string matching: An aid to bibliographic search, Programming Techniques," Communications of the ACM (Jun. 1975) vol. 18, No. 6; 8 pages.
Becchi et al., "Extending finite automata to efficiently match perl-compatible regular expressions," Proceedings of the ACM CoNEXT Conference, Dec. 9-12, 2008, Madrid, Spain; 12 pages. XP055166971.
Berlin, Gary J., "A direct method for string to deterministic finite automaton conversion for fast text searching (U)," Westinghouse Computer Symposium, Oct. 21-22, 1991, Pittsburgh, PA; 22 pages. XP055110972. Retrieved online at http://www.osti.gov/scitech/servlets/purl/10131540.
Meiners et al., "Fast regular expression matching using small TCAMs for network intrusion detection and prevention systems," Oct. 11, 2010; 16 pages. XP055110966. Retrieved online at http://www.usenix.org/legacy/event/sec10/tech/full_papers/Meiners/pdf.
Papakonstantinou et al., "QURSED: Querying and reporting semistructured data," Proceedings of the 2002 ACM SIGMOD International Conference on Management of Data, Jun. 4-6, 2002, Madison, WI; 12 pages.
U.S. Appl. No. 15/512,230, filed Mar. 17, 2017, Inventor: Mistry.
U.S. Appl. No. 15/512,353, filed Mar. 17, 2017, Inventor: Mistry.

\* cited by examiner

FIGURE 18a

| | |
|---|---|
| 1: Find_Failure_States ( '0', 'a.c' ) (i.e. n=3) | Globals<br>failure_state = {}<br>stack = {} |
| (5) transitionStates = find_transition_states('0', 'a') =<br>                                                    {{'a','5'}}<br>(6) is false since transitionStates = {{'a','5'}}<br>(9) for state$_T$='5'; T='a':<br>    (11) is false since $a_1$='a'<br>    (12) is false since n=3<br>    (17) Find_Failure_States( '5', '.c') (*recurse to 1.1*)<br><br>    (18) is false since $a_1$='a'<br>(19) end-loop<br>(21) return (end) | <br><br><br><br><br><br><br><br>failure_state =<br>  { ('9', {'b'}, 0), ('8', {'.'}, 0) } |

FIGURE 18b

| | |
|---|---|
| 1.1: Find_Failure_States ( '5', '.c' ) (i.e. n=2) | Globals<br>failure_state = {}<br>stack = {} |
| (5) transitionStates = find_transition_states('5', '.') =<br>                                            {{'b','6'},{'.','7'}}<br>(6) is false since transitionStates = {{'b','6'},{'.','7'}}<br>(9) for state$_T$='6'; T='b':<br>    (11) is true since $a_1$='.'; push 'b' to stack<br>    (12) is false since n=2<br>    (17) Find_Failure_States( '6', 'c') (*recurse to 1.1.1*)<br>    (18) is true since $a_1$='.'; pop stack<br>(9) for state$_T$='7'; T='.':<br>    (11) is true since $a_1$='.'; push '.' to stack<br>    (12) is false since n=2<br>    (17) Find_Failure_States( '7', 'c') (*recurse to 1.1.2*)<br><br>    (18) is true since $a_1$='.'; pop stack<br>(19) end-loop<br>(21) return (to 1) | <br><br><br><br>stack = {'b'}<br><br>failure_state = { ('9', {}, 0) }<br>stack = {}<br><br>stack = {'.'}<br><br>failure_state =<br>  { ('9', {'b'}, 3), ('8', {'.'}, 0) }<br>stack = {} |

FIGURE 18c

| 1.1.1: Find_Failure_States ( '6', 'c' ) (i.e. n=1) | Globals<br>failure_state = {}<br>stack = {'b'} |
|---|---|
| (5) transitionStates = find_transition_states('6', 'c') =<br>　　　　　　　　　　　　　　　　　　　　　{{'c','9'}}<br>(6) is false since transitionStates = {{'c','9'}}<br>(9) for $state_T$='9'; T='c':<br>　　　　(11) is false since $a_1$='c'<br>　　　　(12) is true since n=1<br>　　　　(14) output = 0 since $state_T.output$ = { }<br>　　　　(15) failure_set ∪= ('9', {'b'}, 0)<br>　　　　(18) is false since $a_1$='c'<br>(19) end-loop<br>(21) return (to 1.1) | failure_state = { ('9', {'b'}, 0) } |

FIGURE 18d

| 1.1.2: Find_Failure_States ( '7', 'c' ) (i.e. n=1) | Globals<br>failure_state = { ('9', {'b'}, 0) }<br>stack = {'.'} |
|---|---|
| (5) transitionStates = find_transition_states('7', 'c') =<br>　　　　　　　　　　　　　　　　　　　　　{{'c','8'}}<br>(6) is false since transitionStates = {{'c','8'}}<br>(9) for $state_T$='8'; T='c':<br>　　　　(11) is false since $a_1$='c'<br>　　　　(12) is true since n=1<br>　　　　(14) output = 0 since $state_T.output$ = { }<br>　　　　(15) failure_set ∪= ('8', {'.'}, 0)<br><br>　　　　(18) is false since $a_1$='c'<br>(19) end-loop<br>(21) return (to 1.1) | failure_state =<br>{ ('9', {'b'}, 0), ('8', {'.'}, 0) } |

PATTERN MATCHING

CROSS-REFERENCE TO RELATED APPLICATIONS

The present application is a National Phase entry of PCT Application No. PCT/EP2015/071784, filed on 22 Sep. 2015, which claims priority to EP Patent Application No. 14275201.3, filed on 26 Sep. 2014, which are hereby fully incorporated herein by reference.

TECHNICAL FIELD

The present disclosure relates to an improved pattern matching machine. In particular, it relates to an efficient pattern matching machine that accommodates indeterminate symbols in symbol patterns.

BACKGROUND

Pattern matching algorithms provide for the identification of locations of occurrences of one or more patterns of symbols, such as characters or tokens from a symbol alphabet, within a symbol sequence. A specific type of pattern matching is string matching whereby locations of occurrences of one or more strings are identified within a larger string. Pattern matching finds applications in text searching such as bibliographic searching, DNA and protein sequence analysis, data mining, security systems such as intrusion detection systems, anti-virus software and machine learning problems.

An approach to string matching is described by Alfred Aho and Margaret Corasick in their 1975 paper "Efficient String Matching: An Aid to Bibliographic Search". Known as the Aho-Corasick approach, the paper proposes a technique that involves the construction of a non-deterministic finite-state automaton as a pattern matching machine from search patterns (keywords). Each state of the automaton corresponds to a partial or complete sequence of symbols of a search pattern. The pattern matching machine is used to process a text string in a single pass to identify occurrences of search patterns in the text string. The Aho-Corasick approach employs a "goto" function and a "failure" function. The goto function maps a pair, consisting of a current state of an automaton and an input symbol from a text string, to a state or a "fail" condition. Thus the goto function effectively provides directed transitions between states in the automaton. The failure function is responsive to the fail condition of the goto function and maps a current state of the automaton to a new state. The new state is identified as a state of the automaton corresponding to a longest proper suffix of the pattern symbol sequence of the mapped state, where such a new state exists. If such a new state does not exist in the automaton, the failure function maps to a starting state of the automaton.

The Aho-Corasick algorithm provides for an approach to single-pass matching of multiple strings by providing the failure function for mapping states to appropriate new states in the event that the goto function returns fail. However, the Aho-Corasick approach is limited to determinate search patterns due to the dependence, by the failure function, on pattern suffixes to identify new states in the event of failure of the goto function. That is to say search patterns including non-determinate features, such as non-literal symbols including wildcard symbols, cannot be mapped to a new state on failure of the goto function due to the indeterminate nature of a wildcard symbol. Such wildcard symbols can potentially correspond to any symbol in a symbol alphabet (or subsets thereof), whereas the failure function of the Aho-Corasick algorithm is only effective for a determined proper suffix of symbols in a search pattern.

For example, search patterns embodied as expressions often include wildcard symbols, such as the '.' metacharacter. Such expressions are found in many and varied applications including regular expressions, data validation, data extraction and search functions. Any existing approach to applying the Aho-Corasick algorithm to expressions including wildcards involves pre-processing and post-processing steps. During pre-processing, all sub-patterns of an expression that do not include wildcards are identified. An Aho-Corasick automaton is generated for each of the identified sub-patterns for use to identify the sub-patterns in an input symbol sequence. Subsequently, post-processing is required to determine if occurrences of the sub-patterns in the input sequence correspond to occurrences at particular offsets in accordance with the original expression. The requirement to undertake such pre- and post-processing for expressions imposes an undesirable resource and time constraint for the application of the Aho-Corasick approach.

Another non-determinate feature that can be employed in search patterns is an iteration feature, such as the metacharacter (indicating 'zero or more') and the '+' metacharacter (indicating 'one or more'). For example, the symbol pattern 'ab*' corresponds to a symbol sequence including an 'a' symbol followed by any number of (zero or more) 'b' symbols. Notably, the number of 'b' symbols is potentially infinite. Due to the variable number of symbols matched by a pattern matching automaton which can change for, and within, an input symbol pattern, it is not known how to apply the Aho-Corasick approach of failure state mapping to symbol patterns including iterative metacharacters since symbol suffixes cannot be known at the time of generating the automaton.

Thus it is desirable to provide the benefits of the Aho-Corasick algorithm for pattern matching of expressions including wildcards without the aforementioned disadvantages.

SUMMARY

The present disclosure accordingly provides, in a first aspect, a computer implemented method to determine whether a verification is to be performed of the satisfaction of one or more mapping conditions mapping a first state in a first pattern matching automaton to a second state in the first automaton, the verification being based on patterns matched by a second pattern matching automaton having states corresponding to wildcard symbols in the first automaton, the method comprising: associating, with the first state, a minimum number of patterns required to be matched by the second automaton to satisfy a mapping condition of the state; providing a pattern match counter in association with the second automaton, the counter being arranged to count a number of patterns matched by the second automaton; providing a verifier in association with the first automaton, the verifier being arranged to perform the verification, the verifier being responsive to the counter.

In one embodiment, the first automaton has states and directed transitions between states, the directed transitions corresponding to symbols in a plurality of symbol patterns.

In one embodiment, the mapping conditions define when the first automaton should generate an output associated with a mapped state without transitioning to the mapped state.

In one embodiment, the mapping conditions define one or more failure states when the first automaton fails to transition via a directed transition based on an input symbol received by the first automaton.

In one embodiment, the first state represents a sequence of symbols including one or more wildcard symbols and the second state represents a proper suffix of the sequence of symbols of the first state, wherein the conditional mappings include conditions based on input symbols to be received, by the first automaton in use, to constitute the wildcard symbols.

In one embodiment, in execution, the first and second automata are jointly associated with a session identifier to identify a pattern matching session, the session identifier being changed whenever the first automaton transitions states by way of a mapping between states.

The present disclosure accordingly provides, in a second aspect, a pattern matching machine generator arranged to generate a first pattern matching automaton having one or more mapping conditions mapping a first state in a first automaton to a second state in the first automaton, the generator being further arranged to perform the steps of: generating a second pattern matching automaton having states corresponding to wildcard symbols in the first automaton; generating a verifier arranged to verify the satisfaction of the one or more mapping conditions; associating, with the first state, a minimum number of patterns required to be matched by the second automaton to satisfy a mapping condition of the state; providing a pattern match counter in association with the second automaton, the counter being arranged to count a number of patterns matched by the second automaton, wherein the verifier is responsive to the counter.

The present disclosure accordingly provides, in a third aspect, a computer program element comprising computer program code to, when loaded into a computer system and executed thereon, cause the computer to perform the steps of a method as described above.

BRIEF DESCRIPTION OF THE DRAWINGS

Embodiments of the present disclosure will now be described, by way of example only, with reference to the accompanying drawings, in which:

FIGS. 18$a$ to 18$d$ show the operation of the Find_Failure_States algorithm in accordance with an exemplary embodiment of the present disclosure.

FIG. 23$b$ is a conceptual diagram of a state of a pattern matching machine in accordance with an embodiment of the present disclosure.

FIG. 23$c$ illustrates an exemplary pattern matching machine including wildcard transitions to wildcard states in accordance with an embodiment of the present disclosure.

FIG. 23$d$ illustrates a process for generating a disambiguation dictionary entry for a state in an exemplary pattern matching automaton in accordance with an embodiment of the present disclosure.

DETAILED DESCRIPTION OF THE EMBODIMENTS

Figure 1:
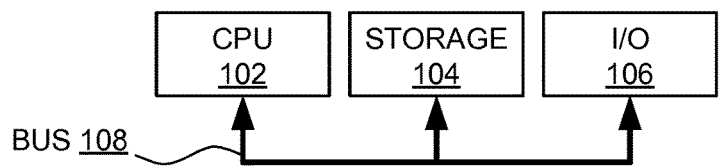
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
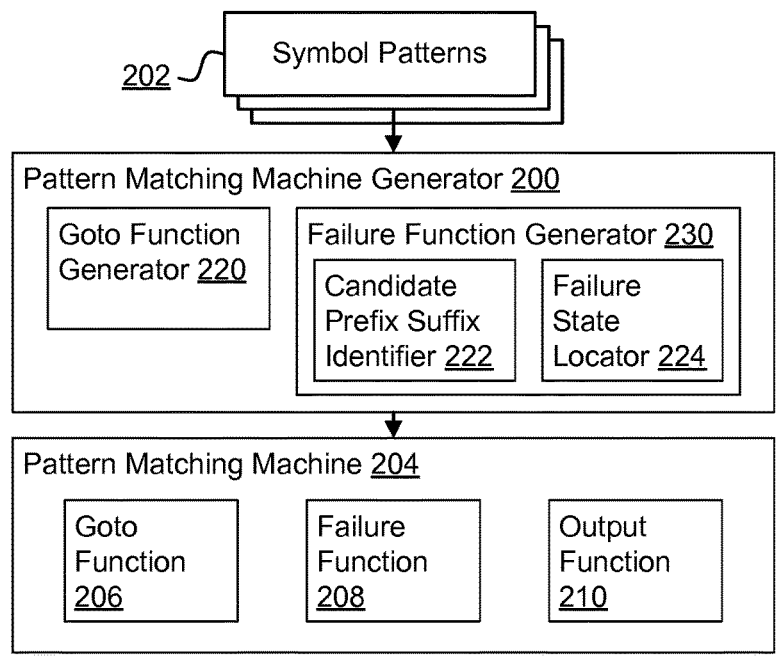
FIG. 2 is a schematic illustration of a pattern matching machine generator for generating a pattern matching machine in accordance with an embodiment of the present disclosure.

FIG. 2 is a schematic illustration of a pattern matching machine generator 200 for generating a pattern matching machine 204 in accordance with an embodiment of the present disclosure. The pattern matching machine generator 200 is a hardware or software component suitable for receiving a plurality of symbol patterns 202 including symbols from a symbol alphabet and additionally metacharacters representing wildcards. A wildcard metacharacter serves to indicate any character in the symbol alphabet Σ. For example, a wildcard metacharacter can be represented as the symbol '.' as specified in the POSIX (Portable Operating System Interface) Basic Regular Expression syntax (BRE) according to IEEE Standard 1003.1 (2004). The pattern matching machine generator 200 is adapted to generate a pattern matching machine 204 as a hardware or software component for identifying matches of one or more of the plurality of symbol patterns 202 by an input symbol sequence. Some of the features of the pattern matching machine 204 of FIG. 2 are similar to those described in the Aho-Corasick paper referenced above, and additionally the pattern matching machine 204, and the pattern matching machine generator 200, are considerably adapted to advantageously provide support for wildcard metacharacters. In this way the pattern matching machine 204 in embodiments of the present disclosure provides the advantages of the Aho-Corasick approach to symbol pattern matching while additionally accommodating the indeterminate nature of patterns including wildcard metacharacters.

The pattern matching machine 204 includes a goto function 206, a failure function 208 and an output function 210. While these functions are illustrated and described as discrete and separate functions it will be appreciated by those skilled in the art that many and various aspects of each of these functions can be further subdivided or combined into additional or consolidated functions. The goto function 206 serves a similar purpose to the goto function of the Aho-Corasick paper in that it maps a pair consisting of a state and an input symbol to a state or fail. However, the goto function 206 of the present disclosure is considerably improved over that of the Aho-Corasick approach to support wildcard metacharacters in symbol patterns as described in detail below. The failure function 208 serves a similar purpose to the failure function of the Aho-Corasick paper in that it maps a state to a state and is consulted when the goto function reports fail. However, the failure function 208 of the present disclosure is considerably improved over that of the Aho-Corasick approach to map a state to potentially numerous states, taking account of wildcard metacharacters in symbol patterns and symbols received in input symbol sequences as described in detail below. The output function 210 serves a similar purpose to the output function of the Aho-Corasick paper in that it outputs matching symbol sequences occurring in an input symbol sequence as part of the operation of the pattern matching machine 204. However, the output function 210 of the present disclosure is considerably improved over that of the Aho-Corasick approach to accommodate wildcard metacharacters in symbol patterns as described in detail below.

The pattern matching machine generator 200 is adapted to generate the goto function 206, failure function 208 and output function 210 of the pattern matching machine 204. The goto function 206 is generated by way of the goto function generator 220 using an algorithm such as algorithm 1 described in detail below. The failure function 208 is generated by way of a failure function generator component 230 including a candidate prefix suffix identifier 222, described in detail below with respect to FIG. 11, and a failure state locator 224, using an algorithm such as algorithm 2 described in detail below. The output function 210 is generated partly by the goto function generator 220, and partly implemented by way of an output algorithm such as algorithm 4 described in detail below. While the components 220, 230, 222 and 224 are illustrated as separate components, it will be appreciated by those skilled in the art in view of the teachings herein that these components could be combined or further subdivided, or provided as facilities or services of components external to the pattern matching machine generator 200.

Figure 3:
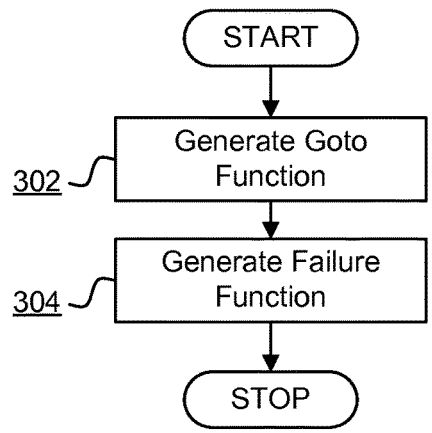
FIG. 3 is a flowchart of a method of the pattern matching machine generator of FIG. 2 in accordance with an embodiment of the present disclosure.

FIG. 3 is a flowchart of a method of the pattern matching machine generator 200 of FIG. 2 in accordance with an embodiment of the present disclosure. The pattern matching machine generator 200 generally performs the steps of: generating the goto function 302; and generating the failure function 304. The output function 210 is generated, in part, along with the generation of the goto function 206. The output function 210 is finalized at a runtime of the pattern matching machine 204 in use by way of an algorithm described in detail below.

In the present embodiment, the goto function 206 is generated using an algorithm such as the "Generate_goto_function" algorithm listed in Algorithm 1 and described in detail below. For ease of representation, and consistent with the Aho-Corasick paper, the goto function 206 is considered a directed graph state machine or automaton of states with directed transitions between states representing the set of symbol patterns 202. Thus, in use, the pattern matching machine 204 enters a particular state in the directed graph only when all transitions from a start state (an initial state) to the particular state are occasioned by input symbols received in an input symbol sequence. Accordingly, each state can be thought of as representing a received prefix of a symbol pattern 202, which can include all of the symbol pattern 202. Further, each transition can be thought of as corresponding to a particular symbol in a symbol alphabet Σ, or alternatively, a metacharacter such as a wildcard metacharacter.

Figure 4:
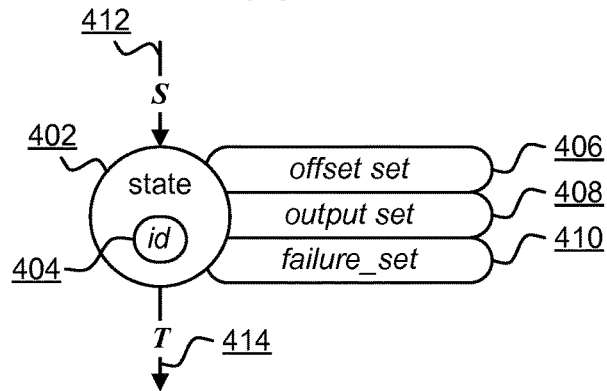
FIG. 4 is a conceptual diagram of a state of the pattern matching machine of FIG. 2 in accordance with an embodiment of the present disclosure.

FIG. 4 is a conceptual diagram of a single state 402 of the pattern matching machine 204 of FIG. 2 in accordance with an embodiment of the present disclosure. In one embodiment, each state 402 can be implemented as a state data structure. In an alternative embodiment, each state 402 can be implemented as an instance of a state class in an object oriented programming environment. Alternatively, the states of the pattern matching machine 204 can be implemented otherwise than by way of data structures, such as by a lookup, mapping or hashtable, or by algorithmically generated dynamic software components determined at runtime. The state 204 includes an identifier, 404, that is unique within a directed graph of the pattern matching machine 204. The state has associated a directed transition 412 leading to the state, and a directed transition 414 leading from the state. Each of the directed transitions 412, 414 has associated a symbol, 'S' and 'T' respectively. In use, the pattern matching machine 204 effects a transition 412 to state 402 from a preceding state if a symbol 'S' is received from an input symbol sequence. Thus the transition 412 can be thought of as corresponding to the receipt of a symbol 'S' from the input symbol sequence when the pattern matching machine 204 is in the preceding state. Further, state 402 can be thought of as a state representing the receipt of pattern symbol 'S', or more simply put, a state representing pattern symbol 'S' (and, indeed, any pattern symbols for transitions preceding transition 412). Similarly, in use, the pattern matching machine 204 effects a transition 414 from state 402 to a subsequent state if a symbol 'T' is received from the input symbol sequence. Thus the transition 414 can be thought of as corresponding to the receipt of a symbol 'T' from the input symbol sequence when the pattern matching machine 204 is in state 402. Further, such a subsequent state to which transition 414 leads can be thought of as a state representing the receipt of pattern symbols 'ST', or more simply put, a state representing pattern symbols 'ST' (and, indeed, any pattern symbols for transitions preceding transition 412).

It will be appreciated that not all states have a directed transition 414 leading from the state. States constituting an end state of the directed graph may not include an outgoing transition 414. Further, in some embodiments, a start state may not include a directed transition leading to the state. For example, a directed graph of a pattern matching machine 204 where a transition exists from the start state for every symbol in a symbol alphabet Σ may not require a directed transition leading to the start state.

The state 402 has further associated a set of offsets 406, a set of output symbol sequences 408, and a set of failure state mappings 410. In alternative embodiments, any or all of the elements 406, 408 and 410 can be implemented differently so as not to require that they are directly included or stored with, in, or in association with, state 402, such as by being determined algorithmically by the pattern matching machine 204 in use, or by being stored separately to, but in respect of, the state 402, such as by way of a mapping, lookup table, database, hash table or the like.

The set of offsets 406 is a set of zero or more numerical offset values. Each offset in the set of offsets 406 indicates a relative location, in an input symbol sequence received by the pattern matching machine 204 in use, to a symbol having been received in the input symbol sequence. In particular, the offsets indicate symbols used to effect a transition between states in the pattern matching machine 204 where the transition corresponds to a wildcard symbol. Thus, each state stores, in the set of offsets 406, the locations of all symbols received in an input symbol sequence corresponding to wildcards in all search patterns of which the state 402 is a part. In the present embodiment, such locations are stored as relative offsets from a most recently received symbol and the offset values are stored for each state when, or after, each state is created for the pattern matching machine 204 as will be described in detail below with respect to Algorithm 1. Thus, if transition 412 were amended to correspond to a wildcard metacharacter, such as '.', then the set of offsets 406 would include an offset of zero to indicate, at a runtime of the pattern matching machine 204, that, when the state machine is in state 402, a most recently received input symbol constitutes a wildcard metacharacter of transition 412 in a symbol pattern. A state immediately subsequent to state 402 would also include an offset in its associated set of offsets 406, incremented to one, to indicate that, at a runtime of the pattern matching machine 204 in a state immediately subsequent to state 402, an input symbol received one symbol before the most recent symbol constitutes the metacharacter of transition 412 in a symbol pattern. It can be seen that the set of offsets 406 is populated with an offset for each state subsequent to a transition corresponding to a wildcard metacharacter in a symbol pattern.

The set of output symbol sequences 408 is a set of zero or more symbol sequences corresponding to complete symbol patterns 202. A state that is arrived at in response to the receipt of an input symbol corresponding to a last symbol in a complete symbol pattern 202 will include the corresponding symbol pattern 202 in its associated set of output symbol sequences 408. The output symbol sequences 408 constitute only part of the output function 210 of the pattern matching machine 204 since output symbol sequences 408 associated with other states to which a state is mapped by a failure function may also be occasioned for a particular input symbol sequence as will be described in detail below.

The set of failure state mappings 410, failure_set, is a set of failure mappings for the state 402 that is used by the failure function 208 to map the state 402 to another state in the event that the goto function 206, executed at a runtime of the pattern matching machine 204 in the state 402, reports fail for a received input symbol. That is to say, when no directed transition exists from the state 402 for an input symbol, the failure function uses the set of failure state mappings 410 to identify an alternative state, a failure state, to which the pattern matching machine 204 can transition, if such a failure state exists. As is the case using the Aho-Corasick approach, a state to which the pattern matching machine 204 transitions in response to the failure function 208 corresponds to a proper suffix of the symbol pattern matched, or partly matched, by the current state 402. That is to say, the current state 402 can be considered to constitute a state of matching, or partially matching, a symbol pattern and, where the goto function 206 indicates fail for an input symbol, a failure state identified by the failure function 208 will correspond to a state of matching, or partially matching, a proper suffix of the matched, or partially matched, symbol pattern. Notably, the current state 402 can be said to correspond to a match of a prefix of the symbol pattern, which can include the entirety of the symbol pattern. Thus, a failure state identified by the failure function 208 will correspond to a state matching a proper suffix of the prefix of the symbol pattern represented by a current state. The definition of the set of failure state mappings 410, and its use in the failure function 208, are considered in detail below.

The generation of the goto function 206 will now be considered in detail with reference to Algorithm 1 "Generate_goto_function". The Generate_goto_function algorithm accepts, as input, a set of symbol patterns 202 $\{y_1 \ldots y_k\}$ and returns a goto function g 206. As previously described, the goto function g 206 can be thought of as a directed graph data structure.

```
1   Algorithm 1: Generate_goto_function
2   Input: set of symbol patterns K = {y_1...y_k}
3   Output: goto function g
4   begin
5       start_state ← new( State )
6       start_state.offsets ← { }; start_state.output ← { }
7       for i ← 1 until k do enter( y_i )
8       if g(start_state, wildcard) = fail then
9       begin
10          for all a such that g(start_state, a) = fail do g(start_state,
                a) ← 0
11      end
12  end
14  procedure enter(a_1 ... a_m)
15  begin
16      state ← start_state; j ← 1
17      while g(state, a_j) ≠ fail do
18      begin
19          state ← g(state, a_j)
20          j ← j + 1
21      end
22      for p ← j until m do
23      begin
24          newstate ← new ( State )
25          g(state, a_p) ← newstate
26          newstate.offset ← { }; newstate.output ← { }
27          for each offset, O_s, in ordered set state.offset do
28          begin
29              O_s ← O_s + 1
30              newstate.offset = newstate.offset ∪ O_s
31          end
32          if a_p = wildcard then newstate.offset ← newstate.offset ∪ 0
33          state ← newstate
34      end
35      state.output ← state.output ∪ {a_1 ... a_m}
36  end
```

Considering Algorithm 1, initially the algorithm generates a new state as a start state at line 5. The start state is a state at which the pattern matching machine 204 starts searching for symbol sequences matching symbol patterns 202 in an input symbol sequence. All other states will exist along one or more directed transitions, at least some of which transition from the start state. At line 6 the algorithm initializes a set of offsets 406 and a set of output symbol sequences 408 for the start state. At line 7 the algorithm executes a procedure named enter for each of the symbol patterns 202 in the input set $\{y_1 \ldots y_k\}$.

The procedure enter is defined from line 14 and receives, as input, a single symbol pattern as a sequence of symbols $\{a_1 \ldots a_m\}$. Initially, at line 16, the procedure sets a variable, state, representing a current state, to the start state of the state graph (the start state being instantiated at line 5). A counter, j, is then initialized. By way of a loop at lines 17 to 21, the procedure then traverses the directed state graph for symbols in the symbol pattern $\{a_1 \ldots a_m\}$. The loop seeks to transition from the current state, state, to a subsequent state based on the goto function g 206, (insofar as the goto function is already defined). Thus, the loop at lines 17 to 21 traverses the directed state graph, to the extent that it is already defined, until it is unable to transition to a state for a current symbol $a_j$. In this way, the loop reuses states and transitions between states already existing in the directed state graph for the symbol pattern $\{a_1 \ldots a_m\}$. When the state graph traversal fails for a current symbol $a_j$, the procedure enters a second loop, from line 22, through each of the remaining symbols in the symbol pattern $a_j$ to $a_m$. For each remaining symbol, the procedure generates a new state, newstate, (line 24) and defines a new transition in the goto function g 206 from the current state, state, to newstate (line 25). Thus, line 25 constitutes the generation of a new transition from state to newstate for the pattern symbol $a_p$. The procedure initializes a set of offsets 406 and a set of output symbol sequences 408 for newstate at line 26.

Lines 27 to 31 serve to copy a set of offsets 406 from the current state state to the new state newstate, incrementing each offset by 1. The newstate constitutes a state subsequent to state in the directed graph, and any wildcard transition leading to state, and having a respective offset value in the set of offsets 406 for state, will apply equally to newstate. Such offset values will, however, need to be incremented to account for the additional pattern symbol $a_p$ corresponding to the new transition to newstate.

At line 32 the procedure tests if the transition leading to newstate corresponds to a wildcard symbol by checking if $a_p$ is a wildcard. If $a_p$ is a wildcard then the set of offsets 406 is supplemented by a new offset of value zero to represent the new transition leading to newstate that corresponds to a wildcard symbol in $a_p$.

At line 33 newstate is made the current state, state, and the loop is repeated. On completion of the loop of lines 22 to 34 for all symbols in the symbol pattern $\{a_1 \ldots a_m\}$, the current state, state, constitutes the state at which the entire symbol pattern $\{a_1 \ldots a_m\}$ is determined to have been matched. Accordingly, the output function 210 for state is updated to include the symbol pattern $\{a_1 \ldots a_m\}$ at step 35.

Returning to the loop at line 7 of Algorithm 1, on completion of the enter procedure for each of the symbol patterns $\{y1 \ldots yk\}$ the algorithm proceeds to line 8 where it checks, using the goto function g 206, for the absence of a wildcard transition from the start. In the absence of a wildcard transition, a looped transition is generated at line 10 directed from and to the start and corresponding to all symbols for which there is not already a transition from the start state. This technique of looping a transition to the start state is consistent with that known from the Aho-Corasick approach.

One aspect of the goto function g 206, that is not represented in Algorithm 1, addresses the issue of precedence of transitions in the directed state graph. Where a first state leads to a plurality of second states via a set of transitions, the set of transitions including one or more transitions corresponding to literal symbols and a transition corresponding to a wildcard symbol, the goto function g 206 needs to be able to determine which transition is appropriate for an input symbol matching a literal transition: should the goto function g 206 use the literal transition or the wildcard transition? In accordance with embodiments of the present disclosure, the goto function g 206 is adapted to always ensure the literal transition takes precedence. However, states arising subsequent to the wildcard state may not arise subsequent to the literal state, and so pattern matching may not be accurate. To overcome this problem, post-processing can be performed to adapt the goto function g 206 to copy all states and transitions that occur subsequent to a wildcard transition to also occur subsequent to all literal transitions that originate from the same state as the wildcard transition. In this way, all states that the pattern matching machine 204 could enter via a wildcard transition can also be entered by following a literal transition, so ensuring effectiveness of the pattern matching machine 204 in which the goto function g 206 enforces precedence of literal transitions over wildcard transitions. While the embodiment described here involves post-processing to adapt the goto function g 206 to provide this facility, it will be apparent to those skilled in the art, in view of the teachings herein, that an adapted algorithm for the generation of the goto function g 206 could alternatively be employed to provide the necessary duplication of states and transitions arising subsequent to a wildcard state without the need for such post-processing.

The approach of Algorithm 1 will now be considered in use in accordance with an embodiment of the present disclosure for the following first set of exemplary symbol patterns, where the '.' metacharacter constitutes a wildcard:

AC.NF
BNF.P
CA
CBNF.X
DE..LM
E.KLM

Figure 5:
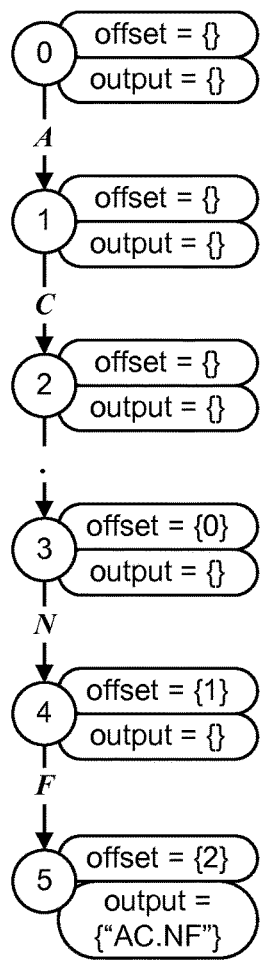
FIGS. 5 to 8 illustrate partly generated goto functions for a pattern matching machine in accordance with an embodiment of the present disclosure.

FIGS. 5 to 8 illustrate the evolution of a partly generated goto function g 206 for a pattern matching machine 204 in accordance with an embodiment of the present disclosure. FIG. 5 illustrates the result of the Generate_goto_function after processing the first symbol pattern 'AC.NF'. As can be seen in FIG. 5, a directed graph of states from a start state '0' to a state '5' is generated, with transitions between states corresponding to the symbols in the symbol pattern. The set of offsets 406 is an empty set for each of the states '0', '1' and '2' preceding the wildcard transition. Subsequent to the wildcard transition, from state '3', the offset of the wildcard transition is included in the set of offsets 460. Specifically, in association with state '3', the offset of the wildcard transition has a value of zero since the wildcard transition occurs immediately before state '3' (leading to state '3'). In association with state '4', the offset of the wildcard transition has a value of one since the wildcard transition occurs one transition before the transition immediately before state '4'. In association with state '5', the offset of the wildcard transition has a value of two since the wildcard transition occurs two transitions before the transition immediately before state '5'.

The set of output symbol sequences 408 is an empty set for each of the states '0' to '4' because none of these states represent a state in which a complete match of the symbol pattern will have occurred. State '5', however, constitutes a state in which a complete match of the symbol pattern 'AC.NF' will have occurred and, accordingly, the complete symbol pattern is comprised in the set of output symbol sequences 408 for state '5'. Notably, the set of output symbol sequences 408 does not necessarily constitute the total set of output symbol sequences for a state at this stage, since additional output symbol sequences may be output based on failure mappings for a state. Such additional output symbol sequences are determined at a runtime of the pattern matching machine 204 since they are dependent on the symbols received in an input symbol sequence and the failure mappings, as is described in detail below.

Figure 6:
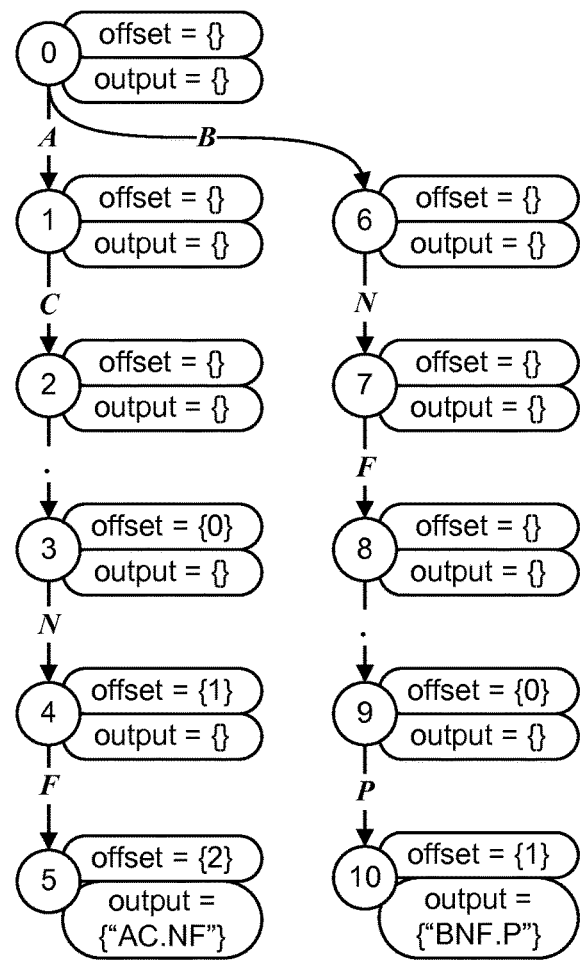

FIG. 6 illustrates the result of the Generate_goto_function after processing the first and second symbol patterns 'AC.NF' and 'BNF.P'. Note the values of offset stored in the set of offsets 406 for states '9' and '10' corresponding to the wildcard transition between states '8' and '9'. Notice also the inclusion of the complete symbol pattern 'BNF.P' in the output function of only state '10', corresponding to the only state in which this pattern will be completely matched.

Figure 7:
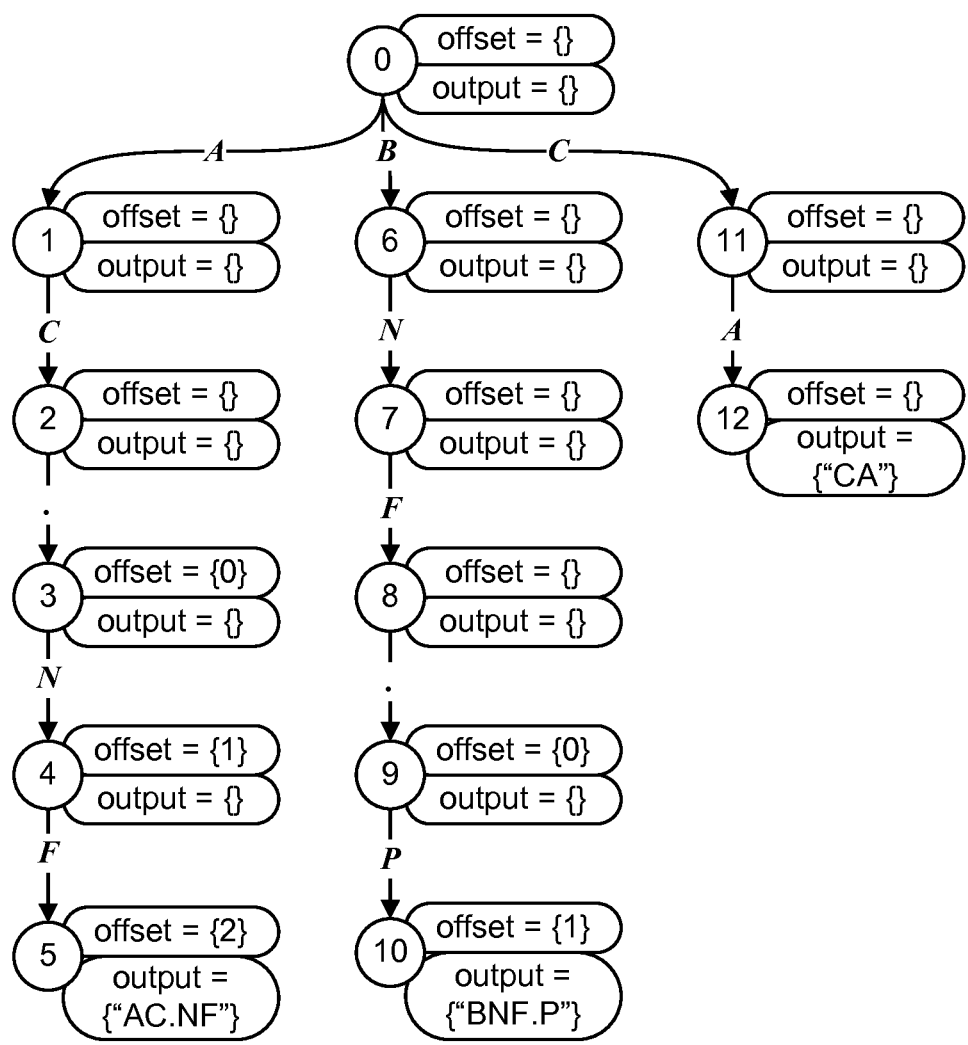
Figure 8:
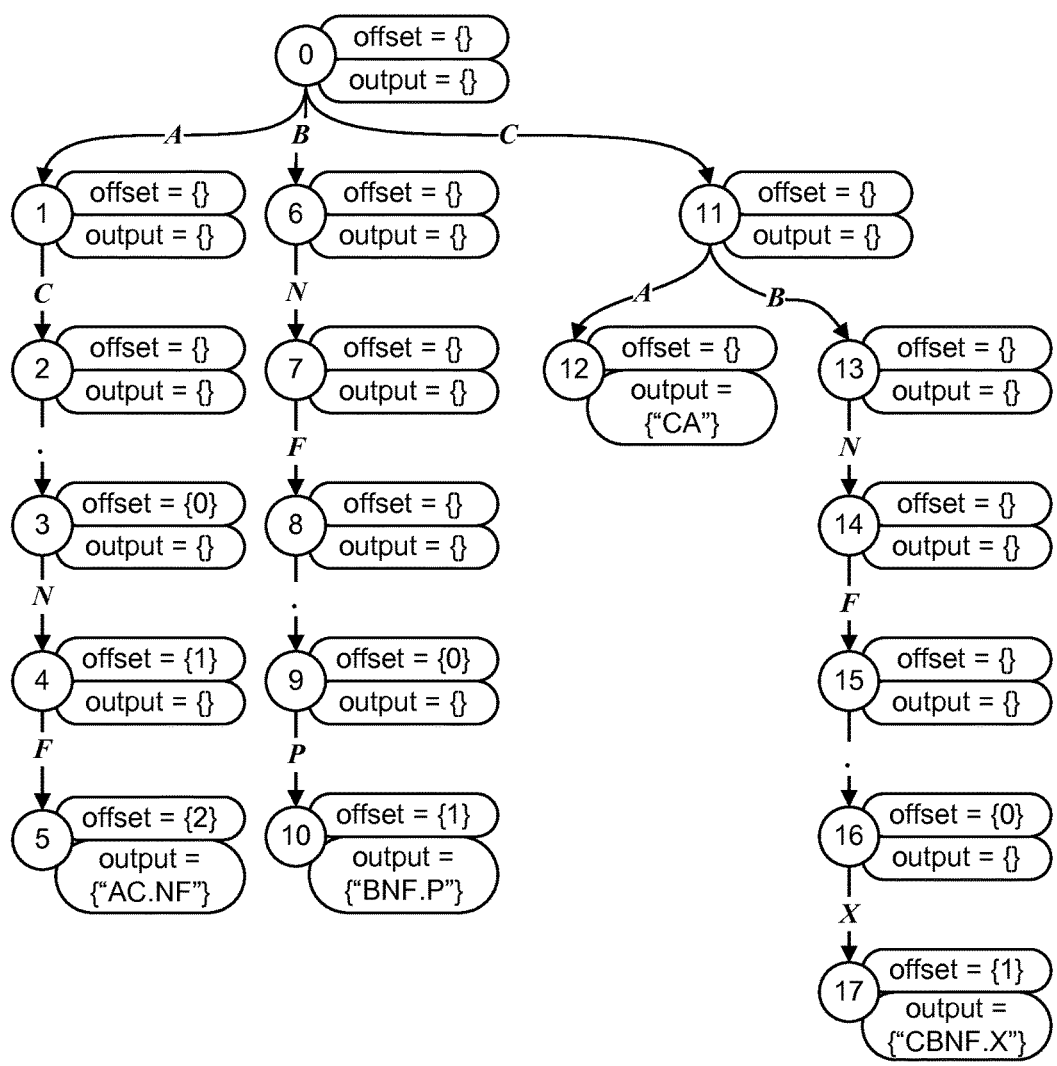

FIG. 7 illustrates the result of the Generate_goto_function after processing the first to third symbol patterns 'AC.NF', 'BNF.P' and 'CA'. FIG. 8 illustrates the result of the Generate_goto_function after processing the first to fourth symbol patterns 'AC.NF', 'BNF.P', 'CA' and 'CBNF.X'. Notice, in FIG. 8, the reuse of state '11' for both the 'CA' and 'CBNF.X' symbol patterns arising from the while loop at lines 17 to 21 of Algorithm 1.

Figure 9:
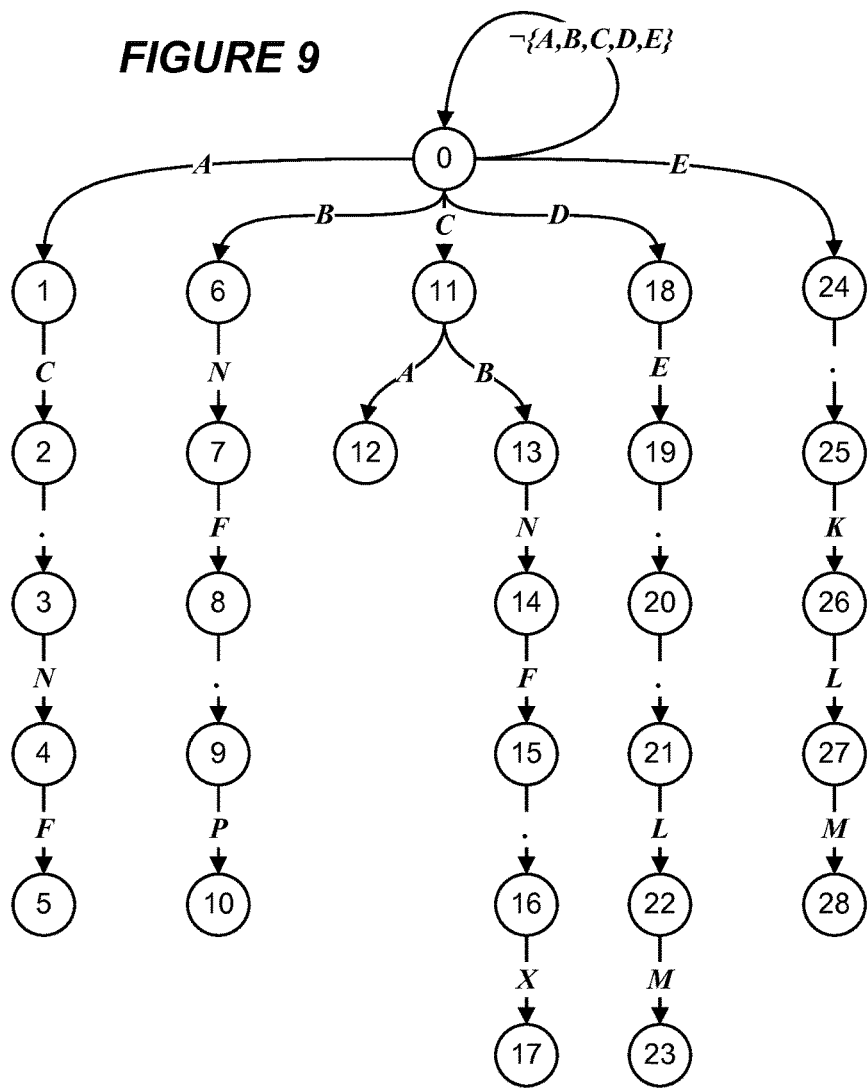
FIG. 9 depicts a state graph of a pattern matching machine in accordance with an embodiment of the present disclosure.

FIG. 9 depicts a state graph of a pattern matching machine 204 in accordance with an embodiment of the present disclosure. The state graph of FIG. 9 corresponds to the result of the Generate_goto_function after processing all six of the first exemplary symbol patterns. FIG. 9 does not indicate the set of offsets 406 or the set of output symbol sequences 408 for each state for simplicity. Thus, on completion of the Generate_goto_function, the directed graph of FIG. 9 constitutes, at least in part, the goto function g 206 for the first exemplary symbol patterns.

According to the Aho-Corasick approach, a failure function is responsive to a fail condition of the goto function g 206 and maps a current state of the directed graph, in use, to a new state. In Aho-Corasick, the new state is identified as a state corresponding to a longest proper suffix of the pattern symbol sequence of the mapped state, where such a state exists. The Aho-Corasick approach assumes a literal identity between all symbols received in an input symbol sequence and symbols corresponding to transitions between states leading to a current state. This assumption holds, in Aho-Corasick, since the transitions, in Aho-Corasick, always correspond to determinate symbols—i.e. symbols that are known at the point of generating the goto and failure functions of a pattern matching machine, because the symbols are always literal symbols. However, in accordance with embodiments of the present disclosure, transitions can correspond to wildcard metacharacters, the value of which is not determinate at the point of generating the goto and failure functions, and the assumption is no longer valid.

Accordingly, embodiments of the present disclosure provide for supplementing failure function mappings from a first state to a second state with additional logic to account for the potentially variable values of input symbols received, by the pattern matching machine 204 in use, to constitute a wildcard symbol in a symbol pattern represented, at least in part, by a current state of the machine 204. An improved failure function 208 is therefore provided in accordance with embodiments of the present disclosure. In particular, the failure function 208 provides a set of zero or more failure state mappings 410 for states in the directed graph of the pattern matching machine 204.

Figure 10:
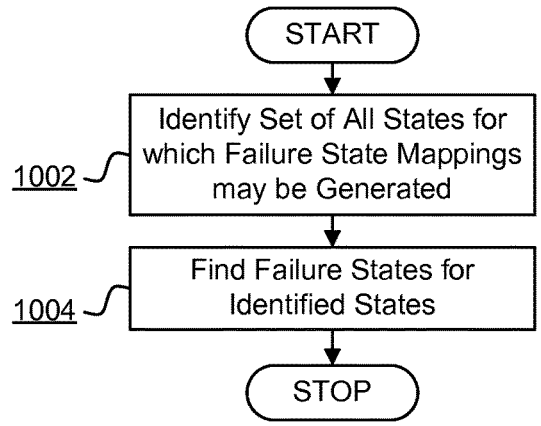
FIG. 10 is a flowchart of the generate failure function of FIG. 3 in accordance with an embodiment of the present disclosure.

FIG. 10 is a flowchart of the generate failure function 304 of FIG. 3 in accordance with an embodiment of the present disclosure. The generate failure function 304 includes an identification, at 1002, of a set of all states in a directed graph for a pattern matching machine 204 for which failure state mappings may be generated. Subsequently, at 1004, the generate failure function 304 finds failure states for each of the states identified at 1002.

The identification, at 1002, of states for which failure state mappings may be generated is informed by certain novel principles realized by the inventors that apply to directed state graphs representing symbol patterns including wildcards. Firstly, states in a directed state graph from which transitions corresponding to wildcard symbols originate, can never be eligible for a failure mapping. This is because a goto function 206 can never return fail for symbols received by a machine 204 in such states since any input symbol will always at least follow the transition corresponding to the wildcard pattern symbol (except that states which would constitute failure states for a state from which wildcard transition originates, were it not for the presence of the wildcard transition, (hereinafter, cross-referenced output states) will need to be identified for an output function of a state, as discussed below). Secondly, each of one or more failure state mappings 410 must include a condition based on symbols in an input symbol sequence, the satisfaction of which identifies a particular failure state mapping appropriate for the particular input symbol sequence, if such a mapping exists. Thirdly, an output function for each state must consider also failure state mappings 410 and cross-referenced output states and provide output, where appropriate, of one or more failure states and cross-referenced output states based on symbols in an input symbol sequence constituting wildcard symbols in a symbol pattern. Cross-referenced output states are only identified for states from which a wildcard transition originates. A cross-referenced output state is a state elsewhere in the state graph that would constitute failure states for another (cross-referencing) state in the graph except that it does not constitute a failure state for the cross-referencing state because the cross-referencing state is a state from which a wildcard transition originates. That is to say that cross-referenced output states are identified only for the purpose of completing an output function for a cross-referencing state to ensure that all matched symbol patterns are output. Such cross-referenced output states do not, however, constitute a failure transition for a state in the state graph, such cross-referencing states always have an outgoing wildcard transition that will be followed, resulting in no actual failure to transition in the goto function.

Optionally, the set of failure state mappings 410 can be omitted for states determined to be exempt from failure state mapping. In this way, storage and other resources consumed by the pattern matching machine 204 can be reduced. For example, in use, a pattern matching machine 204 may assume that a failure state for a state having no explicit failure state mapping is always determined to be a start state of a state machine.

The identification 1002 is carried out by the candidate prefix suffix identifier 222 of the pattern matching machine 200. The locating 1004 is carried out by the failure state locator 224 of the pattern matching machine 200.

Figure 11:
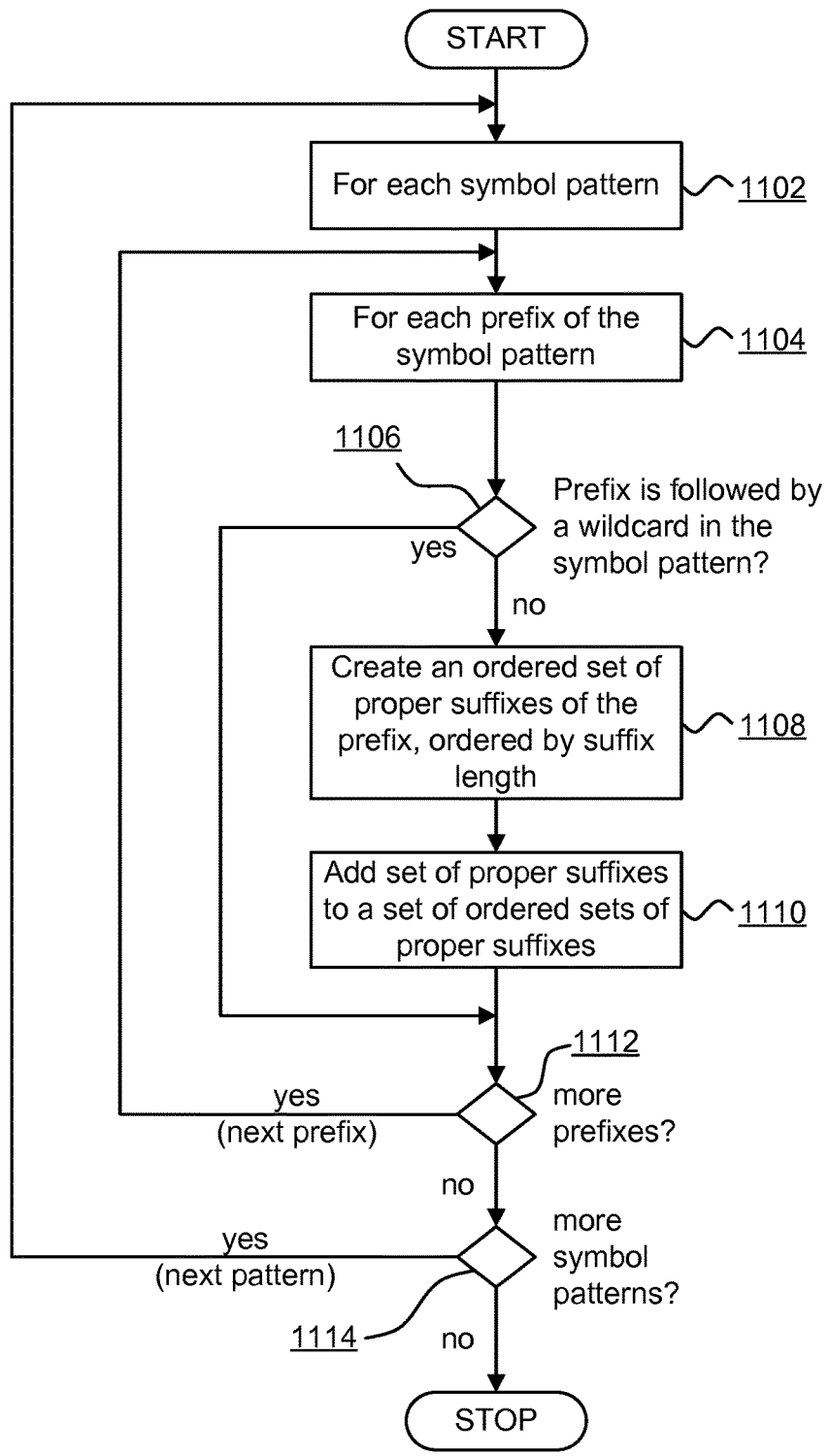
FIG. 11 is a flowchart of the identification step of the flowchart of FIG. 10 in accordance with an embodiment of the present disclosure.

FIG. 11 is a flowchart of the identification 1002 of the flowchart of FIG. 10 in accordance with an embodiment of the present disclosure. Initially, at 1102, the method commences an iteration through each of the symbol patterns 202. At 1104, the method commences a nested iteration through each prefix of a current symbol pattern. At 1106 the method determines if the current symbol pattern prefix is followed by a wildcard. In this way the condition described above, that states from which transitions corresponding to wildcard symbols originate are not eligible for failure mapping, can be enforced. If the prefix is determined to be followed by a wildcard in the symbol pattern the method skips to 1112. Alternatively, the method proceeds to 1108 at which an ordered set of proper suffixes of the current prefix is created, the set being ordered by suffix length. At 1110 the ordered set of proper suffixes is added to a set of ordered sets of proper suffixes for the current symbol pattern. At 1112 the method determines if more prefixes are to be processed and iterates to 1104 in the affirmative. At 1114 the method determines if more symbol patterns are to be processed and iterates to 1102 in the affirmative.

Figure 12:
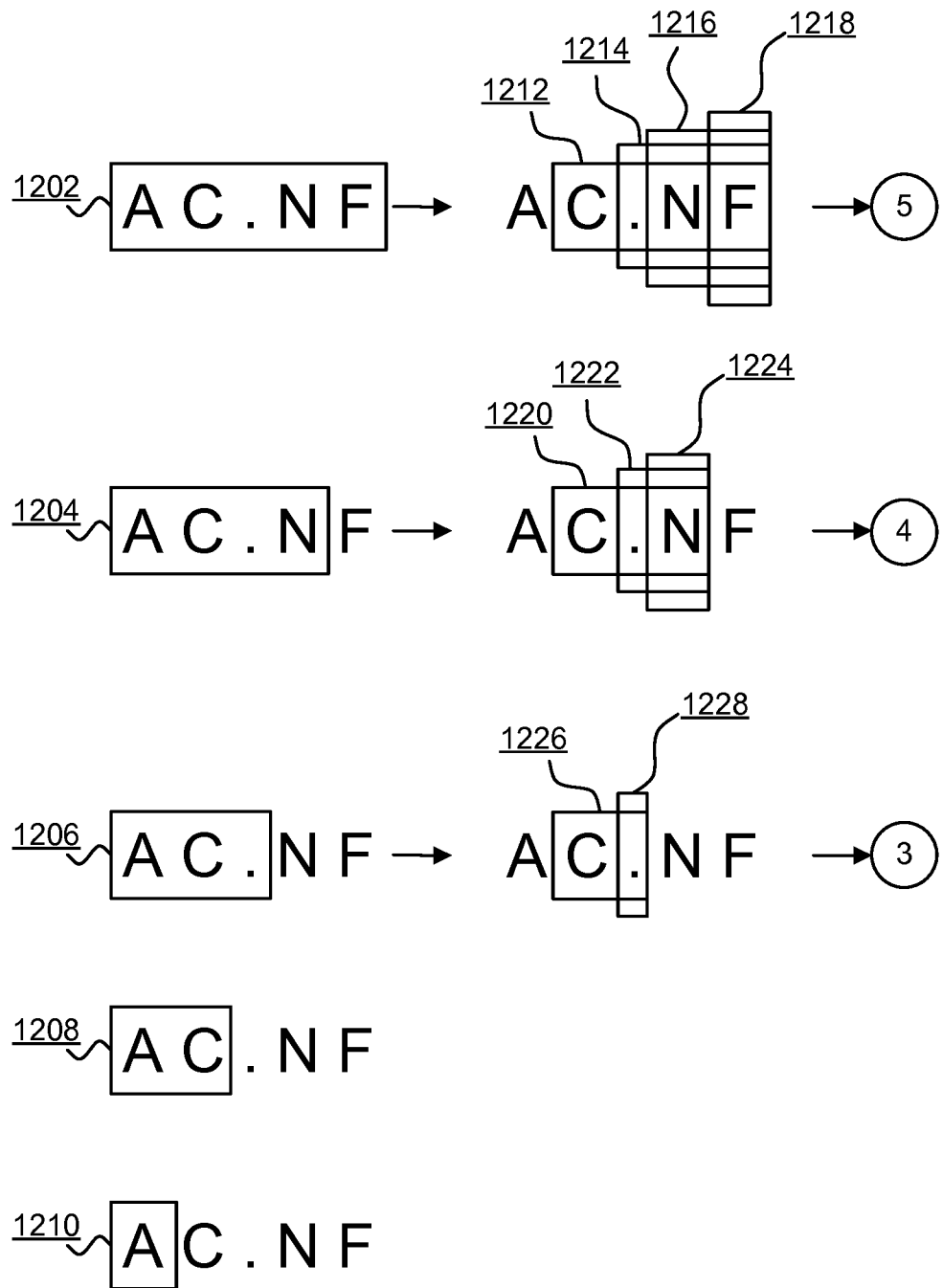
FIGS. 12 to 15 depict the method of the flowchart of FIG. 11 in use in accordance with an embodiment of the present disclosure.

Thus, on completion of the method of FIG. 11, a set is generated, for each of the symbol patterns 202 for the pattern matching machine 204, of ordered sets of proper suffixes of prefixes of the symbol pattern. This is illustrated with reference to the first exemplary symbol patterns and FIGS. 12 to 15. FIG. 12 illustrates the method of FIG. 11 applied, at 1102, to the first exemplary symbol pattern 'AC.NF'. It is first assumed that a set of ordered sets of proper suffixes for the current symbol pattern is initialized to an empty set { }. 1104 iterates through each prefix of the current symbol pattern 'AC.NF'. The prefixes of 'AC.NF' are indicated in FIG. 12 as: 'AC.NF' 1202, represented by state '5' in the state graph of FIG. 9; 'AC.N' 1204, represented by state '4' in the state graph of FIG. 9; 'AC.' 1206, represented by state '3' in the state graph of FIG. 9; 'AC' 1208, represented by state '2' in the state graph of FIG. 9; and 'A' 1210, represented by state '1' in the state graph of FIG. 9.

For the first prefix 'AC.NF' 1202, the method determines, at 1106, that the first prefix is not followed by a wildcard symbol, and so the prefix is eligible for generating a set of failure state mappings 410. Subsequently, at 1108, the method creates an ordered set of proper suffixes of the current prefix, ordered by suffix length. FIG. 12 illustrates the set of proper suffixes of the current prefix 'AC.NF' 1202. The set of proper suffixes includes 'C.NF' 1212; '.NF' 1214; 'NF' 1216; and 'F' 1218. Each of these proper suffixes corresponds to state '5' in the state graph (FIG. 9), since it is state '5' that represents the first prefix 'AC.NF' 1202. Thus state '5' is a state for which a set of failure mappings can be subsequently generated as will be described in detail below. Thus, the ordered set of proper suffixes PS for state '5' is given by:

$PS_5$={'C.NF', '.NF', 'NF', 'F'}

This ordered set of proper suffixes is added to the set of ordered sets SOS of proper suffixes at 1110:

$SOS_{AC.NF}$={{'C.NF', '.NF', 'NF', 'F'}}

Subsequently, the method returns to 1102 for the next prefix, 'AC.N' 1204 represented by state '4' in the state graph of FIG. 9. As illustrated in FIG. 12, the prefix 'AC.N' 1204 has proper suffixes 'C.N' 1220; '.N' 1222; and 'N' 1224. Thus each of these proper suffixes corresponds to state '4' since it is state '4' that represents the prefix 'AC.N' 1204. Thus, the ordered set of proper suffixes PS for state '4' is given by:

$PS_4$={'C.N', '.N', 'N'}

This ordered set of proper suffixes is added to the set of ordered sets SOS of proper suffixes at 1110:

$SOS_{AC.NF}$={{'C.NF', '.NF', 'NF', 'F'}, 'C.N', '.N', 'N'}

Subsequently, the method returns to 1102 for the next prefix, 'AC.' 1206 represented by state '3' in the state graph of FIG. 9. As illustrated in FIG. 12, the prefix 'AC.' 1206 has proper suffixes '.N' 1226; and 1228. Thus each of these proper suffixes corresponds to state '3' since it is state '3' that represents the prefix 'AC.' 1206. Thus, the ordered set of proper suffixes PS for state '3' is given by:

$PS_3$={'C.', '.'}

This ordered set of proper suffixes is added to the set of ordered sets SOS of proper suffixes at 1110:

$SOS_{AC.NF}$={{'C.NF', '.NF', 'NF', 'F'}, {'C.N', '.N', 'N'}}

Subsequently, the method returns to 1102 for the next prefix, 'AC' 1208 represented by state '2' in the state graph of FIG. 9. The prefix 'AC' 1208 is determined to be followed by the wildcard metacharacter at 1106 since there exists a transition from state '2' corresponding to a wildcard symbol. Accordingly, the method skips to 1112.

Subsequently, the method returns to 1102 for the next prefix, 'A' 1210 represented by state '1' in the state graph of FIG. 9. The prefix 'A' 1210 has no proper suffixes and so the ordered set of proper suffixes generated at 1108 is an empty set. In one embodiment a test is included in the method of FIG. 11 to either detect single symbol prefixes or empty suffix sets to avoid unnecessary processing of 1106 through 1110.

Thus, following the execution of the nested loop of steps 1104 to 1112 for the symbol pattern 'AC.NF', the set of ordered sets SOS of proper suffixes for the symbol pattern is determined to be:

$SOS_{AC.NF}=\{\{\text{'C.NF'}, \text{'.NF'}, \text{'NF'}, \text{'F'}\}, \{\text{'C.N'}, \text{'.N'}, \text{'N'}\}, \{\text{'C.'}, \text{'.'}\}\}$ The method of FIG. 11 iterates for all symbol patterns. With further reference to the exemplary symbol patterns above, FIGS. 13 and 14 illustrate the method of FIG. 11 applied, at step 1102, to each of the second exemplary symbol pattern 'BNF.P' and the third exemplary symbol pattern 'CA', respectively.

Figure 13:
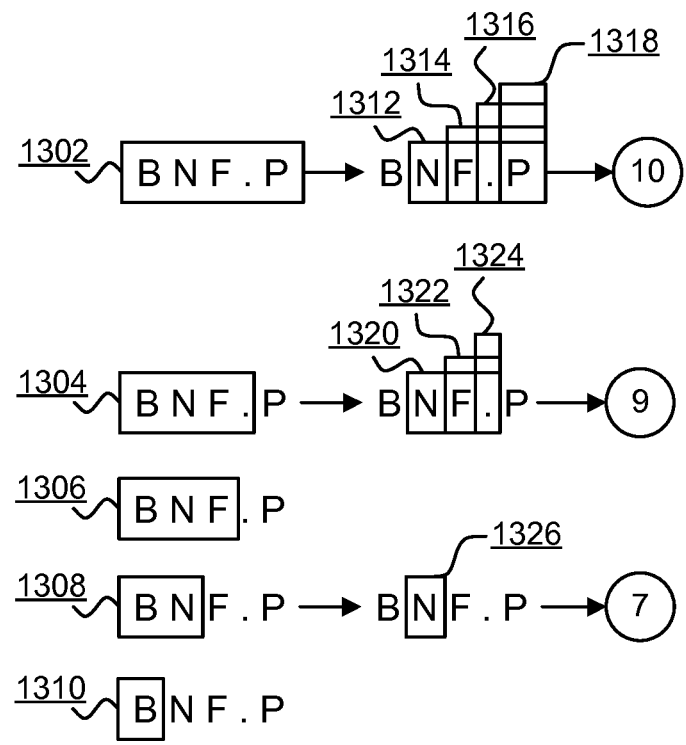
Figure 14:
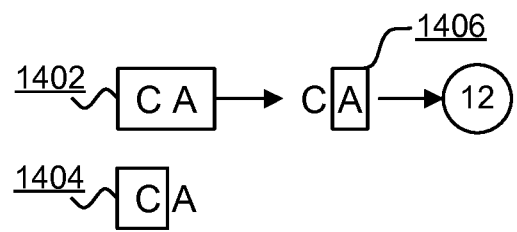

As illustrated in FIG. 13, the symbol pattern 'BNF.P' has prefixes: 'BNF.P' 1302 represented by state '10' in the state graph of FIG. 9; 'BNF.' 1304 represented by state '9'; 'BNF' 1306 represented by state '8'; 'BN' 1308 represented by state '7'; and 'B' represented by state '6'. The method of FIG. 11 identifies four proper suffixes for prefix 'BNF.P' 1302 as suffixes: 'NF.P' 1312; 'F.P' 1314; '.P' 1316; and 'P' 1318. Thus, the ordered set of proper suffixes PS for state '10' is given by:

$PS_{10}=\{\text{'NF.P'}, \text{'F.P'}, \text{'.P'}, \text{'P'}\}$

This ordered set of proper suffixes is added to the set of ordered sets SOS of proper suffixes at 1110:

$SOS_{BNF.P}=\{\{\text{'NF.P'}, \text{'F.P'}, \text{'.P'}, \text{'P'}\}\}$

The method of FIG. 11 continues for the other prefixes 1304 to 1310 to provide the final set of ordered sets of proper suffixes, SOS, for symbol pattern 'BNF.P' as:

$SOS_{BNF.P}=\{\{\text{'NF.P'}, \text{'F.P'}, \text{'.P'}, \text{'P'}\}, \{\text{'NF.'}, \text{'F.'}, \text{'.'}\}, \{\text{'N'}\}\}$ (Notably, prefix 'BNF' 1306 is ineligible for identification of failure state mapping since it is followed by a wildcard character '.'.)

As illustrated in FIG. 14, the method of FIG. 11 applied to the symbol pattern 'CA' identifies a single proper suffix 'N' 1406. Accordingly, following the method of FIG. 11, the final set of ordered sets of proper suffixes, SOS, for symbol pattern 'CA' as:

$SOS_{CA}=\{\{\text{'A'}\}\}$

Figure 15:
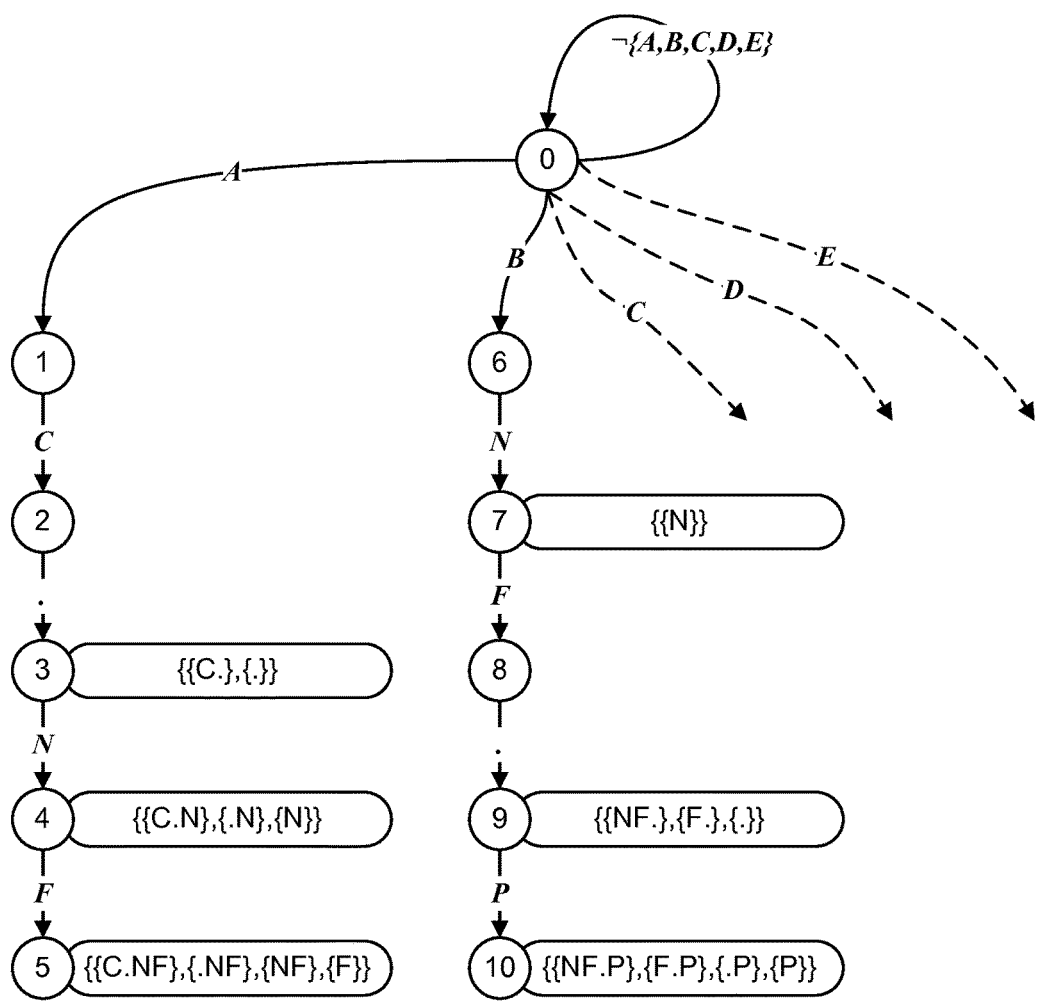

When the method of FIG. 11 is further applied to the other exemplary symbol patterns, 'CBNF.X', 'DE..LM', and 'E.KLM', corresponding sets of ordered sets of proper suffixes, SOS, are generated as:

$SOS_{CBNF.X}=\{\{\text{'BNF.X'}, \text{'NF.X'}, \text{'F.X'}, \text{'.X'}, \text{'X'}\}, \{\text{'BNF.'}, \text{'NF.'}, \text{'F.'}, \text{'.'}\},$
$\{\text{'BNF'}, \text{'NF'}, \text{'F'}\}, \{\text{'BN'}, \text{'N'}\}, \{\text{'B'}\}\}$
$SOS_{DE..LM}=\{\{\text{'.LM'}, \text{'LM'}, \text{'M'}\}, \{\text{'.L'}, \text{'L'}\}, \{\text{'.'}\}\}$
$SOS_{E.KLM}=\{\{\text{'.KLM'}, \text{'KLM'}, \text{'LM'}, \text{'M'}\}, \{\text{'.KL'}, \text{'KL'}, \text{'L'}\}, \{\text{'.K'}, \text{'K'}\}, \{\text{'.'}\}\}$ FIG. 15 is illustrates the association between individual ordered sets of proper suffixes and states in the state graph. For simplicity, FIG. 15 covers only those states for the exemplary symbol patterns 'AC.NF' and 'BNF.P' though it will be appreciated that all other exemplary symbol patterns and associated states could be added to this representation.

It will be appreciated that, while FIG. 11 is directed to the processing of search patterns, the approach and principles of the method of FIG. 11 could alternatively be based on processing a directed graph for a pattern matching machine 204, such as a graph generated by the Generate_goto_function of Algorithm 1, since such a graph represents all symbols in all search patterns 202.

Thus, following completion of the method of FIG. 11 for all symbol patterns, 1002 of FIG. 10 of identifying the set of all states for which failure state mappings may be generated is complete, the set comprising, for the exemplary symbol patterns, all of sets $SOS_{AC.BN.F}$, $SOS_{BNF.P}$, $SOS_{CA}$, $SOS_{CBNF.X}$, $SOS_{DE..LM}$, and $SOS_{E.KLM}$.

Figure 16:
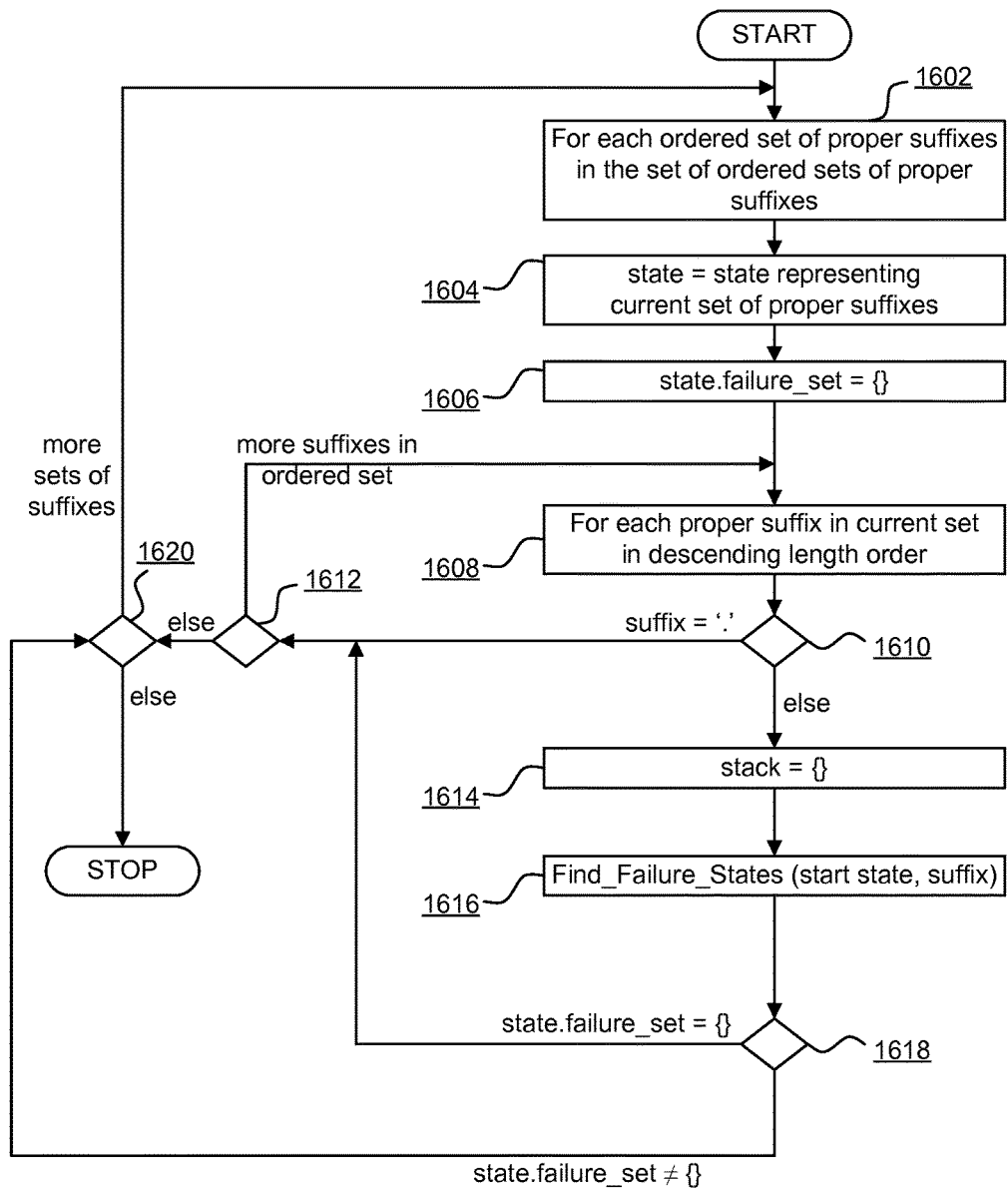
FIG. 16 is a flowchart of the find step of the flowchart of FIG. 10 in accordance with an embodiment of the present disclosure.

FIG. 16 is a flowchart of the find 1004 of the flowchart of FIG. 10 in accordance with an embodiment of the present disclosure. FIG. 16 serves to populate the set of failure state mappings failure_set 410 for each state determined to be eligible for failure state mapping at 1002 of FIG. 10. Thus, the method of FIG. 16 is performed for each symbol pattern 202. Initially, at 1602, the method initiates an iteration for each ordered set of proper suffixes, PS, in the set of ordered sets SOS for a symbol pattern. At 1604 the method identifies the state, state, for the current ordered set of proper suffixes. Recall from FIGS. 12 to 15, and the accompanying description thereof, that each ordered set of proper suffixes corresponds to a state in the state graph for the pattern matching machine 204. In one embodiment, such association can be recorded in a set of ordered sets, SOS, by, for example, the SOS being a set of tuples where each tuple includes a first element indicating a state and a second element as the set of proper suffixes, PS, corresponding to the state. At step 1606 a set of failure state mappings, failure_set 410, for state is initialized to an empty set { }. Notably, the empty set can be used to indicate that the current state is mapped to the start state in the event that the goto function 206 returns fail. At 1608 a nested iteration is initiated for each proper suffix in the current ordered set of proper suffixes in descending length order. If the current proper suffix is determined to consist exclusively of a wildcard '.' at 1610, the method proceeds to 1612 since such a suffix will always map to the start state as a failure state. Alternatively, at 1614, the method initializes a stack to an empty set { }. Subsequently, at 1616 the method executes an algorithm, 'Find_Failure_States', to populate the set of failure state mappings, failure_set 410, for the current state. An exemplary Find_Failure_States algorithm is described below with respect to Algorithm 2. Subsequently, at 1618, if the set of failure state mappings, failure_set 410, for the current state is an empty set, the method proceeds to 1612 to reiterate for a subsequent proper suffix in the ordered set of proper suffixes. Alternatively, where the set of failure state mappings, failure_set 410, for the current state is not an empty set, the method proceeds to 1620 to proceed to a subsequent ordered set of proper suffixes for the symbol pattern from 1602. The processing of each proper suffix in descending length order ensures that failure state mappings for longer suffixes are identified first, and only if failure state mappings are not identified for a longer suffix will shorter suffixes be considered. Once failure states are identified for a suffix in an ordered set of proper suffixes, no further shorter suffixes will be considered in the ordered set and processing proceeds to the next ordered set of proper suffixes by virtue of 1618.

The Find_Failure_States algorithm referenced at 1616 will now be described with reference to Algorithm 2. The Find_Failure_States algorithm populates the set of failure state mappings, failure_set 410, for a state in the directed graph of the pattern matching machine 204. In accordance with an embodiment of the present disclosure, the failure state mappings, failure_set 410 for a state takes the form of a set of zero or more triples:

$\{(S_1, C_1, F_1) \ldots (S_p, C_p, F_p)\}$ where S is a failure state to which a state is mapped, C is a 'guard stack' as an ordered set of zero or more symbols defining the conditions under which a failure state mapping is permitted, and F is the size of an output set for the failure state S (alternatively, F is the length of a longest output symbol sequence associated with the failure state S). While the above triple is proposed here for exemplary embodiments of the present disclosure, it will be apparent to those skilled in the art in view of the present teachings that alternative mechanisms for providing, representing and operating a set of failure state mappings, failure_set 410 can be employed.

Thus, a set of failure state mappings, failure_set 410 for a state (also referred to herein as state.failure_set) provides potentially multiple failure mappings for the state to new states S (failure states) in the event that the goto function 206 returns fail. The need for potentially multiple failure state mappings arises due to the possibility that a current state of a pattern matching machine 204 corresponds to a state representing pattern symbols including a wildcard metacharacter. When the pattern matching machine 204 is operating in use for matching symbol patterns within an input symbol sequence, the particular input symbols constituting the wildcard pattern symbol are known, and can inform a determination of an appropriate failure state mapping. However, prior to a runtime of the pattern matching machine 204, at the point of generating the pattern matching machine 204 including a directed graph and failure state mappings, such runtime input symbols are unknown. Accordingly, it is necessary to determine conceivable failure state mappings for states in the state graph, and where those states correspond to proper suffixes of prefixes of symbol patterns 202 that include wildcards, refer, in use at match time, to the input symbols constituting such wildcards. In accordance with embodiments of the present disclosure, such conceivable failure state mappings are determined and stored in the set of failure state mappings, failure_set 410, each failure state mapping being associated with a guard stack C defining the particular symbols, in an input symbol sequence at runtime, constituting wildcards in a proper suffix of a mapped symbol pattern prefix, in order for a failure mapping to be permitted. The guard stack C provides an ordered set of zero or more symbols. It will be appreciated that, when a mapped state represents a symbol pattern, or portion of a symbol pattern, including wildcards, the guard stack C for each failure mapping must include a symbol condition for each wildcard in the symbol pattern portion (although compression of the guard stack C, which might include removal of redundancy with appropriate protections, is conceivable). Further, the ordered nature of the guard stack C is suitable, in conjunction with the ordered set of offsets 406 for a state, to permit the ready identification of symbols in an input symbol sequence at offsets corresponding to wildcards in a symbol pattern, or portion thereof, for comparison with the guard stack C.

The Find_Failure_States algorithm of Algorithm 2 uses a procedure "find_transition_states". The procedure find_transition_states accepts, as input, a state, st, and a symbol, sy, and returns a set of (transition, state) pairs according to the goto graph. Each (transition, state) pair comprises a transition from st and a state following the transition (i.e. the state transitioned to). The find_transition_states procedure returns (transition, state) pairs for transitions matching the input symbol sy. Where sy is a literal symbol, then find_transition_states returns (transition, state) pairs for any transition from st corresponding to a symbol matching the literal symbol sy, and any transition from st that corresponds to a wildcard symbol. Where sy is itself a wildcard symbol, then find_transition_states returns (transition, state) pairs for all transitions from st corresponding to literal symbols, and any transition from st that corresponds to a wildcard symbol. Thus, in effect, find_transition_states provides a set of (transition, state) pairs for all transitions from st 'matching' the symbol sy, with such matching taking account of wildcards in either or both the symbol sy and the symbols corresponding to the transitions from the state st. The particular implementation of the find_transition_states procedure will be apparent to those skilled in the art on the basis of the teachings herein and will not be described further here.

```
1   Algorithm 2: Find_Failure_States
2   Globals: failure_set of failure mappings (failure state,
        {guard_stack}, output size); stack
3   Input: state state; suffix a₁...aₙ
4   begin
5       transitionStates ← find_transition_states (state, a₁)
6       if transitionStates = { } then return
7       else
8       begin
9           for each (T, state_T) pair in transitionStates
10          begin
11              if a₁ = wildcard then push T to stack
12              if n=1 then
13              begin
14                  output ← | state_T.output |
15                  failure_set ← failure_set ∪ (state_T, stack,
                        output )
16              end
17              else Find_Failure_States (state_T, a₂..aₙ)
18              if a₁ = wildcard then pop stack
19          end
20      end
21      return
22  end
```

The Find_Failure_States algorithm of Algorithm 2 is an exemplary recursive algorithm for populating the set of failure state mappings, failure_set 410, for a state (the mapped state) in the directed graph of the pattern matching machine 204. Find_Failure_States accepts as input a state, state, in the directed graph from which the algorithm will search for a suitable failure state. The algorithm further accepts as input a proper suffix as a set of symbols $\{a_1 \ldots a_n\}$. Arguments for these input parameters are indicated in FIG. 16 and, on initial invocation of the Find_Failure_States algorithm for a mapped state, the arguments correspond to the start state of a directed state graph for the pattern matching machine 204 and a proper suffix for a symbol pattern. The algorithm further refers to 'global' variables failure_set (initialized at 1606 of FIG. 16 and structured as described above) and stack (initialized at 1614 of FIG. 16, and being a stack data structure). The global nature of these variables means that the values of these variables persists and is shared between invocations of the Find_Failure_States algorithm for a state for which failure states are sought.

At line 5, the algorithm obtains a set of (transition, state) pairs for all transitions from state that match a first symbol in the input suffix, $a_1$. This is achieved by way of the find_transition_states procedure described above, and the resulting set of (transition, state) pairs is stored in transitionStates. If transitionStates is determined to be an empty set { }, the algorithm returns at line 6 since such an empty set indicates there are no states corresponding to the first symbol of the suffix $\{a_1 \ldots a_n\}$ and, accordingly, the current state, state, cannot constitute a failure mapping for the suffix. In the alternative, from line 8, an iteration is initiated through each (transition T, state $state_T$) pair in transitionStates. At line 11, if the first symbol $a_1$ of the suffix is a wildcard then the transition T is pushed to stack. If the length of the suffix $\{a_1 \ldots a_n\}$ is determined to be 1 at line 12, then $state_T$ constitutes a failure state for the mapped state. In this case, the algorithm determines the size of the output function (e.g. the number of output symbol sequences in the set of output symbol sequences 408, or in some embodiments, the length of the longest output symbol sequence) for $state_T$ and adds a new failure mapping triple to failure_set at line 15. The new failure mapping triple includes the current state, state, the contents of the stack, stack, (copied by value), and the determined size of the output function.

At line 17, where the length of the suffix $\{a_1 \ldots a_n\}$ is determined to be other than 1, the algorithm recurses with arguments $state_T$ and the suffix $\{a_2 \ldots a_n\}$. Subsequently, if the first symbol $a_1$ of the suffix is a wildcard, then the transition T that was pushed to stack at line 11 is popped at line 18. On completion of the iteration of lines 9 to 19 the algorithm returns at line 21.

The Find_Failure_States algorithm is effective at identifying, by recursion through the entire state graph for a pattern matching machine 204, all possible failure states in a directed graph for a given state. In doing so, the algorithm further identifies, for each failure state mapping, the guard stack C defining the conditions for wildcard pattern symbols in order for a failure transition to be permitted. Further, the algorithm identifies, for each failure state mapping, a size, F, of an output symbol set for the pattern matching machine 204 in use to determine if a failure state for a state generates an output, and for determining how much of a historical input sequence of symbols is required to constitute the output.

Since the Find_Failure_States algorithm identifies all possible failure states in a directed graph for a given state, the resulting set of failure state mappings, failure_set 410 can include multiple failure state mappings each being applicable for a particular input symbol sequence. For example, a first failure state mapping can include a guard stack having a literal symbol condition, and a second failure state mapping can include a guard stack having a wildcard symbol condition. Such multiply applicable failure state mappings arise due to the support for wildcard symbol patterns in accordance with the present disclosure. When processing an input symbol sequence and needing to choose between two equally applicable failure state mappings, the pattern matching machine 204 will always choose a failure state mapping having a guard stack C containing the most literal symbols over any other failure state mapping having a guard stack C containing fewer literals (having, instead, more wildcards). Where two failure state mappings have guard stacks with the same number of literals, the longest guard stack (accounting for literals and wildcards) can be selected.

A prioritization method can be employed at a runtime of the failure function 208 of the pattern matching machine 204 to determine, where multiple failure state mappings exist in a failure_set having identical guard stacks C, which failure state mapping should take precedence. In any event, according to embodiments of the present disclosure, a failure mapping state corresponding to a greatest number of literal symbols in a symbol pattern will take precedence.

In one embodiment, the methods of FIGS. 10, 11 and 16 are further adapted to identify and define cross-referenced output states for states in a state graph from which a wildcard transition originates. Thus, in one embodiment, FIG. 11 is adapted such that the test of step 1106 is omitted to ensure an ordered set of proper suffixes is generated for all states, irrespective of a following wildcard in a symbol pattern. Subsequently, for prefixes followed by a wildcard in the symbol pattern, an ordered set of proper suffixes is marked, tagged or otherwise indicates as being for the identification of cross-referenced output states only, and not for the identification of failure state mappings. Further, the method of FIG. 16 is adapted such that step 1618 is conditional on the absence of an indication that a suffix is for cross-referenced output states only. Further, the method of FIG. 16 is supplemented such that, for a suffix having an indication that it is for cross-referenced output states only, a 'crossreferenced_set' can be defined to include failure states identified by the Find_Failure_States algorithm. Preferably, the crossreferenced_set has a structure that is similar to a failure_set including a failure state, a guard stack and an output size (failure state, {guard_stack}, output size). In an alternative embodiment, a crossreferenced_set can be defined for all states including all failure states and, for states being followed by a wildcard transition, states that would constitute failure states for another (cross-referencing) state in the graph except that it does not constitute a failure state for the cross-referencing state because the cross-referencing state is a state from which a wildcard transition originates.

This complexity shall now be considered in detail by way of example with reference to the second set of exemplary symbol patterns below and FIG. 17.

xa.c
ab
a.cd

Figure 17:
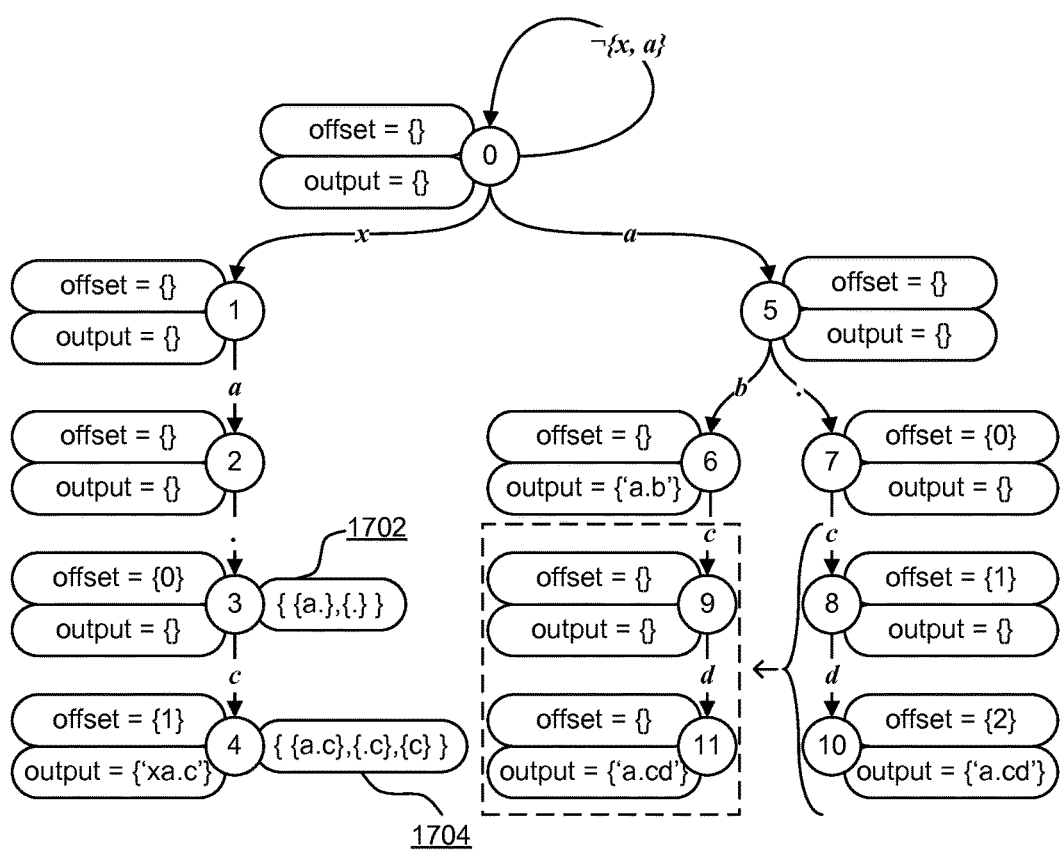
FIG. 17 depicts a state graph of a pattern matching machine in accordance with an embodiment of the present disclosure.

FIG. 17 depicts a state graph of a pattern matching machine 204 in accordance with an embodiment of the present disclosure. The directed state graph of FIG. 17 constitutes the goto function g 206 and is generated from the second set of exemplary symbol patterns using the Generate_goto_function of Algorithm 1. It can be seen from FIG. 17 that states '3', '4', '7', '8' and '10' include offset values in each set of offsets 406 respectively to indicate the offset location of a wildcard symbol in a symbol pattern prefix. Further, states '4', '6' and '10' include output symbols in each set of output symbol sequences 408 corresponding to the complete symbol patterns 'xa.c', 'ab' and 'a.cd' respectively.

It can also be seen that state '5' includes a first literal transition to state '6' corresponding to literal symbol 'b', and a second wildcard transition to state '7'. Further, state '7' includes a literal transition to state '8'. As previously described, in the situation where a directed graph of a pattern matching machine 204 includes a state having both a literal and wildcard transition, such as state '5', post-processing is performed to adapt the goto_function g 206 to copy all states and transitions that occur subsequent to the wildcard transition to also occur subsequent to all literal transitions originating from the same state as the wildcard transition. Thus, the state '8', the transition corresponding to the symbol 'c' leading to state '8', the state 10, and the transition corresponding to the symbol 'd' leading to state '10' are each copied to occur subsequent to state '6' by creating new states '9' and '11' and new transitions from state '6' to state '9' corresponding to the symbol 'c' and from state '9' to state '11' corresponding to symbol 'd'. The states and transitions copied are indicated in FIG. 17 within the dashed box. Additionally, the set of output symbol sequences 408 for the copied state '8' is reproduced for the new state '8'. However, notably, the set of offsets 406 for the copied states '8' and '10' are adapted, for the new states '9' and '11', to accommodate the fact that the new states '9' and '11' are subsequent to a literal transition from state '5' corresponding to symbol 'b' as opposed to a wildcard transition. Thus, in use, the pattern matching machine 204 having the directed state graph of FIG. 17 includes a goto function g 206 operating in accordance with the graph of FIG. 17 and selecting state transitions corresponding to literal symbols in preference to state transitions corresponding to wildcard symbols.

FIG. 17 further indicates the ordered set of proper suffixes of prefixes generated by the method of FIG. 11 for each state corresponding to all or part of the first exemplary symbol pattern 'xa.c'. Thus, state '4' has associated the ordered set of proper suffixes 1704 {{a.c}, {c}, {c}}, and state '3' has associated the ordered set of proper suffixes 1702 {{a.}, {.}}. State '2' is not eligible for failure state mapping since it has a subsequent state accessible via a wildcard transition. It will be appreciated that similar ordered sets of proper suffixes will be generated for states '6' to '11' though these are omitted for clarity.

The method of FIG. 16 will now be considered for the arrangement of FIG. 17 to demonstrate the determination of a set of failure state mappings, failure_set 410 for a first of the ordered set of proper suffixes, being the set of proper suffixes for state '4'. Starting with ordered set {{a.c}, {.c}, {c}} at 1602, 1604 determines the current state associated with the ordered set as state '4'. Subsequently, at 1606, the set of failure state mappings, failure_set 410 for state '4' is initialized to an empty set { }. At step 1608 the method iterates through each proper suffix in the set {{a.c}, {.c}, {c} in descending length order starting with proper suffix 'a.c'. At 1614 an empty stack 0 is initialized and at 1616 the Find_Failure_States algorithm (Algorithm 2) is invoked sending the start state '0' for the directed graph and the current proper suffix 'a.c' as arguments. The Find_Failure_States algorithm populates the failure_set 410 with failure states for the current state '4'. The detailed operation of the Find_Failure_States algorithm for the arguments '0' (start state) and 'a.c' (suffix) is illustrated in FIGS. 18a to 18d, with each of FIGS. 18b to 18d corresponding to one recursive execution of the Find_Failure_States algorithm. Line numbers of the Find_Failure_States algorithm, Algorithm 2, are included in parentheses to the left of each status step in each of FIGS. 18a to 18d.

With reference to FIG. 18a the Find_Failure_States algorithm is initially invoked for state '0' and suffix 'a.c'. Accordingly, the length of the suffix, n, is 3. At line 5, the transitionStates is determined to be {{'a', '5'}} and the algorithm iterates through each entry in the transitionStates set from line 9. At line 17 the algorithm recurses by calling Find_Failure_States with the arguments ('5', '.c'), resulting in the execution depicted by FIG. 18b.

With reference to FIG. 18b, the Find_Failure_States algorithm is invoked for state '5' and suffix '.c' and the transitionStates set is determined to be {{'b', '6'}, {'7', '.'}} at line 5. Line 9 iterates through each element in the transitionStates set, initially {'b', '6'}. Since the initial suffix symbol $a_1$ is a wildcard symbol the transition for the current element in the transitionStates set, 'b', is pushed to the stack at line 11. Subsequently, at line 17, the algorithm recurses by calling Find_Failure_States with the arguments ('6', 'c'), resulting in the execution depicted by FIG. 18c.

With reference to FIG. 18c, the Find_Failure_States algorithm is invoked for state '6' and suffix 'c' and the transitionStates set is determined to be {{'c', '9'}} at line 5. Line 9 iterates through each element in the transitionStates set, i.e. only element {'c', '9'}. Since the suffix length in FIG. 18c is 1 (n=1), the algorithm determines the size of the set of output symbol sequences 408 at line 14. The set of output symbol sequences for state '9' is empty. At line 15 a new failure mapping is added to the failure_set, the new failure mapping being characterized by the triple ('9', {'b'}, 0) (i.e. the failure state is state '9', the guard stack is {'b'}, and the size of the output function of the failure state is 0). Subsequently, at line 21, the algorithm returns to its caller, FIG. 18b.

Returning to FIG. 18b, the recursion to FIG. 18c resulted in the set of failure state mappings comprising the set {('9', {'b'}, 0)}. At line 18 the stack is popped, and the iteration proceeds to the next element in the transitionStates set, {'.', '7'} at line 9. Since the initial suffix symbol $a_1$ is a wildcard symbol '.', the transition for the current element in the transitionStates set, '.', is pushed to the stack at line 11. Subsequently, at line 17, the algorithm recurses by calling Find_Failure_States with the arguments ('7', 'c'), resulting in the execution depicted by FIG. 18d.

With reference to FIG. 18d, the Find_Failure_States algorithm is invoked for state '7' and suffix 'c' and the transitionStates set is determined to be {{'c', '8'}} at line 5. Line 9 iterates through each element in the transitionStates set, i.e. only element {'c','8'}. Since the suffix length in FIG. 18c is 1 (n=1), the algorithm determines the size of the set of output symbol sequences 408 at line 14. The set of output symbol sequences for state '8' is empty. At line 15 a new failure mapping is added to the failure_set, the new failure mapping being characterized by the triple ('8', {'.'}, 0) (i.e. the failure state is state '8', the guard stack is {'.'}, and the size of the output function of the failure state is 0). Subsequently, at line 21, the algorithm returns to its caller, FIG. 18b.

Returning to FIG. 18b, the recursion to FIG. 18c resulted in the set of failure state mappings comprising the set {('9', {'b'}, 0), ('8', {'.'}, 0)}. At line 18 the stack is popped, and the iteration ceases at line 19. Subsequently, at line 21, the algorithm returns to its caller, FIG. 18a.

Returning to FIG. 18a, the recursion to FIG. 18b resulted in the set of failure state mappings comprising the set {('9', {'b'}, 0), ('8', {'.'}, 0)}. The iteration ceases at line 19. Subsequently, at line 21, the algorithm returns to its caller, step 1616 of FIG. 16.

On completion of 1616 of FIG. 16, and execution of the Find_Failure_States algorithm (Algorithm 2) as depicted in FIGS. 18a to 18d, the set of failure state mappings, failure_set 410 for state '4' of FIG. 17 is determined to be {('9', {'b'}, 0), ('8', {'.'}, 0)}. Thus two failure mappings are provided, one to state '9' with the guard stack C indicating that the value of an input symbol corresponding to the wildcard in transition to state '3' must be 'b'. The second failure mapping maps to state '8' with the guard stack C indicating that the value of an input symbol corresponding to the wildcard transition to state '3' must be '.'. It can therefore be seen that, with the directed state graph of FIG. 17, state '4' has two failure state mappings having equally applicable for an input symbol 'b' corresponding to the wildcard transition to state '3'. Thus the set of failure state mappings 410 needs to be prioritized. In undertaking such prioritization a failure state mapping to a failure state corresponding to more literal symbol pattern symbols takes precedence over a failure state corresponding to fewer literal symbol pattern symbols. Thus, failure mapping to state '8', which corresponds to symbol pattern 'a.c' is given a lower precedence in favor of failure mapping to state '9' which corresponds to symbol pattern 'abc' because pattern 'abc' includes fewer wildcards (indeed no wildcards).

It will be appreciated by those skilled in the art that the deduplication may be undertaken partly or entirely as part of the process of generating the set of failure state mappings 410, such as part of the method of FIG. 16 or as part of the Find_Failure_states algorithm, Algorithm 2, such that post-processing deduplication can be avoided.

Figure 19:
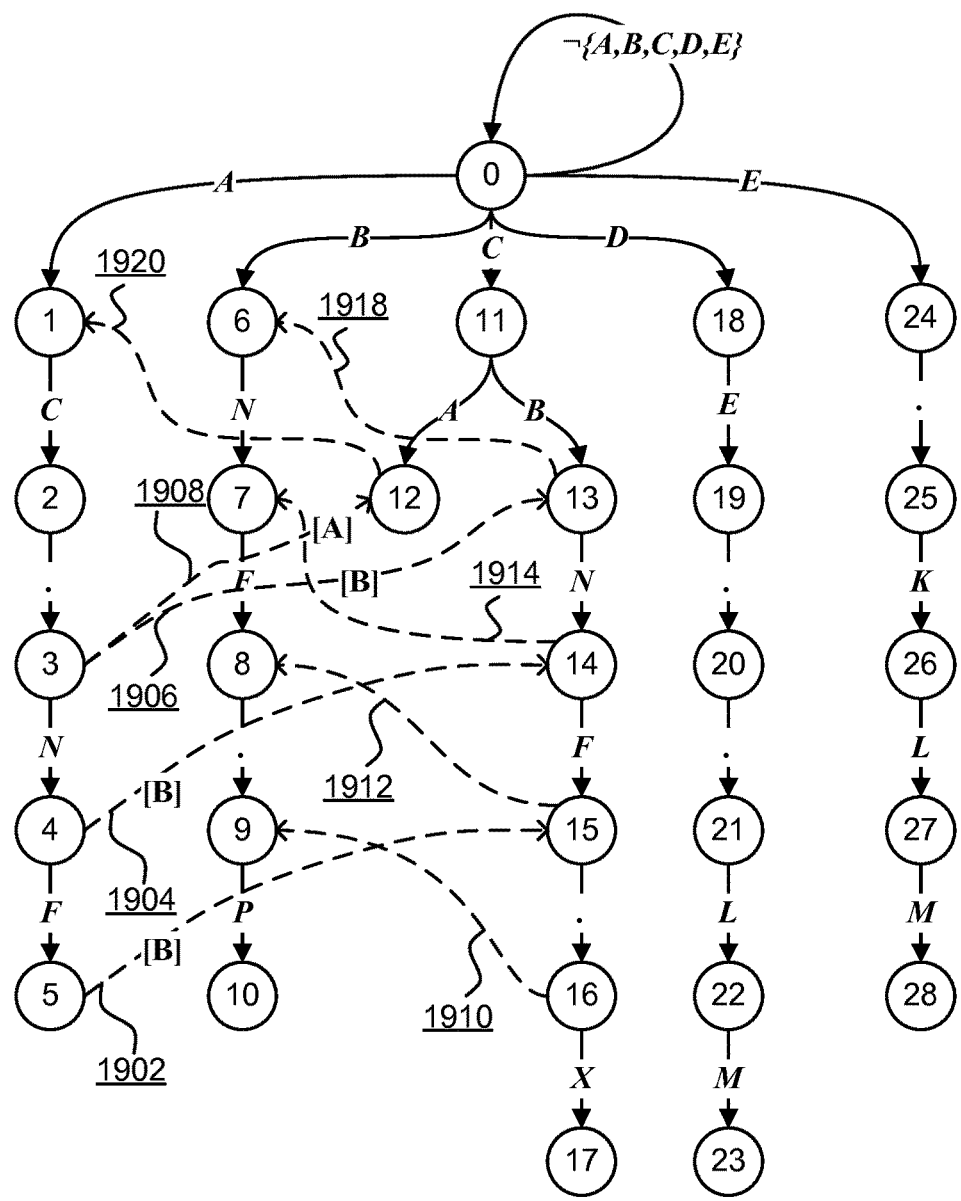
FIG. 19 depicts a state graph of a pattern matching machine with failure states in accordance with an embodiment of the present disclosure.

For completeness, the directed graph of states for the first exemplary set of symbol patterns illustrated in FIG. 9 is reproduced in FIG. 19 with failure state mappings indicated as directed broken lines between states. The failure state mappings are determined in accordance with the methods of FIGS. 10, 11, 16 and Algorithm 2. In particular, state '5' has a failure mapping 1902 to state '15' with the guard stack {'B'}. State '4' has a failure mapping 1904 to state '14' with the guard stack {'B'}. State '3' has a failure 1906 mapping to state '13' with the guard stack {'B'} and a second failure mapping 1908 to state '12' with the guard stack {'A'}. State '16' has an unconditioned failure mapping 1910 to state '9' (i.e. with an empty guard stack { }). State '15' has an unconditioned failure mapping 1912 to state '8'. State '14' has an unconditioned failure mapping 1914 to state '7'. State '13' has an unconditioned failure mapping 1918 to state '6'. State '12' has an unconditioned failure mapping 1920 to state '1'.

Figure 20:
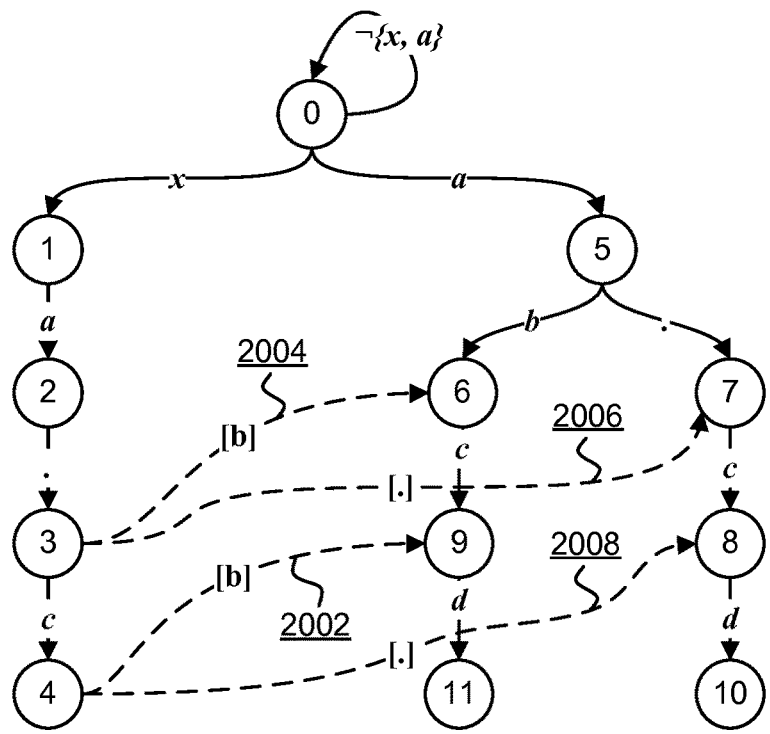
FIG. 20 depicts a state graph of a pattern matching machine with failure states in accordance with an embodiment of the present disclosure.

Similarly, the directed graph of states for the second exemplary set of symbol patterns illustrated in FIG. 17 is reproduced in FIG. 20 with failure state mappings indicated as directed broken lines between states. State '4' has a failure mapping 2002 to state '9' with the guard stack {'b'}. State '4' also has a failure mapping 2008 to state '8' with the guard stack {'.'}. State '3' has a failure mapping 2004 to state '6' with the guard stack {'b'}. State '3' also has a failure mapping 2006 to state '7' with guard stack {'.'}.

In use, by the pattern matching machine 204, the set of failure state mappings failure_set 410 is used by the failure function 208 to determine a failure state for a current state in the state machine in the event that the goto function g 206 returns fail for an input symbol in an input symbol sequence. Algorithm 3 provides an exemplary failure function 208 and will now be considered in detail. The failure function 208 of algorithm 3 receives, as input, a current state of the pattern matching machine 204 and an input symbol context as a set of h most recent input symbols. The selection of a magnitude of h can be regarded as a design choice to balance execution efficiency against reliability. Alternatively, the magnitude of h can be determined based on the cardinalities of the output functions determined for, and stored in, each failure mapping as described above. In a further alternative, the magnitude of h can be determined based on a measure of an extent or span of the directed graph for the pattern matching machine 204. Thus, in use, the failure function 208 receives a current state, state, and a symbol set $\{a_{m-h} \ldots a_m\}$ where m corresponds to an index of a most recently received symbol in the input symbol sequence. The failure function 208 also accesses a set of failure state mappings, failure_set 410 for the state, state, and further the set of offsets 406 $\{O_1 \ldots O_n\}$.

```
1  Algorithm 3: failure // return failure state for a current state and input
      symbol context
2  Input: state state, input string a_{m-h}...a_m
3  Returns: failure state
4  begin
5    for each failure mapping, (S, {C_1, ...C_n}, F), in state.failure_set
6    begin
7      i ← 1
8      while ( i ≤ n and (C_i = wildcard or a_{m-On} = C_i) ) then i ←
           i + 1
9      if i > n then return S // failure transition found (S)
10   end
11   return start state
12 end
```

Considering Algorithm 3, initially at line 5 the algorithm initiates an iteration through each failure mapping in the set of failure state mappings 410 for the current state, state, each failure mapping being characterized as (S, $\{C_1, \ldots C_n\}$, F), where $\{C_1 \ldots C_n\}$ is a set of guard symbols C, or conditions, to be applied to a historical input symbol sequence in order to permit a transition to the failure state S. At line 7 a counter i is initialized to 1 and a nested loop is initiated at line 8 to iterate while the counter is less than or equal to the number of guard symbols, n, in the current failure mapping. Further, the nested loop of line 8 only iterates while the current guard symbol $C_i$ is a wildcard (i.e. where the input symbol is of no significance to the guard state condition) or, alternatively, while a historical input symbol at the offset indicated in the nth element of the set of offsets 406 ($a_{m-On}$) matches the current guard symbol $C_i$. Thus, the value of the counter i increments only while the relevant historical input symbols a match the required guard symbols C (or while guard symbols are wildcards). Accordingly, i will exceed n only if all guard symbol C conditions are satisfied. This is tested at line 9 which concludes, in response to a positive determination, that S is a suitable failure transition for the current state, state, and the historical input symbol sequence $\{a_{m-h} \ldots a_m\}$. Where such a positive determination is not made, the algorithm returns the start state by default as a failure state at line 11.

It will be appreciated that the failure function 208 of Algorithm 3 does not take account of multiple failure state mappings being equally applicable for an input symbol context due to a failure state mapping having wildcards in the guard stack C. In this regard a modified version of the failure algorithm 208 is provided as Algorithm 3.1.

```
1  Algorithm 3.1: failure // return failure state for a current state and
      input symbol context
2  Input: state state, input string a_{m-h}...a_m
3  Returns: failure state
4  begin
5    applicable_failure_mappings ← { }
6    for each failure mapping, (S, {C_1, ...C_n}, F), in state.failure_set
7    begin
8      i ← 1
9      while ( i ≤ n and (C_i = wildcard or a_{m-On} = C_i) ) then
           i ← i + 1
10     if i > n then
             applicable_failure_mappings ←
                applicable_failure_mappings ∪ S
11   end
12   if applicable_failure_mappings ≠ { }
13   begin
14     return failure mapping in applicable_failure_mappings
               having state stack containing greatest number of
               literal symbols
15   end
16   else return start state
17 end
```

The failure function 208 of Algorithm 3.1 creates a set of applicable_failure_mappings populated with each failure mapping in the failure_set having a state stack C that is satisfied by the input symbol context. Subsequently, at line 14, the algorithm identifies and returns a failure mapping from the set of applicable_failure_mappings that has a state stack containing the greatest number of literal symbols. In this way, failure mappings with a greater number of literal symbols take precedence over failure mappings with fewer literal symbols when the pattern matching machine 204 transitions to a failure state for a state.

In one embodiment, to improve the efficiency of the technique, the failure state mappings can be sorted in the set of failure state mappings 410 such that the set 410 is an ordered set ordered by the number of literal guard stack symbols C in each failure state mapping. In this way, a selection of a failure state mapping having a greatest number of literal guard stack symbols C would be identified first.

In use, by the pattern matching machine 204, the set of failure state mappings failure_set 410 is further used by the output function 210 to determine set of output symbol sequences 408 corresponding to matching symbol patterns 202 in an input symbol sequence 202. Algorithm 4 provides an exemplary output function 210 and will now be considered in detail. The output function 210 of algorithm 4 receives, as input, a current state of the pattern matching machine 204 and an input symbol context as a set of h most recent input symbols. The selection of a magnitude of h is discussed above with respect to the failure function 208. Thus, in use, the output function 210 receives a current state, state, and a symbol set $\{a_{m-h} \ldots a_m\}$ where m corresponds to an index of a most recently received symbol in the input symbol sequence. The output function 210 further accesses: a set of failure state mappings, failure_set 410 for state; a set of offsets 406 $\{O_1 \ldots O_n\}$ for state; and a set of output symbol sequences 408 $\{Q_1 \ldots Q_r\}$ for state.

```
1   Algorithm 4: Output function // provides set of output symbol
        sequences for a state
2   Input: state state, input string a_{m-h}...a_m
3   Returns: set of output symbol sequences for a state
4   begin
5       output_set = { }
6       for each symbol sequence, Q, in the set of output symbol
            sequences {Q_1...Q_r}
7       begin
8           P ← Q
9           for i ← 1 to n do P_{r-Oi} ← a_{m-Oi}
10          output_set ← output_set ∪ { P_1...P_r }
11      end
12      for each failure mapping, (S, {C_1, ...C_n}, F ), in state.failure_set
13      begin
14          if F ≠ 0 then
15          begin
16              i ← 1
17              while ( i ≤ n and (C_i = wildcard or a_{m-On}= C_i) )
                    then i ← i + 1
18              if i > n then
19              begin
20                  for each symbol sequence, L, in the set
                            of symbol sequences {L_1...L_r} for S
21                  begin
22                      k ← length of L
23                      output_set ← output_set ∪ { a_{m-k} ... a_m }
24                  end
25              end
26          end
27      end
28      return output_ set
29  end
```

Considering Algorithm 4, initially at line 5 the algorithm initiates an output set of output symbol sequences to an empty set { }. Subsequently, at line 6, the algorithm initiates an iteration through each symbol sequence, Q, in the set of output symbol sequences $\{Q_1 \ldots Q_r\}$ 408. For each symbol sequence, Q, the algorithm copies the set of output symbols to P at line 8 (this preserves the integrity of the set of output symbol sequences 408). At line 9 the algorithm initiates an iteration through each of the n offsets in the set of offsets 406 $\{O_1 \ldots O_n\}$, each offset corresponding to the position of a wildcard symbol in the symbol sequence corresponding to state. For each offset, at line 9, the algorithm substitutes the wildcard symbol in the symbol sequence ($P_{r-Oi}$) for a symbol at the corresponding offset in the set of historical input symbols ($a_{m-Oi}$). Thus, the symbols sequence P is modified to reflect the historical input symbols $\{a_{m-h} \ldots a_m\}$ in place of wildcard symbols. Subsequently, at line 10, the modified symbol sequence is added to the output set.

At line 12, the algorithm initiates an iteration through each failure mapping in the set of failure state mappings 410 for state, each failure mapping being characterized as (S, $\{C_1, \ldots C_n\}$, F), where $\{C_1 \ldots C_n\}$ is a set of guard symbols C, or conditions, as described above with respect to Algorithm 3. At line 14 the algorithm determines if the failure mapping relates to a state, S, having a non-empty set of output symbol sequences.

At line 16 a counter i is initialized to 1 and a nested loop is initiated at line 17 to iterate while the counter is less than or equal to the number of guard symbols, n, in the current failure mapping. Further, the nested loop of line 17 only iterates while the current guard symbol $C_i$ is a wildcard or, alternatively, while a historical input symbol at the offset indicated in the nth element of the set of offsets 406 ($a_{m-On}$) matches the current guard symbol $C_i$. Thus, the value of the counter i increments only while the relevant historical input symbols a match the required guard symbols C (or while guard symbols are wildcards). Accordingly, i will exceed n only if all guard symbol C conditions are satisfied. This is tested at line 18 which concludes, in response to a positive determination, that the historical input symbols match the failure state S and the set of output symbol sequences for the failure state S are occasioned for output by the historical input symbols. Accordingly, a loop is initiated at line 20 through all symbol sequences in the set of symbol sequences 408 for state S. For each symbol sequence, a number of historical bytes corresponding to the length of the symbol sequence are added to the output set at lines 22 and 23. Finally, at line 28, the output_set is returned.

Thus the Algorithm 4 builds the output_set from: the set of output symbol sequences of a current state, state; and the set of output symbol sequences of each state, S, in the failure_set for the current state, state, which is an 'occasioned failure state'. An occasioned failure state is a state, S, for which the historical input symbol sequence $\{a_{m-h} \ldots a_m\}$ satisfies the guard stack $\{C_1 \ldots C_n\}$ at the wildcard offsets $\{O_1 \ldots O_n\}$ for state. That is to say that an occasioned failure state is a state in the goto graph corresponding to a proper suffix of the output symbol sequence of the current state, state.

In one embodiment the Algorithm 4 is adapted, at line 12, to parse additionally (or alternatively, depending on the arrangement such as an arrangement in which all failure mappings are also included as cross referenced output states) a crossreferenced_set of cross referenced output states at line 12 (or in addition to the iteration of lines 12 to 27) so as to identify and output occasioned cross referenced states generating an output. Notably, output will be generated for cross-referenced states as states for which a historical input symbol sequence $\{a_{m-h} \ldots a_m\}$ satisfies a guard stack $\{C_1 \ldots C_n\}$ at the wildcard offsets $\{O_1 \ldots O_n\}$ according to a cross referenced state definition ('occasioned' cross-referenced states).

Figure 21:
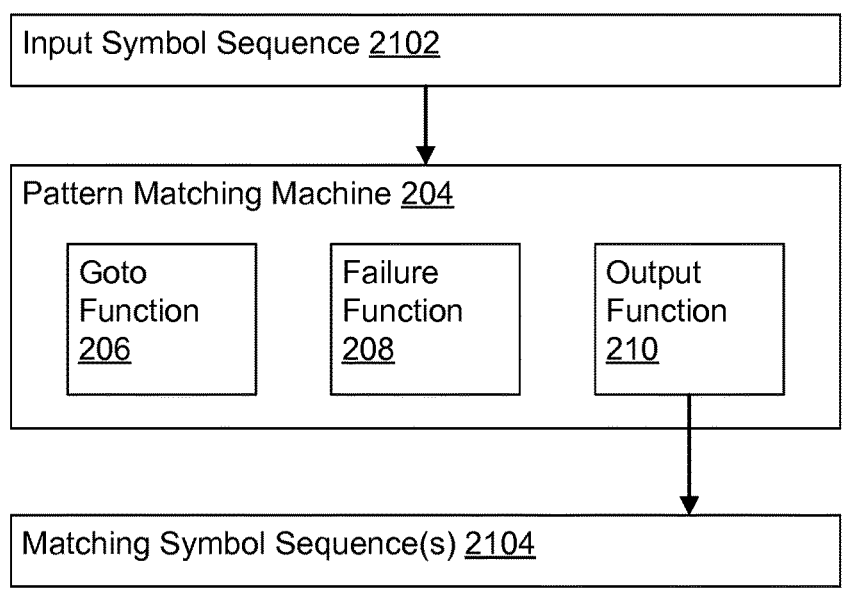
FIG. 21 is a schematic illustration of a pattern matching machine in use for identifying matching symbol sequences in an input symbol sequence in accordance with an embodiment of the present disclosure.

FIG. 21 is a schematic illustration of a pattern matching machine 204 in use for identifying matching symbol sequences 2104 in an input symbol sequence 2102 in accordance with an embodiment of the present disclosure. In an embodiment, the pattern matching machine 204 is generated by the pattern matching machine generator 200 of FIG. 2 as described above. In use, the pattern matching machine receives input symbols $\{t_1 \ldots t_n\}$ and outputs sequences of input symbols matching symbol patterns 202 represented by the pattern matching machine 204. Algorithm 5 provides an exemplary method of the pattern matching machine and will now be described. The algorithm receives, as input, a sequence of input symbols $\{t_1 \ldots t_n\}$.

```
1    Algorithm 5: pattern_matching_machine
2    Input: input symbol sequence t₁ ... tₙ
3    begin
4        state ← start state
5        for i ← 1 until n do
6        begin
7            while g(state, tᵢ) = fail do state ← failure (state, tᵢ₋ₕ...tᵢ)
8            state ← g(state, tᵢ)
9            if Output(state) ≠ { }
10           begin
11               for all output sequences, S, in output_set do print S
12           end
13       end
14   end
```

Initially, at line 4, the current state of the pattern matching machine 204 is set to a start state of a state machine. At line 5 an iteration is initiated for all symbols in the input symbol sequence. At line 7 a nested iteration is initiated, invoking the goto function g 206 for the current state, state, and the current input symbol $t_i$. While the goto function g 206 returns fail, the pattern matching machine transitions to a failure state determined by the failure function 208 (Algorithm 3). Where the goto function g 206 does not return fail, the pattern matching machine 204 transitions to the state returned by the goto function g 206 at line 8. At line 9 the pattern matching machine 200 invokes the output function 210 for the current state, state, and where this provides a non-empty set of output symbol sequences 408, these are printed by way of the loop of line 11.

In one embodiment, the efficiency of operation of the pattern matching machine 204 can be further improved by indicating, for states having no failure state mappings, that the failure function will be unsuccessful. Such an indication can be stored with a state, or alternatively can be readily discerned by the set of failure state mappings 410. On an affirmative determination that there are no failure state mappings, the entirety of the failure function 208 processing can be avoided (or, alternatively, the determination that there are no failure state mappings can be conducted as an initial part of the failure state function 208).

Figure 22:
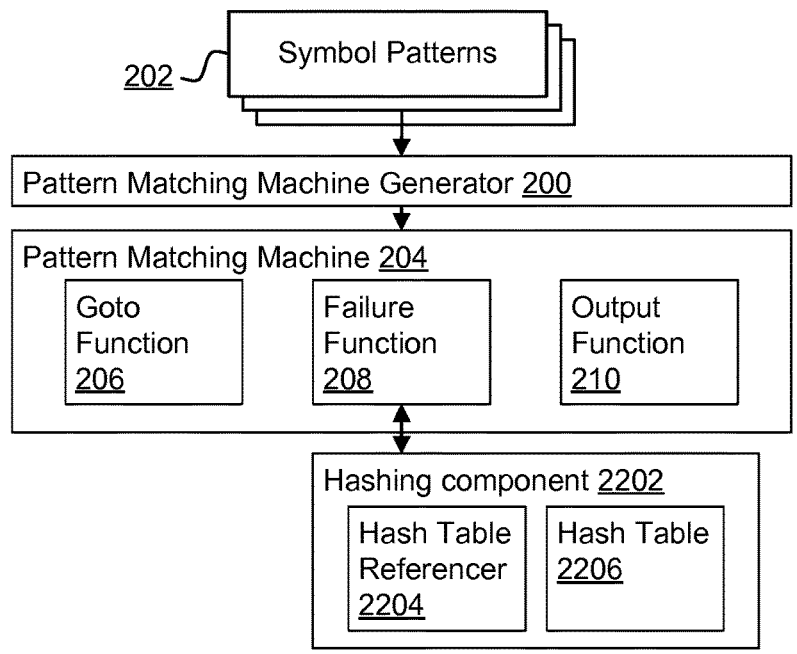
FIG. 22 is a schematic illustration of a pattern matching machine generator for generating a pattern matching machine in accordance with an embodiment of the present disclosure.

FIG. 22 is a schematic illustration of a pattern matching machine generator 200 for generating a pattern matching machine 204 in accordance with an embodiment of the present disclosure. Many of the features of FIG. 22 are identical to those described above with respect to FIG. 2 and these will not be described further here. Additionally, the pattern matching machine generator 200 is further adapted to generate failure function 208 and output function 210 suitable for referring to a hashing component 2202 for identifying a failure state for the pattern matching machine 204 in use executing in a state with a particular input symbol context. The hashing component 2202 is a software or hardware component including a hash table referencer 2204 for referencing and retrieving a failure state from a hash table 2206 on the basis of a hashing key. The hashing key is generated by the hash table referencer 2204 based on information supplied by the pattern matching machine 204 in use for matching symbol patterns 202 in an input symbol sequence.

The hash table 2206 is prepopulated by the pattern matching machine generator 200 when the pattern matching machine 204 is generated. When a failure state mapping is identified as part of the pattern matching machine generation process (as hereinbefore described), the failure state mapping is added to the hash table 2206 by generating a key for the hash table on the basis of a unique identifier of a state for which the failure state mapping applies and the guard stack symbols. A reference to the failure state of the failure state mapping is then stored in the hash table 2206 at a location identified on the basis of the generated key. Subsequently, at a runtime of the pattern matching machine 204 and in response to the goto function g 206 returning fail, the failure function 208 generates a hash table key on the basis of: a unique identifier of a current state of the pattern matching machine 204, such as the unique identifier 404 for state 402; and an input symbol context comprising symbols in the sequence of input symbols corresponding to the set of offsets 406. The unique identifier and the input symbol context, when taken together, uniquely identify a current state of the pattern matching machine 204 and the criteria for transitioning to a failure state based on an input symbol context. In particular, the input symbol context corresponds to the input symbols required for comparison with guard stack symbols, C, for a failure state mapping. Where the guard stack for all failure state mappings in the set of failure state mappings 410 is determinate, i.e. the guard stack consists exclusively of literal symbols, then the key for accessing the hash table will also be determinate, and the hashtable 2206 can be accessed with the key to identify a failure state for the pattern matching machine 204.

However, the guard stack for a failure state mapping can itself be indeterminate, such as the guard stack for the failure state mappings 2008 and 2006 in the exemplary embodiment of FIG. 20. These guard stacks include a wildcard symbol. The input symbol context corresponding to the value of input symbols used to transition along a failure state mapping having a guard stack with a wildcard symbol cannot be determined until a runtime of the pattern matching machine 204. Accordingly, the use of a guard stack to generate a key for a hashtable in order to lookup a failure state for a state and input symbol context is not possible, since the hashtable cannot be prepopulated when the pattern matching machine 204 is generated since the key requires an input symbol context.

To address these challenges the inventors have realized numerous advantageous modifications to the above described embodiments.

In one advantageous modification, the failure function is adapted to refer to a hash table using a key based on an input symbol context consisting of input symbols at offsets for only non-wildcard guard stack symbols. In this way, wildcard symbols in a guard stack are ignored and the generation of a hash key becomes determinate, both during hash table generation 2206 and at a runtime of the pattern matching machine 204. In one embodiment, to improve the efficiency of the technique, the failure state mappings can be sorted in the set of failure state mappings 410 such that the set 410 is an ordered set ordered by the number of literal guard stack symbols C in each failure state mapping. In this way, a selection of a failure state mapping having a greatest number of literal guard stack symbols C would be identified first. This also increases a likelihood that a number of wildcard guard stack symbols is reduced.

In an alternative modification, the set of failure state mappings, failure_set 410 is enhanced. In particular, the set of failure state mappings, failure_set 410, is enhanced to further exclude all wildcard guard stack symbols C. In this way, the guard stack symbols, C, for each failure state becomes determinate. However, the number of guard stack symbols, C, in each failure state mapping for a single state in the state machine may vary. Consequently, the enhanced set of failure state mappings, failure_set 410, must be provided as described below.

In accordance with the present embodiment, the failure state mappings, failure_set 410 for a state takes the enhanced form of a set of zero or more quadruples:

$$\{(S_1, \{C_1 \ldots C_a\}, F_1, \{Y_1 \ldots Y_a\}), \ldots (S_p, \{C_1 \ldots C_b\}, F_p, \{Y_1 \ldots Y_b\})\}$$

where S, $\{C_1 \ldots C_n\}$ and F correspond to a failure state, guard stack and output set size as previously described, except that the guard stack is always devoid of wildcard symbols. Additionally, the enhanced failure_set includes a set of offsets $\{Y_1 \ldots Y_n\}$ corresponding to offsets as a set of zero or more numerical offset values. Each offset in the set Y indicates a relative location, in an input symbol sequence received by the pattern matching machine 204 in use, to a symbol having been received in the input symbol sequence. In particular, the offsets $\{Y_1 \ldots Y_n\}$ indicate offsets of input symbols received by the pattern matching machine 204 to be used for comparing with the guard stack $\{C_1 \ldots C_n\}$ to determine if a failure state mapping is permitted by an input symbol context. Notably, the number, n, of offsets Y for a failure state mapping in failure_set must match the number, also n, of symbols C in the guard stack. The value of n can vary for different failure state mappings in a failure_set for a state in the state graph because guard stack symbols C, for a failure state mapping that correspond to wildcard symbols, are excluded from the guard stack. Accordingly, a failure state, S, corresponding to pattern symbols including one or more wildcard symbols that would, using the earlier described embodiments, constitute part of the guard stack C, are excluded from the guard stack in accordance with the present embodiment. In this way, wildcard symbols in a guard stack are ignored and the generation of a hash key becomes determinate, both during hash table generation 2206 and at a runtime of the pattern matching machine 204.

Thus, with the aforementioned advantageous adaptations to the arrangement of embodiments of the present disclosure, a hash table 2206 can be employed to provide timely access to a failure state mapping for a pattern matching machine 204 at runtime.

As noted above, in one embodiment, the efficiency of operation of the pattern matching machine 204 can be further improved by indicating, for states having no failure state mappings, that the failure function will be unsuccessful. Such an indication is particularly beneficial for avoiding hash table lookups unnecessarily when it is known, ahead of time (as part of the pattern matching machine 204 generation) that no failure states exist.

The illustrative failure and output functions of Algorithms 3, 3.1 and 4 and the adapted failure and output functions described above with respect to FIG. 22 are effective for realizing advantages of the present disclosure of providing pattern matching for symbol patterns having wildcards. However, these described embodiments suffer inefficiencies. The failure and output functions are used at time of executing a pattern matching automaton (i.e. at 'match' time) and the process of disambiguating output patterns and failure states by verifying qualification criteria for received symbols by way of guard stacks involves iterative or recursive methods that require considerably greater execution workload and resources (including execution time) as a number of wildcard symbols increases. Further, there can be a need to repeatedly re-read received input symbols, incurring further iteration, repetition and resource consumption (including execution time and input/output operations). Since these processes take place at match time such inefficiencies can have an unacceptable impact on the performance of the pattern matching process in use. This is much less satisfactory than any performance impact of a generation process for generating a pattern matching machine, which occurs prior to use of the machine to identify symbol pattern matches.

In particular, the failure function of Algorithm 3 involves nested loops through: a set of failure mappings for a current state (line 5); and a set of symbol conditions in a guard stack for each failure mapping (corresponding to a number of wildcards existing in a branch of the automaton). Accordingly, the worst-case time complexity of Algorithm 3 is a function of a number of failure mappings and a number of wildcards (corresponding to entries in each guard stack). Further, the improved failure function of Algorithm 3.1 in which all possible failure mappings are identified and a mapping with a greatest number of literal symbols is selected exhibits even more unacceptable worst-case time complexity. In particular, the arrangements of Algorithms 3 and 3.1 require repeated references to historical input string characters ($a_{m-h} \ldots a_m$) to undertake the tests of Algorithm 3 line 8 and Algorithm 3.1 line 9.

Similarly, the output function of Algorithm 4 exhibits similarly unacceptable worst-case time complexity as a function of a number of symbol sequences in an set of output symbol sequences for a state (line 6), a number of failure state mappings (line 12), a number of wildcards for checking the guard stack (line 17) and a number of symbol sequences in the output set of failure states (line 20). Further, the algorithm 4 should be enhanced to include cross referenced output states (preferably in place of the iteration through failure mappings at step 12), contributing to worst case time complexity. The output function of Algorithm 4 also requires repeated references to historical input string characters ($a_{m-h} \ldots a_m$) to undertake the steps of line 9, 17 and 23.

Further, the use of a hash table 2206 as described above still results in high worst case time complexity. The hash table 2206 is used to map a current state to a failure state based on input characters in positions corresponding to wildcard states for the current state. This approach also requires references to historical input string characters every time a failure state mapping needs to be identified, such references can be iterative, repetitious and constitute an overhead.

Accordingly embodiments of the present disclosure provide improvements to the storage and selection of failure state mappings and cross referenced output states (output state mappings). For clarity, in the remainder of this specification the following terms may be used to describe states in a state machine or automaton:

A state is said to "follow" a transition if the transition leads to the state. Thus, the state 402 in FIG. 4 can be described as following the transition 412.

A state is said to "precede" or "have" a transition if the transition leads from the state. Thus the state 402 in FIG. 4 can be described as preceding the transition 414. Further, the state 402 in FIG. 4 can be described as having the transition 414.

A parent of a particular state is a state preceding a transition to the particular state.

A child of a particular state is a state following a transition from the particular state.

Sibling states are states following transitions that originate from a common state.

An ancestor of a particular state is a state from which the particular state is reached following one or more transitions.

A descendant of a particular state is a state following one or more transitions from the current state.

A branch of an automaton is a set of all transitions and states occurring subsequent to an identified state of transition of the automaton.

In one embodiment, the pattern matching machine is supplemented by a second directed graph state machine or automaton of states, hereinafter a disambiguation automaton. The disambiguation automaton is a state machine of states and directed transitions between states corresponding to disambiguation patterns built from a standard alphabet (i.e. without special metacharacters such as wildcards). The disambiguation patterns include sequences of symbols that, when used to traverse wildcard transitions in a pattern matching state machine, satisfy failure state mapping conditions and output state mapping conditions as cross referenced output states (i.e. satisfy a guard stack). That is to say that the disambiguation patterns are symbol sequences generally corresponding to a guard stack as hereinbefore described. Where the guard stack itself includes wildcard characters (arising where a failure state for a current mapped state corresponds to a symbol sequence having a wildcard at an equivalent offset to a wildcard in the symbol sequence for the mapped state), then the sequence of symbols that is the guard stack is divided at the wildcard (discarding the wildcard) to generate two disambiguation patterns. The disambiguation automaton is thus generated from all disambiguation patterns for all states in the pattern matching automaton. Each state in the disambiguation automaton corresponds to a symbol in a disambiguation symbol pattern and has associated an indication of one or more states in the pattern matching automaton to which it relates, such states being states immediately following wildcard transitions (informally referred to as 'wildcard states'). In one embodiment the indication of one or more wildcard states in the pattern matching machine for a disambiguation automaton state is provided by way of references to depths of the wildcard states in the pattern matching automaton, such as a depth measured by a number of wildcard states from a start state of the pattern matching automaton, as will be described in detail below.

In use to identify symbol patterns in an input sequence, the disambiguation automaton is traversed at the same time as the pattern matching automaton except that the disambiguation automaton is only traversed (i.e. transitions are only followed) when wildcard transitions are traversed in the pattern matching automaton. Accordingly, the disambiguation automaton is traversed for symbols representing wildcard symbols in the pattern matching automaton. Thus the disambiguation automaton enters states corresponding to disambiguation patterns when input symbols corresponding to wildcard transitions in the pattern matching automaton satisfy failure or output mapping conditions (akin to the guard stack). Such traversal of the disambiguation automaton thus occurs with linear time complexity during the traversal of the pattern matching automaton.

Thus a set of disambiguation patterns represented in the disambiguation automaton, each associated with references to appropriate wildcard states in the pattern matching automaton at which such patterns should be identified, is suitable for disambiguating input symbols received for wildcard symbols in the pattern matching automaton in linear time. To take advantage of the disambiguation automaton, the states of the pattern matching automaton need to be modified to identify conditional failure state mappings having conditions relating to a state of the disambiguation automaton. Similarly, the states of the pattern matching automaton need to be modified to identify conditional output state mappings having conditions relating to a state of the disambiguation automaton. Such conditional mappings in the states of the pattern matching automaton need only identify states in the disambiguation automaton corresponding to complete disambiguation patterns. Further, such conditional mappings in the states of the pattern matching automaton obviate the need for an offset set 406 and a failure set 410 associated with states of the pattern matching machine.

Recall, from the discussion above of the embodiment with respect to FIG. 17, the issue of precedence of transitions for pattern matching automata including wildcard transitions, wherein precedence is handled by: a pattern matching automaton always taking a literal symbol transition in precedence over a wildcard transition; and states subsequent to a state immediately following a wildcard transition are duplicated under a sibling state of the state immediately following the wildcard transition. In contrast, embodiments employing conditional mappings and a second disambiguation automaton take an alternative approach to transition precedence in the pattern matching automaton. In embodiments with a disambiguation automaton the issue of transition precedence for a state having multiple transitions including a wildcard transition is eliminated. Where a state has multiple transitions including a wildcard transition and one or more literal symbol transitions, the literal symbol transitions are eliminated by combining the literal symbol transitions, and a branch of the automaton subsequent to each literal symbol transition, with the wildcard transition branch. Once so combined, output states for the original branches from literal transitions are encoded as conditional output mappings in the consolidated branch.

Figure 23A:
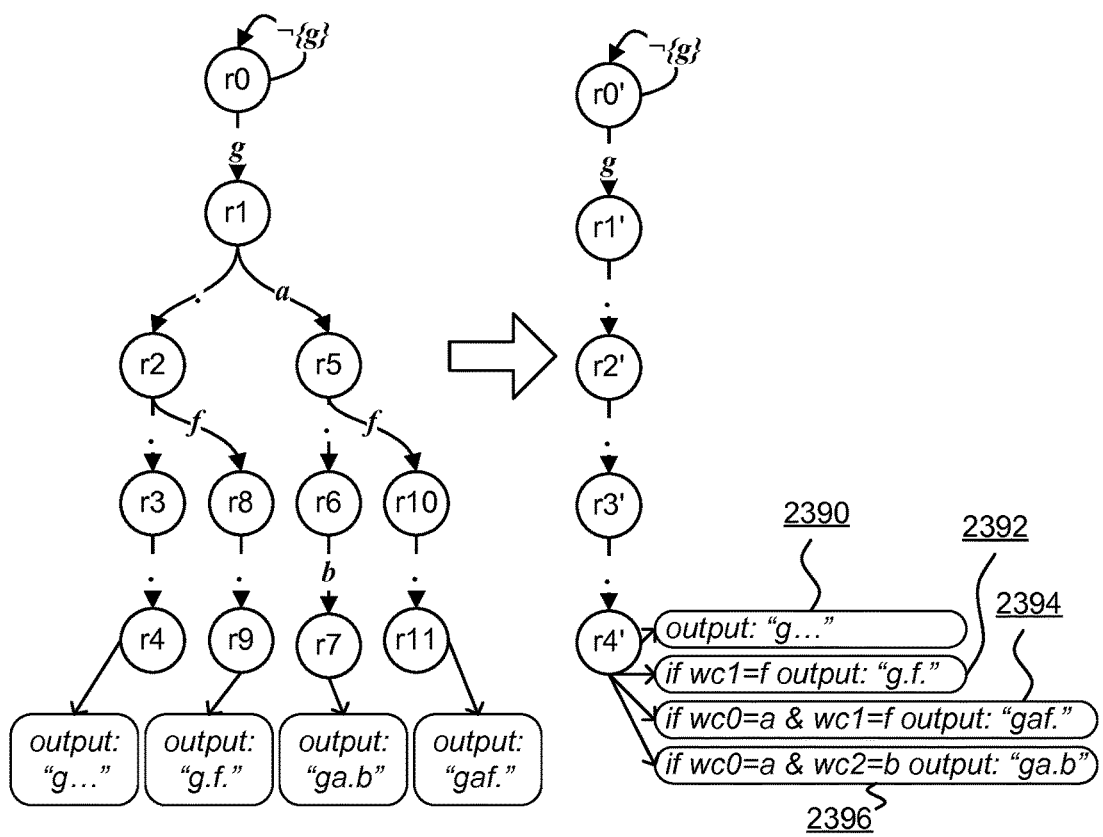
FIG. 23$a$ illustrates the consolidation of pattern matching automaton branches occurring subsequent to a literal transition with a branch occurring subsequent to a wildcard transition for a state having both the literal and wildcard transitions in accordance with embodiments of the present disclosure.

FIG. 23*a* illustrates the consolidation of pattern matching automaton branches occurring subsequent to a literal transition with a branch occurring subsequent to a wildcard transition for a state having both the literal and wildcard transitions in accordance with embodiments of the present disclosure. The pattern matching automata illustrated in FIG. 23*a* encode the same set of symbol patterns, these being:

g . . .
ga.b
g.f.
gaf.

The pattern matching automaton on the left of FIG. 23*a* is generated using techniques hereinbefore described. Thus it can be seen that the pattern "g . . . " is encoded by way of a sequence of states as r0, r1, r2, r3 and r4, with an output at state r4 of "g . . . " to indicate a match of the pattern "g . . . ". Similarly, the pattern "ga.b" is encoded by way of a sequence of states as r0, r1, r5, r6 and r7, with an output at state r7 of "ga.b". Similarly for the other patterns "g.f." and "gaf." sequences of states encode the patterns. Notably, state r1 has both a wildcard transition to state r2 and a literal transition for symbol "a" to state r5. Thus, in embodiments of the disclosure employing a disambiguation automaton, the branch from state r5 is to be combined with the branch from state r2. Such combining results in the automaton to the right of FIG. 23a comprising states r0' to r4'. However, in order to accommodate the matching of each of the separate regular expressions, note how the state r4' is now associated with conditional output mappings. Thus, state r4' includes an unconditional output 2390 of pattern "g . . . ". That is to say that the pattern matching automaton of FIG. 23a in state r4' will always match symbol pattern "g . . . " irrespective of the symbols received in an input symbol sequence corresponding to each wildcard. State r4' also includes four conditional output mappings 2392, 2394 and 2396, each defined with reference to one or more of the particular wildcard transitions in the pattern matching automaton. Notably, the wildcard transitions are numbered from zero to three starting with the wildcard transition nearest the start state. Thus: the transition from r1' to r2' is wildcard transition 0; the transition from r2' to r3' is wildcard transition 1; and the transition from r3' to r4' is wildcard transition 2. Thus, conditional output mapping 2392 generates an output for the automaton on the condition that the input symbol corresponding to wildcard transition 1 is "f". Similarly for the other conditional output mappings 2394 and 2396. In this way the pattern matching automaton to the left of FIG. 23a can be consolidated as the automaton to the right of FIG. 23a by the inclusion of conditional output mappings 2392, 2394 and 2396. The conditional output mappings are used to derive disambiguation patterns to constitute a disambiguation automaton for efficient checking of the satisfaction of conditions in the mappings using techniques described below. It will be appreciated by those skilled in the art that the consolidation of a pattern matching automaton can result in a consolidated automaton having conditional output mappings to reflect merged branches arising from literal transitions, where such merged branches are subsequently deleted from the automaton once merged with branches following wildcard transitions. Thus, while the term conditional "mapping" is used to refer to a mapping from a first node in the pattern matching automaton to a second node in the automaton, in the case of a consolidated pattern matching automaton the second state is actually deleted and will no longer exist and, therefore, the mapping is merely conceptual. This is supported by the inclusion of equivalent conditional output information for states in the consolidated automaton, which are output conditionally, to reflect the symbol patterns for the merged branches. Thus, in this context, the term conditional mapping is merely conceptual as a mapping to a state that existed before consolidation of an automaton but that will no longer exist after such consolidation, such mappings for the purpose of consolidation applying only to conditional output mappings (not conditional failure mappings).

It will be appreciated that the conversion of a pattern matching automaton to a consolidated automaton by merging branches following states arising after a literal transition with states arising after a wildcard transition can be performed in a number of ways. The pseudo code below illustrates an exemplary general approach, though other techniques will be apparent to those skilled in the art:

```
traverse all states in the automaton starting at a start state
    if the current state has a wildcard transition and literal
    transition(s)
    begin
        copy branch following state after literal transition (source
        branch) to state after wildcard transition (target branch)
        for output states in the source branch, add conditional output
        mappings in corresponding states of the target branch
        conditioned on a symbol corresponding to the literal transition
        delete the state after the literal transition and the source branch
        merge any pairs of duplicate states in the target branch occurring
        after the copy
    end
```

Figure 23B:
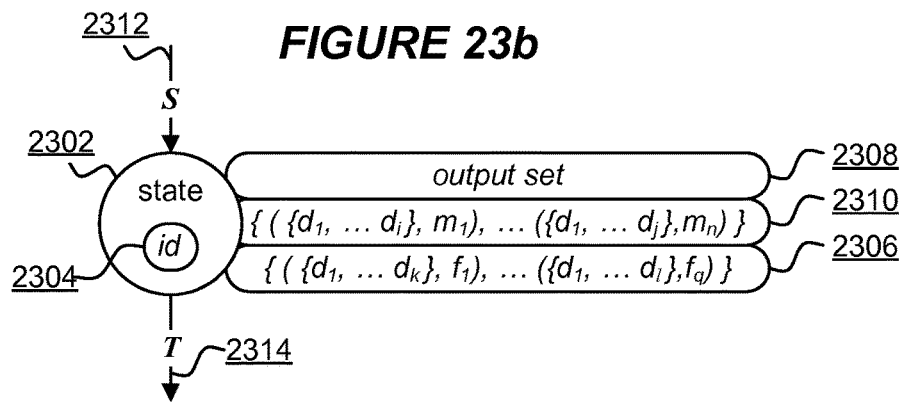

FIG. 23b is a conceptual diagram of a state 2302 of a pattern matching machine in accordance with an embodiment of the present disclosure. Many of the features of the state 2302 of FIG. 23b are identical to those described above with respect to FIG. 4. In contrast to the state of FIG. 4 the state 2302 of FIG. 23b has associated a conditional output set 2310 (conditional_output_set) and a conditional failure set 2306 (conditional_failure_set).

The conditional output set 2310 is a set of tuples $(\{d_1, \ldots d_i\}, m)$ where d in $\{d_1, \ldots d_i\}$ is, or is a reference to, a disambiguation pattern and m is a reference or mapping to, or identity of, another state in the pattern matching automaton (a cross referenced output state), the output function of such other state being conditionally occasioned when the pattern matching automaton is in the state 2302 because the other state represents a complete symbol pattern that is a suffix of a symbol sequence represented by the state 2302. In a preferred embodiment, m is a symbol sequence copied, derived or resulting from the output state of the other state. Thus, in use to identify symbol patterns in an input sequence, the conditional output set 2310 defines conditions by way of one or more ordered disambiguation patterns for each of one or more other states the output of which is conditionally occasioned when the pattern matching automaton enters the state 2302. Accordingly, when the pattern matching automaton enters the state 2302 it can check, for each tuple in the conditional output set 2310, if the disambiguation automaton has matched each disambiguation pattern in the tuple. Where the disambiguation automaton has matched each disambiguation pattern in the tuple in the correct order then the state or symbol pattern in the tuple can be output as a symbol match.

Similarly, The failure set 2306 is a set of tuples $(\{d_1, \ldots d_k\}, f)$ where d in $\{d_1, \ldots d_i\}$ is, or is a reference to, a disambiguation pattern and f is a reference or mapping to, or identity of, a failure state in the pattern matching automaton, the failure state being a state to which the pattern matching automaton transitions to in the event of a failure of the pattern matching automaton to transition to a subsequent state based on the directed transitions of the automaton and a received input symbol. Thus, in use to identify symbol patterns in an input sequence, the conditional failure set 2306 defines conditions by way of one or more ordered disambiguation patterns for each of one or more failure states as failure mappings. Accordingly, when the pattern matching automaton fails to transition from state 2302 on the basis of a received input symbol it can check, for each tuple in the conditional failure set 2306, if the disambiguation automaton has matched each disambiguation pattern in the tuple. Where the disambiguation automaton has matched each disambiguation pattern in the tuple in the correct order then the automaton transitions to the state indicated in the tuple as a failure state.

Figure 23C:
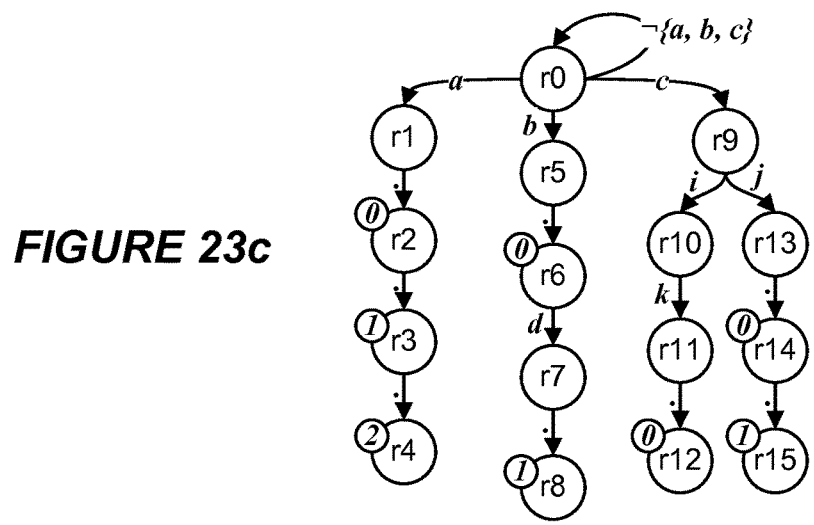

Notably, the disambiguation automaton only records a match of a disambiguation pattern when the disambiguation automaton traverses to a pattern match state for a particular disambiguation pattern and the pattern matching automaton is at a wildcard state indicated for the particular disambiguation pattern. In this way each disambiguation pattern, and therefore, each state in the disambiguation automaton corresponding to a complete disambiguation pattern, has associated an indication of one or more wildcard states in the pattern matching automaton at which the disambiguation pattern is validly identified. FIG. 23c illustrates an exemplary pattern matching machine including wildcard transitions to wildcard states in accordance with an embodiment of the present disclosure. As can be seen in FIG. 23c, states r2, r3, r4, r6, r8, r12, r14 and r15 immediately follow wildcard transitions in the automaton. Such states can be informally referred to as "wildcard states" (such states being states entered following receipt of an input symbol corresponding to a wildcard). Each wildcard state has associated a wildcard state reference as a depth of the wildcard state measured in a number of wildcard states from a start state, r0, of the automaton. Thus: state r2 is the first state in the branch (path) from r0 to r2 and has a wildcard state reference of '0' (indicated in a circle attached to the state r2); state r3 is the second state in the branch from r0 to r3 and has a wildcard state reference of '1'; State r6 is the first state in the branch from r0 to r6 and has a wildcard state reference of '0'; and so on for each of the other wildcard states. Such wildcard state references are used to indicate, in a disambiguation pattern automaton, wildcard states at which disambiguation patterns are validly found. In this way the particular wildcard states constituted by input symbols received by a pattern matching automaton can be checked as part of the conditional mappings.

Figure 24:
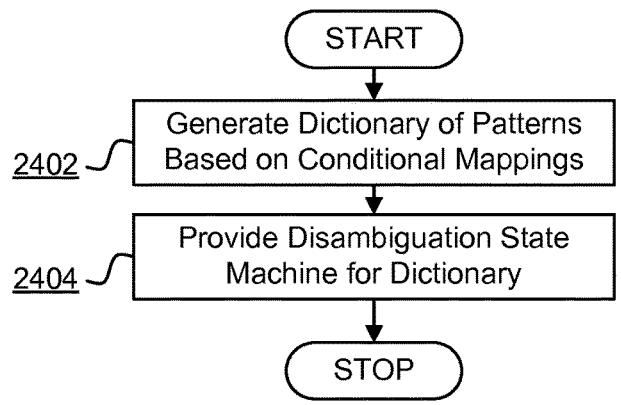
FIG. 24 is a flowchart of a method for generating a disambiguation automaton in accordance with an embodiment of the present disclosure.

FIG. 24 is a flowchart of a method for generating a disambiguation automaton in accordance with an embodiment of the present disclosure. Initially, at 2402, a dictionary of disambiguation patterns is generated. Each disambiguation pattern in the dictionary is a tuple of the form (P, $\{W_1, \ldots W_q\}$) where P is a disambiguation pattern and W is a wildcard state reference to a wildcard state in a pattern matching automaton at which the pattern P is validly matched. Disambiguation patterns are identified from the states of the goto graph constituting the pattern matching automaton using, for example, the generate_disam_dictionary of Algorithm 6 below. Subsequently, at 2402, a disambiguation state machine is generated as an Aho-Corasick automaton representing the disambiguation patterns in the dictionary.

```
1   Algorithm 6: generate_disam_dictionary
2   Global: disam_dictionary {(P, {W₁, ... W_q})₁, ... (P, {W₁, ... W_q})_r}
3   Input: state current_state
4   begin
5       for each suffix symbol pattern, suffix, of current_state do
6       begin
7           // populates a suffix_state_set of (state, guard_stack) tuples
            Identify_Suffix_States(start_state, suffix)
8           for each suffix_state in suffix_state_set
9           begin
10              add_to_disam = false
11              // populates disam_patterns as set of (pattern, wildcard state reference) pairs
                disam_patterns = Convert_GStack_to_DPatterns(suffix_state.guard_stack)
12              if Output(suffix_state) ≠ { }
13              begin
14                  add all symbol patterns in disam_patterns to
                                    conditional_output_set for current_state
                                    along with Output(suffix_state)
15                  add_to_disam = true
16              End
17              if current_state not followed by wildcard transition
18              begin
19                  add all symbol patterns in disam_patterns to
                                    conditional_failure_set for current_state
                                    along with suffix_state.state
20                  add_to_disam = true
21              end
22              if add_to_disam = true
23                  for each disam_pattern in disam_patterns
24                      if disam_dictionary ∌ disam_pattern then
                            disam_dictionary ∪=
                                (disam_pattern.pattern, {disam_pattern.wilcard_state_ref})
25                      else disam_dictionary.disam_pattern ∪=
                                    disam_pattern.wildcard_state_ref
26                  end // next disam_pattern
27          end // next suffix_state in suffix_state_set
28      end // next suffix symbol pattern of current_state
29  end
```

Algorithm 6 is an exemplary pseudo-code algorithm for a function generate_disam_dictionary to generate a disambiguation dictionary. The function takes as input a current state current_state in the pattern matching automaton. The function further references a global disam_dictionary as a set of symbol patterns $\{p_1, \ldots p_d\}$.

Initially, at line 5, the function determines the wildcard and the function initiates an iteration through each proper suffix symbol pattern, suffix, of current_state. A set of all proper suffix symbol patterns can be identified for a state as a set of symbol patterns constituting proper suffixes of a symbol pattern corresponding to current_state. The set of proper suffix symbol patterns can be identified using methods hereinbefore described (noting that all suffixes are identified, not excluding any suffixes such as those following a wildcard symbol). Subsequently, at line 7, a set of suffix state mappings, suffix_state_set, is identified for a current suffix. The suffix_state_set is a set of (state, guard_stack) tuples. Each tuple in the suffix_state_set includes a state mapping, state, in the pattern matching automaton corresponding to the suffix symbol sequence and a guard_stack of symbols defining the input symbols that must be received for wildcard transitions preceding the current_state for the state mapping to be valid (i.e. for the suffix state to be occasioned). Thus the suffix_state_set is similar to the failure_set described above (e.g. Algorithm 2). Algorithm 7 defines an exemplary Identify_Suffix_States function referenced at line 7 of Algorithm 6.

```
1   Algorithm 7: Identify_Suffix_States
2   Globals: suffix_state_set: {(state, guard_stack)₁, ... (state,
        guard_stack)ₘ}
3   Input: state state; suffix a₁...aₙ      // initially start at start_state
4   begin
5       transitionStates ← find_transition_states (state, a₁)
                                    // returns (transition T, state stateₜ) pairs
6       if transitionStates = { } then return
7       else
8       begin
9           for each (T, stateₜ) pair in transitionStates
10          begin
11              if a₁ = wildcard then push {T, a₁_depth} to stack
12              if n=1 then
13              begin
14                  // add state and guard_stack to suffix_state_set
15                  suffix_state_set ← suffix_state_set ∪ (stateₜ,
                        stack)
16              end
17              else Find_Failure_States (stateₜ, a₂..aₙ)
18              if a₁ = wildcard then pop stack
19          end
20      end
21      return
22  end
```

The Identify_Suffix_States algorithm of Algorithm 7 is an exemplary recursive algorithm for populating the set of suffix state mappings, suffix_state_set, for a state, state (the mapped state), in the pattern matching automaton. Find_Suffix_States, accepts as input a state, state, in the pattern matching automaton from which the algorithm will search for a suitable suffix_state. The algorithm further accepts as input a proper suffix as a set of symbols $\{a_1 \ldots a_n\}$. On initial invocation of the Find_Failure_States algorithm for a mapped state, the arguments correspond to the start state of a directed state graph (start_state) for the pattern matching machine 204 and a proper suffix for a symbol pattern. The algorithm further refers to 'global' variables suffix_state_set as a set of (state, guard stack) tuples, and stack. The global nature of these variables means that the values of these variables persists and is shared between invocations of the Find_Failure_States algorithm for a state for which failure states are sought.

Notably, the guard_stack of Algorithm 7 is enhanced over that previously described. Previously, guard_stack was an ordered set of zero or more symbols defining the conditions under which a failure state mapping is permitted. The guard stack of Algorithm 7 stores elements as tuples of the form (S, D) where S is a guard stack symbol (as previously described) and D is a depth of a wildcard state to which the guard stack symbol relates (in the branch of the mapped automaton state), the depth being measured as a number of wildcard states from a start state of a pattern matching automaton (as previously described for wildcard state references above). In this way a wildcard state reference for each symbol in a guard stack can be readily retrieved.

At line 5, the algorithm obtains a set of (transition T, state stateₜ) pairs for all transitions from state that match a first symbol in the input suffix, $a_1$ (where T is a symbol for a transition in a pattern matching automaton.) This is achieved by way of the find_transition_states procedure described above, and the resulting set of (transition, state) pairs is stored in transitionStates. If transitionStates is determined to be an empty set { }, the algorithm returns at line 6 since such an empty set indicates there are no states corresponding to the first symbol of the suffix $\{a_1 \ldots a_n\}$ and, accordingly, the current state, state, cannot constitute a mapping for the suffix. In the alternative, from line 8, an iteration is initiated at line 9 through each (transition T, state stateₜ) pair in transitionStates. At line 11, if the first symbol $a_1$ of the suffix is a wildcard then a new guard stack entry is pushed to the stack as a tupe (T, $a_1$_depth). The value of $a_1$_depth is a depth of the wildcard state in the branch of the pattern matching automaton for state and is measured as a number of wildcard states from a start state of a pattern matching automaton (as previously described for wildcard state references above).

At line 12, if the length of the suffix $\{a_1 \ldots a_n\}$ is determined to be 1 then stateₜ constitutes a suffix state for the mapped state. In this case, the algorithm adds a new suffix mapping tuple to suffix_state_set at line 15. The new failure mapping tuple includes the current state stateₜ and the contents of the stack, stack, (copied by value).

At line 17, where the length of the suffix $\{a_1 \ldots a_n\}$ is determined to be other than 1, the algorithm recurses with arguments stateₜ and the suffix $\{a_2 \ldots a_n\}$. Subsequently, if the first symbol $a_1$ of the suffix is a wildcard, then the transition T that was pushed to stack at line 11 is popped at line 18. On completion of the iteration of lines 9 to 19 the algorithm returns at line 21.

The Identify_Suffix_States algorithm is effective at identifying, by recursion through the entire state graph for a pattern matching automaton, all possible suffix states in a directed graph for a given state. In doing so, the algorithm further identifies, for each suffix_state mapping, a guard stack defining the conditions for wildcard pattern symbols in order for a failure transition to be permitted.

Returning now to the generate_disam_dictionary function of Algorithm 6, on completion of the Identify_Suffix_States function at line 7, a set of suffix states, suffix_state_set, is populated. An iteration is initiated at line 8 for each suffix state, suffix_state, in the suffix_state_set. Line 10 initializes an add_to_disam flag (set to false).

At line 11 the guard_stack for the current suffix_state is converted to a set of disam_patterns. Each element in the set of disam_patterns is a (pattern, wildcard state reference) such that the pattern is a pattern of symbol sequences corresponding to wildcard states in the pattern matching machine up to, and including, the wildcard state indicated by the wildcard state reference. In one embodiment a Convert_GStack_to_DPatterns function can be employed as outlined in Algorithm 8 that will now be described in detail.

```
1   Algorithm 8: Convert_GStack_to_DPatterns
2   Input: guard_stack          // set of (symbol, depth) pairs
3   Output: disam_pattern_set   // set of (pattern, wildcard state reference) pairs
```

```
4   Begin
5       disam_pattern_set = { }          // initialise
6       new_pattern = ('',-1)            // (pattern, depth)
7       for each tuple in guard_stack
8       do
9           if tuple.symbol = wildcard
10          begin
11              if new_pattern.pattern ≠ '' then disam_pattern_set ∪= new_pattern
12              new_pattern = ('',-1)    // reset
13          end
14          else
15          begin
16              append tuple.symbol to new_pattern.pattern
17              new_pattern.depth = tuple.depth
18          end
19      end
20      if new_pattern.pattern ≠ '' then disam_pattern_set ∪= new_pattern
21  End
```

The Convert_GStack_to_DPatterns function of Algorithm 8 converts a guard stack to a set of disam patterns. The function takes as input a guard_stack as a set of (symbol, depth) tuples such as are generated by the Identify_Suffix_States function of Algorithm 7. The Convert_GStack_to_D-Patterns function provides as outputs a disam_pattern_set as a set of disambiguation patterns structured in tuples as (pattern, wildcard state reference) pairs.

Initially, at lines 5 and 6, the Convert_GStack_to_DPatterns function initializes an empty disam_pattern_set and an empty new_pattern. The new_pattern is a single disambiguation pattern tuple comprising a symbol sequence and depth pair, initially set to an empty symbol sequence with a depth of −1 (to indicate empty). At line 7 the function initiates an iteration through all (symbol, depth) tuples in guard_stack. At line 9, if a symbol for a current tuple is a wildcard metacharacter the function proceeds to add a current new_pattern (if non-empty) to the disam_pattern_set. In this way guard stacks are split at wildcard boundaries with wildcards discarded such that a guard_stack including wildcards generates multiple disambiguation patterns for each set of non-wildcard symbols in the guard_stack split at the wildcards. The new_pattern is then reinitialized at 12.

Alternatively, if the symbol for a current tuple is not a wildcard metacharacter, the function proceeds to line 16 were a symbol for the current tuple in the guard stack is appended to the new_pattern disambiguation pattern, and the new_pattern depth is updated to a value of the depth of the current tuple. The method then reiterates, adding any final non-empty new_pattern to the disam_guard_set at line 20.

Thus the Convert_GStack_to_DPatterns function creates a set of disambiguation patterns, each pattern including a wildcard state reference. In particular, sequences of guard_stack entries are combined and added to disam_pattern_set. Where a sequence of guard_stack entries includes one or more wildcard symbols the guard stack is divided into multiple sub-sequences, being split at the wildcard symbols, and each of the sub-sequences is added to disam_pattern_set as a separate disambiguation pattern. The guard_stack entries corresponding to wildcard symbols are discarded and never included in disambiguation patterns in the disam_patterns_set.

Returning now to the generate_disam_dictionary function of Algorithm 6, the call to Convert_GStack_to_DPatterns at line 11 results in a set of disambiguation pattern tuples in disam_patterns. At line 12, the current suffix_state is checked to determine if it generates an output symbol pattern (i.e. if the state of the suffix_state corresponds to the identification of a match of a symbol pattern in the pattern matching automaton), such output being an unconditional output (i.e. not a conditioned output mapping). Where the state of the current suffix_state does generate a symbol pattern (indicated by a non-empty output set determined using the Output function as hereinbefore described) then the conditional output set (conditional_output_set) for current_state is updated to include the disambiguation patterns disam_patterns. Specifically, all symbol patterns from all tuples in disam_patterns are used to generate a set of disambiguation symbol patterns, and the set of disambiguation symbol patterns is added to the conditional output set with the output of the suffix_state (obtained by the Output function). In some embodiments, the disambiguation patterns (as symbol patterns) are not themselves included in the conditional_output_set and rather an identifier or reference to each disambiguation pattern is included in the conditional_output_set.

The add_to_disam flag is set to true at line 15 (disambiguation patterns need only be added to the disambiguation dictionary when they are used as part of a conditional failure mapping or a conditional output mapping).

At line 17 the function determines if the current_state has a (is immediately followed by a) wildcard transition. The pattern matching automaton will not fail to transition from a state having a wildcard transition and so there is no need to generate a failure mapping for such a state. Where the current_state is determined not to have a wildcard transition, then the conditional failure set (conditional_failure_set) for current_state is updated to include the disambiguation patterns disam_patterns. Specifically, all symbol patterns from all tuples in disam_patterns are used to generate a set of disambiguation symbol patterns, and the set of disambiguation symbol patterns is added to the conditional failure set with the state in the pattern matching machine associated with suffix_state (suffix_state.state). In some embodiments, the disambiguation patterns (as symbol patterns) are not themselves included in the conditional_failure_set and rather an identifier or reference to each disambiguation pattern is included in the conditional_failure_set. The add_to_disam flag is set to true at line 20 (disambiguation patterns need only be added to the disambiguation dictionary when they are used as part of a conditional failure mapping or a conditional output mapping).

Subsequently, at line 22, the function tests if add_to_disam is true, and where it is true, a loop is initiated at line 23 through each pattern in the disam_pattern set. For a current pattern at line 24, if the pattern is not in the disambiguation dictionary disam_dictionary, then a tuple is added to the disam_dictionary comprising: the symbol pattern (or, in some embodiments, an identifier or reference to it); and the wildcard state reference for the pattern.

If the pattern is determine, at line 24, to already exist in the disambiguation dictionary then the function adds only the wildcard state reference to the pattern tuple in the disambiguation dictionary at step 25.

The function then iterates through all disam_patterns for all suffix_states for all suffix symbol patterns of the current_state.

The generate_disam_dictionary function is executed for each state in the pattern matching automaton to generate a complete disambiguation dictionary disam_dictionary. The disambiguation dictionary is then used to generate a disambiguation automaton.

Figure 23D:
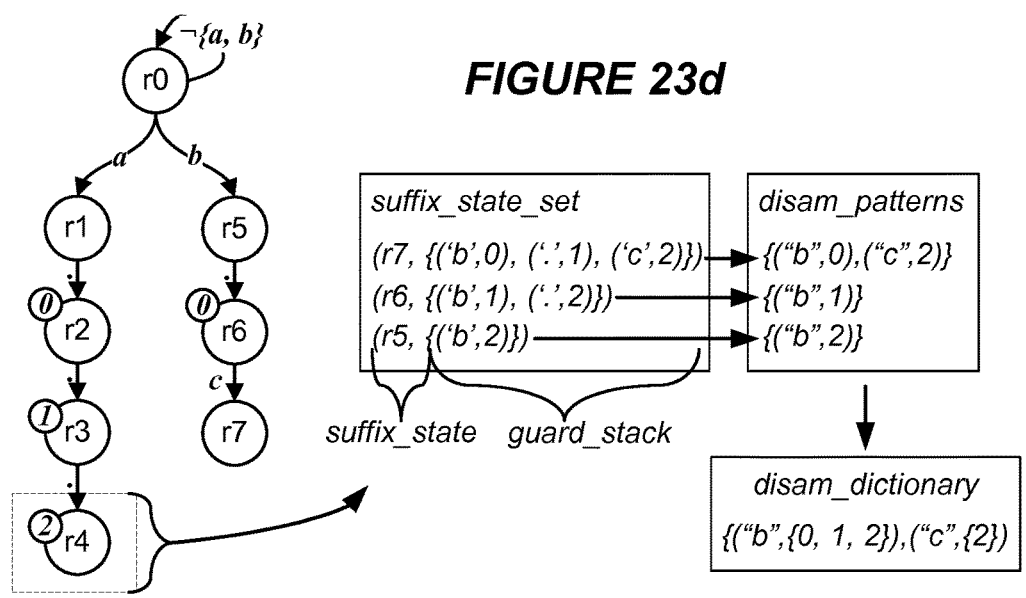

FIG. 23*d* illustrates a process for generating a disambiguation dictionary entry for a state in an exemplary pattern matching automaton in accordance with an embodiment of the present disclosure. The automaton of FIG. 23*d* represents two pattern symbol sequences, "a . . . " and "b.c" and FIG. 23*d* illustrates a disambiguation patterns including a set of disambiguation patterns generated only for state r4. Initially a suffix_state_set is generated for r4 (such as by way of the Identify_Suffix_States function). The suffix_state_set includes three suffix states r7, r6 and r5, each having a guard stack respectively. For example, the guard stack associated with suffix_state r7 is a set of (symbol, wildcard state depth) tuples:

(r7, {('b',0), ('.',1), ('c',2)})

Thus, this guard stack indicates that conditional mappings may be appropriate from state r4 to state r7 if: an input symbol corresponding to wildcard state depth 0 is 'b'; an input symbol corresponding to wildcard state depth 1 is '.' (i.e. any symbol); an input symbol corresponding to wildcard state depth 2 is 'c'.

The suffix_state_set is then used to generate a set of disam_patterns (such as bay way of the Convert_GStack_to_DPatterns function) including, for example, a set of (pattern, wildcard state depth) tuples for the above guard stack:

{("b",{0, 1, 2}), ("c",{2})}

Subsequently, the disam_patterns are added to a disambiguation dictionary, disam_dictionary as (disambiguation pattern, set of wildcard state depth) pairs. Thus, the disam_dictionary for all disam_patterns for all entries in suffix_state_set for state r4 is:

{("b",{0, 1, 2}), ("c",{2})}

According to this disambiguation dictionary, two patterns are to be represented by a disambiguation automaton with pattern "b" being determined to be matched only where a pattern matching automaton is at a wildcard state of depth 0, 1 or 2, and with pattern "c" being determined to be matched only where the pattern matching automaton is at a wildcard state of depth 2.

Figure 25:
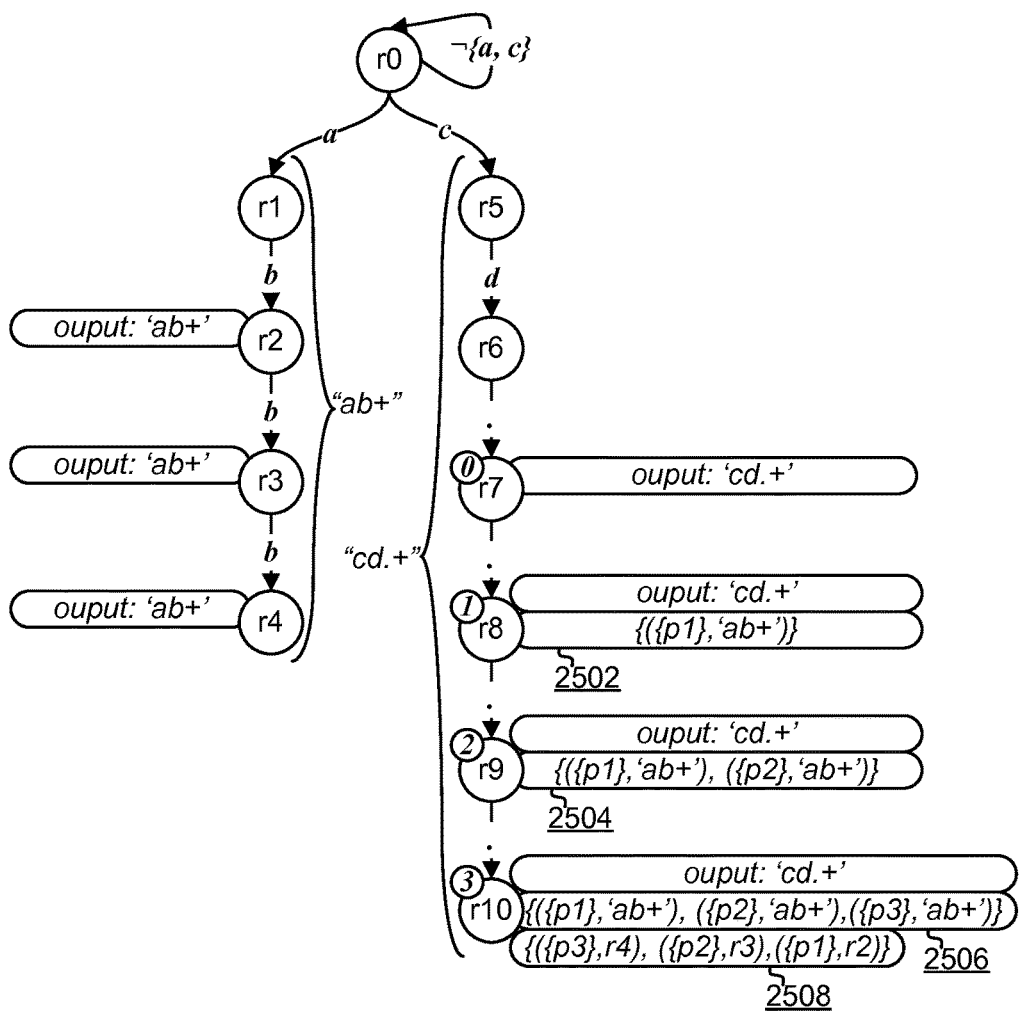
FIG. 25 illustrates a pattern matching automaton for symbol patterns "ab+" and "cd.+" in accordance with an embodiment of the present disclosure.

FIG. 25 illustrates a pattern matching automaton for symbol patterns "ab+" and "cd.+" in accordance with an embodiment of the present disclosure. The symbol patterns for the automaton of FIG. 25 include the "+" metacharacter which indicates an iteration or repetition of a preceding character. To ensure an automaton of finite depth, a maximum number of iterations has been imposed on each symbol patterns. In particular, the pattern "ab+" is defined to have a maximum span of four, meaning that there are a maximum of four transitions in the automaton. Thus, "ab+" with a maximum span of four serves to match the patterns:

ab
abb
abbb

Similarly, the pattern "cd.+" is defined to have a maximum span of six and serves to match the patterns:

cd.
cd..
cd . . .
cd . . . .

States of the automaton of FIG. 25 that correspond to pattern match states (at which a match of a symbol pattern is identified in an input symbol sequence) have output functions defined to generate an output indicating which symbol pattern is matched. Thus, states r2, r3 and r4 output "ab+" while states r7, r8, r9 and r10 output "cd.+". Further, following application of the generate_disam_dictionary of Algorithm 6, a disambiguation dictionary is generated containing disambiguation patterns:

ab matched when the pattern matching automaton is at wildcard state references 1, 2 or 3
abb matched when the pattern matching automaton is at wildcard state references 2 or 3
abbb matched when the pattern matching automaton is at wildcard state reference 3

Figure 26:
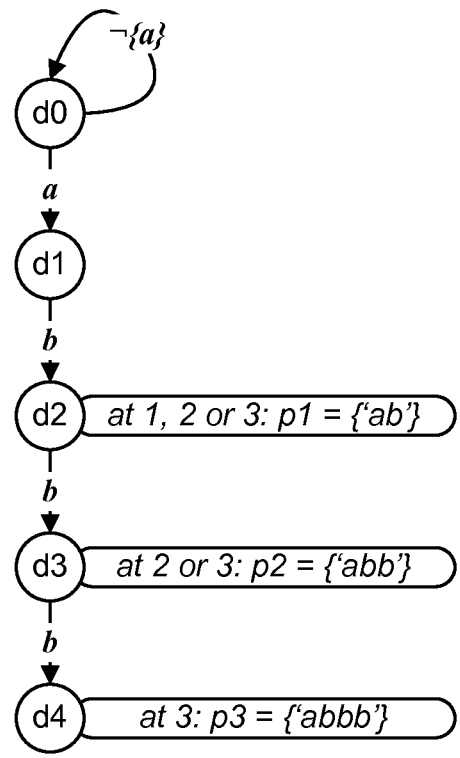
FIG. 26 illustrates an exemplary disambiguation automaton arising from the disambiguation dictionary generated for the pattern matching automaton of FIG. 25 in accordance with embodiments of the present disclosure.

FIG. 26 illustrates an exemplary disambiguation automaton arising from the disambiguation dictionary generated for the pattern matching automaton of FIG. 25 in accordance with embodiments of the present disclosure. The disambiguation automaton of FIG. 26 includes five states d0 to d4. States d2, d3 and d4 correspond to matches of disambiguation patterns: "ab" (referenced as pattern p1) only when the pattern matching automaton is at wildcard state references 1, 2 or 3; "abb" (referenced as pattern p2) only when the pattern matching automaton is at wildcard state references 2 or 3; and "abbb" (referenced as pattern p3) only when the pattern matching automaton is at wildcard state reference 3.

Returning to FIG. 25, a further effect of the generate_disam_dictionary function is that states r8, r9 and r10 have associated conditional output sets 2502, 2504, 2506 respectively. The conditional output set 2502 for state r8 includes a single output symbol sequence "ab+" conditioned on the disambiguation automaton having matched disambiguation pattern p1 (i.e. the disambiguation automaton having entered state d2 at match-time of the pattern matching machine when the pattern matching machine is at a wildcard state reference 1, 2 or 3). Thus, at pattern matching time of the pattern matching automaton and the disambiguation automaton, if the pattern matching automaton reaches state r8 and the disambiguation automaton has matched pattern p2 (="ab" at state d2) then the condition of the conditional output mapping in the set 2502 is satisfied and the pattern matching automaton will output the symbol sequence "ab+" to indicate that the symbol pattern "ab+" is matched by an input symbol set.

The conditional output set 2504 for state r9 includes a first output symbol sequence "ab+" conditioned on the disambiguation automaton having matched disambiguation pattern p1, and a second output symbol sequence "ab+" conditioned on the disambiguation automaton having matched disambiguation pattern p2. The conditional output set 2506 for state r10 includes three conditional outputs: a first output symbol sequence "ab+" conditioned on the disambiguation automaton having matched disambiguation pattern p1; a second output symbol sequence "ab+" conditioned on the disambiguation automaton having matched disambiguation pattern p2; and a third output symbol sequence "ab+" conditioned on the disambiguation automaton having matched disambiguation pattern p3. Recall that for the disambiguation automaton to be determined to have matched a disambiguation pattern, the pattern must be matched when the pattern matching automaton is in a qualifying wildcard state, indicated by the wildcard state references for each pattern match state of the disambiguation automaton.

State r10 further includes a conditional failure set 2508 as a result of the generate_disam_dictionary function. The conditional failure set 2508 for state r10 includes three failure state mappings: a first failure state mapping to state r2 conditioned on the disambiguation automaton having matched disambiguation pattern p1; a second failure state mapping to state r3 conditioned on the disambiguation automaton having matched disambiguation pattern p2; and a third failure state mapping to state r4 conditioned on the disambiguation automaton having matched disambiguation pattern p3. Notably, the failure state mappings in the conditional failure set 2508 can be ordered such that failure states corresponding to longer suffixes of a state (HO) are considered first.

The pattern matching automaton of FIG. 25 and the disambiguation automaton of FIG. 26 will now be considered, in use, for the input symbol sequence "cdaabb".

At the first symbol of the input symbol sequence ("c"), the pattern matching automaton enters state r5. The disambiguation automaton remain at start state d0 because the transition from the start state of the pattern matching automaton to state r5 is not a wildcard transition.

At the second symbol of the input sequence ("d"), the pattern matching automaton will enter state r6. Again, the disambiguation automaton does not change state since the transition from r5 to r6 is not a wildcard transition.

At the third symbol of the input symbol sequence ("a"), the pattern matching automaton will enter state r7. The transition from state r6 to r7 is a wildcard transition to a state having a wildcard state reference (depth) of 0. Accordingly, the disambiguation automaton is traversed. The input symbol corresponding to the wildcard transition is "a" and the disambiguation automaton enters state d1. Notably, at state r7 of the pattern matching automaton, an output function generates output symbol sequence "cd.+" indicating a pattern match. Thus, pattern "cd.+" is matched by the first three input symbols.

At the fourth symbol of the input symbol sequence ("a"), the pattern matching automaton will enter state r8. Again, the transition from state r7 to r8 is a wildcard transition, this time to a state having a wildcard state reference of 1. Accordingly the disambiguation automaton will seek to transition from state d1 on the basis of the input symbol corresponding to the wildcard transition which is "a". There is no transition in the disambiguation automaton from state d1 for an input symbol "a" and so the disambiguation automaton fails. Applying the Aho-Corasick approach to failure handling for pattern matching automata, an implicit suffix edge exists for failures from state d1 to the start state d0 of the disambiguation automaton. At state d0 the disambiguation automaton transitions to state d1 in accordance with the input symbol "a". Notably, at state r8 of the pattern matching automaton, an output function generates output symbol sequence "cd.+" indicating a pattern match. Thus, pattern "cd.+" is matched by the first four input symbols. Further, state r8 includes a conditional output set 2502 including a single conditional output mapping ({p1}, 'ab+'). The condition that the disambiguation automaton has matched disambiguation pattern p1 is not satisfied and the conditional output is not generated.

At the fifth symbol of the input symbol sequence ("b"), the pattern matching automaton will enter state r9. Again, the transition from state r8 to r9 is a wildcard transition, this time to a state having a wildcard state reference of 2. Accordingly the disambiguation automaton will seek to transition from state d1 on the basis of the input symbol corresponding to the wildcard transition which is "b". The disambiguation automaton enters state d2 accordingly. At state d2 the disambiguation automaton identifies a match of the disambiguation pattern "ab" (p1) since the wildcard state reference (2) is in the list of valid wildcard state references for state d2. Notably, at state r9 of the pattern matching automaton, an output function generates output symbol sequence "cd.+" indicating a pattern match. Thus, pattern "cd.+" is matched by the first five input symbols. Further, state r9 includes a conditional output set 2504 including two conditional output mappings ({p1}, 'ab+') and ({p2}, 'ab+'). The condition that the disambiguation automaton has matched disambiguation pattern p1 is satisfied and the conditional output "ab+" is generated. The condition for the other output mapping is not satisfied since disambiguation pattern p2 has not been matched by the disambiguation automaton.

At the sixth symbol of the input symbol sequence ("b"), the pattern matching automaton will enter state r10. Again, the transition from state r9 to r10 is a wildcard transition, this time to a state having a wildcard state reference of 3. Accordingly the disambiguation automaton will seek to transition from state d2 on the basis of the input symbol corresponding to the wildcard transition which is "b". The disambiguation automaton enters state d3 accordingly. At state d3 the disambiguation automaton identifies a match of the disambiguation pattern "abb" (p2) since the wildcard state reference (3) is in the list of valid wildcard state references for state d3. Notably, at state r10 of the pattern matching automaton, an output function generates output symbol sequence "cd.+" indicating a pattern match. Thus, pattern "cd.+" is matched by the six input symbols. Further, state r10 includes a conditional output set 2506 including three conditional output mappings ({p1}, 'ab+'), ({p2}, 'ab+') and ({p3}, 'ab+'). The condition that the disambiguation automaton has matched disambiguation pattern p2 is satisfied and the conditional output "ab+" is generated. Additionally, state r10 includes a conditional failure set 2508 including three conditional output mappings ({p3}, r4), ({p2}, r3) and ({p1}, r2). On any subsequent input symbol the pattern matching automaton will be unable to traverse from state r10 (there are no transitions from state HO) and a failure will result. Accordingly, the conditional failure set 2508 will be checked and since the disambiguation automaton has matched pattern p2, the failure mapping to state r4 in conditional mapping ({p3}, r4) will be followed.

Using this method it is possible to correctly disambiguate wildcard transitions for use in identifying submatches (by way of a conditional output set) and for identifying failure mappings (by way of a conditional failure set) without re-reading input characters as frequently. Indeed, in the above example, the number of characters read was the same as the total number of input characters.

Figure 28:
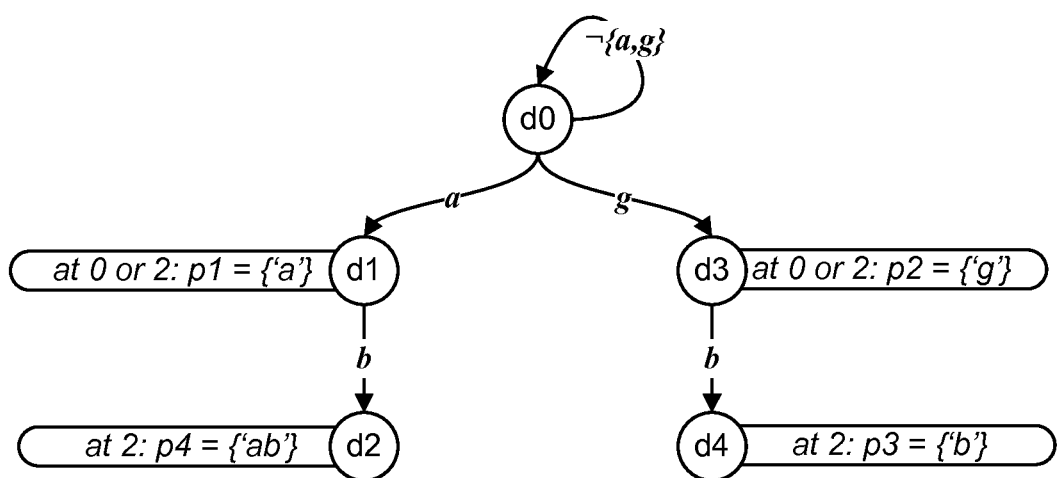
FIG. 28 illustrates an exemplary disambiguation automaton arising from the disambiguation dictionary generated for the pattern matching automaton of FIG. 27 in accordance with embodiments of the present disclosure.
Figure 27:
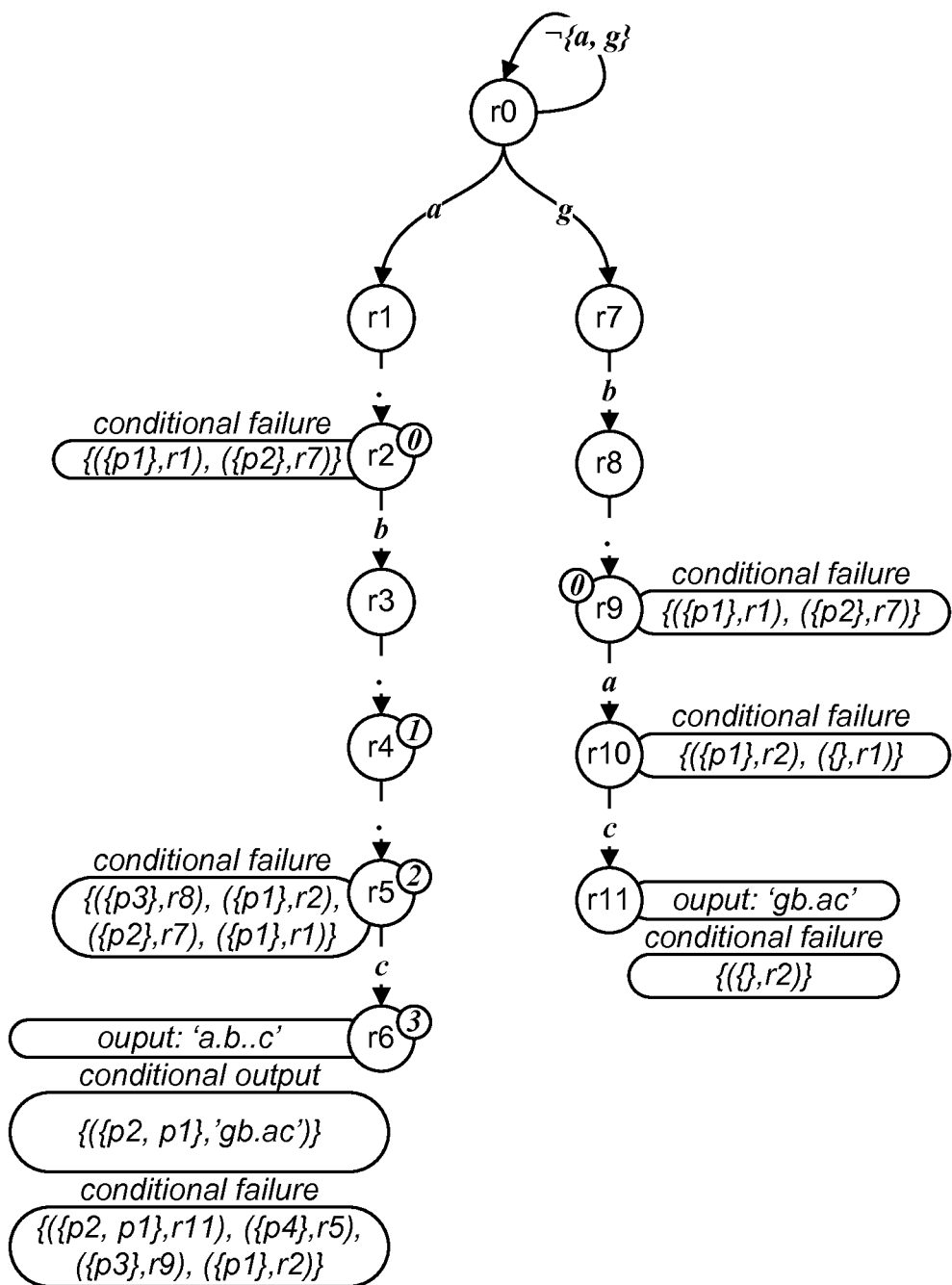
FIG. 27 illustrates a pattern matching automaton for symbol patterns "g.b..c" and "gb.ac" in accordance with an embodiment of the present disclosure.

By way of further example, FIG. 27 illustrates a pattern matching automaton for symbol patterns "g.b..c" and "gb.ac" in accordance with an embodiment of the present disclosure. Further, FIG. 28 illustrates an exemplary disambiguation automaton arising from the disambiguation dictionary generated for the pattern matching automaton of FIG. 27 in accordance with embodiments of the present disclosure. Notably, conditional failure sets and conditional output sets are also added to the pattern matching automaton of FIG. 27.

The automata of FIGS. 27 and 28 will now be considered, in summary, for the input symbol sequence "agbxac". The first symbol "a" causes the pattern matching automaton to progress to state r1. The disambiguation automaton does not progress since there is no wildcard transition between r0 and r1. The second symbol "g" causes the pattern matching automaton to progress to state r2, wildcard state reference 0. The disambiguation automaton progresses to state d3 and matches pattern p2 (='g') since the wildcard state reference (0) is listed for state d3. The third symbol "b" causes the pattern matching automaton to progress to state r3 and there is no failure in the transition so the conditional failure set of state r2 need not be consulted. The disambiguation automaton does not progress since there is no wildcard transition between r2 and r3. The fourth symbol "x" causes the pattern matching automaton to progress to state r4, wildcard state reference 1. The disambiguation automaton fails to transition from state d3 in view of the input symbol "x" and follows the (implied Aho-Corasick) failure state to d0, from which it transitions via the looped transition to d0 (i.e. the disambiguation automaton stays at state d0). The fifth symbol "a" causes the pattern matching automaton to progress to state r5, wildcard state reference 2. The disambiguation automaton progresses to state d1 and matches pattern p1 (='a') since the wildcard state reference (2) is listed for state d1. So far the disambiguation automaton has matched pattern p2 and pattern p1. The sixth symbol "c" causes the pattern matching automaton to progress to state r6. The disambiguation automaton does not progress because the transition from r5 to r6 is not a wildcard transition. State r6 includes an output function and the pattern matching automaton outputs "a.b..c" as a match in the input string. Further, state r6 includes conditional output set including a single conditional output mapping ({p2, p1}, 'gb.ac'), This conditional output mapping requires that the disambiguation automaton matched patterns p2 and p1. This is the case in the current execution of the pattern matching machine and so the conditional output mapping is occasioned. Accordingly, the conditional output mapping is satisfied and results in the generation of a further output from the pattern matching automaton of "gb.ac".

By way of illustration it is also interesting to note that state r6 also includes conditional failure set including a first conditional failure mapping ({p2, p1}, r11). This conditional failure mapping is also occasioned since the disambiguation automaton matched p2 and p1. Consequently, for any subsequent input symbols received by the pattern matching automaton a failure transition will be made to state r11. In practice, state r11 itself has no transitions and so any future symbol received will fail at state r11 also. However, state r11 includes a conditional failure mapping ({ },r2) (i.e. having no disambiguation pattern requirements indicated by the empty set { } and therefore essentially constituting an unconditional failure mapping). Thus, any further input symbol received at state r11 will result in a failure transition (with no disambiguation pattern conditions) to state r2.

Figure 29:
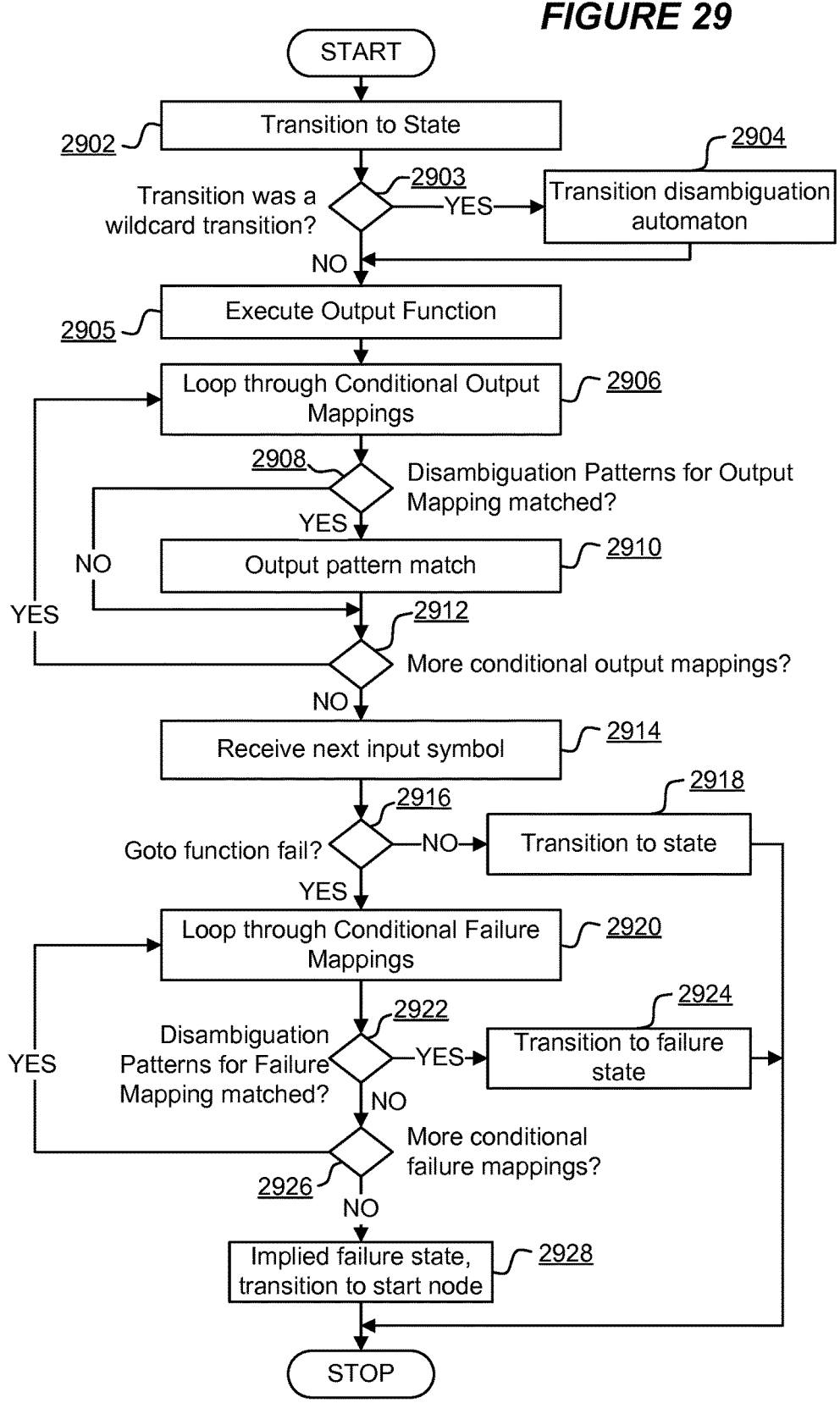
FIG. 29 is a flowchart of a method for traversing a state in a pattern matching automaton in accordance with embodiments of the present disclosure.

FIG. 29 is a flowchart of a method for traversing a state in a pattern matching automaton in accordance with embodiments of the present disclosure. The method of FIG. 29 covers the process from transitioning to a state in a pattern matching automaton to transitioning from the state. Initially, at 2902, the automaton transitions to the state. At 2903 the method determines if the transition to the state corresponds to a wildcard transition. Where the transition corresponds to a wildcard transition the method proceeds to transition the disambiguation automaton at 2904, substantially as hereinbefore described. At 2905 the method executes any output function of the state so as to output any pattern symbol matches corresponding to the state. Such output matches are unconditional and associated with the state, such as a state occurring at the end of a series of states corresponding to a pattern symbol sequence. At 2906 the method initiates a loop through a set of conditional output mappings (conditional_output_set). Notably, the conditional output set may be an empty set in which case 2906 to 2912 can be skipped. At 2908 the method determines if a set of one or more disambiguation patterns for a current conditional output mapping have been matched by the disambiguation automaton (such matches taking into account wildcard state references). Where the disambiguation patterns have been matched a conditional output mapping is satisfied and the method outputs a pattern match in accordance with the conditional output mapping at 210. The method reiterates at 2912 through all conditional output mappings in the set. At 2914 the automaton receives a next symbol in the input symbol sequence. At 2916 the method determines if the goto function is able to traverse to a new state on the basis of the newly received input symbol. Where such traversal is possible (due to a transition existing from the current state for the input symbol) the method undertakes such transition at 2918 and the method for the current state ends. Where the goto function returns fail at 2916, the method initiates a loop through a set of conditional failure mappings (conditional_failure_set) at 2920. Notably, the conditional failure set may be an empty set in which case 2920 to 2926 can be skipped. At 2922 the method determines if a set of one or more disambiguation patterns for a current conditional failure mapping have been matched by the disambiguation automaton (such matches taking into account wildcard state references). Where the disambiguation patterns have been matched a conditional failure mapping is satisfied and the method transitions to a failure state indicated for the satisfied conditional failure mapping at 2924, following which the method for the current state ends. Alternatively, the method reiterates at 2926 through all conditional failure mappings in the set. At 2928, in the absence of any applicable conditional failure mapping, the automaton transitions to the start state of the automaton as an implied failure state (in accordance with the Aho-Corasick approach) and the method for the current state ends.

One challenge when undertaking the methods described above to transition a pattern matching automaton and a disambiguation automaton is to record matches found by the disambiguation automaton that are relevant to a particular symbol pattern of the pattern matching automaton. If the pattern matching automaton transitions from one 'branch' of the state graph to another 'branch' due to a failure mapping (which shall be referred to as a 'failure state transition' in which a failure mapping is followed as distinct from a regular state transition in which a defined transition between states in the pattern matching automaton is followed), then any disambiguation pattern matches identified by the disambiguation automaton prior to the failure state transition are no longer valid for states in the pattern matching automaton arising after the failure state transition. To address this challenge, embodiments of the present disclosure include a concept of a "disambiguation result session" to identify a traversal of a branch of a pattern matching automaton such that disambiguation pattern matches identified by the disambiguation automaton can be recorded with reference to a session identifier to uniquely (or substantially uniquely) identify the traversal of the pattern matching automaton along a branch of the automaton. Accordingly, by using such a session identifier it is possible to generate an record of disambiguation patterns identified by the disambiguation automaton and being relevant to a current pattern matching automaton session.

A single disambiguation results session can be defined as starting when either:

1. A first state transition for a first input character is followed in a pattern matching automaton; or
2. A state is reached in the pattern matching automaton as a result of following a failure state mapping (or a series of failure state mappings in immediate succession).

A single disambiguation results session can be defined as ending when a failure state mapping is followed. A session can be identified by a numeric identifier that increments when a new session begins.

Thus, traversal of the disambiguation automaton and the recording of matches of disambiguation patterns must be associated with a current session identifier. Subsequently, when conditional output and failure mappings for states in the pattern matching automaton are used to identify output symbol patterns and/or failure states, the disambiguation pattern criteria of such conditional mappings are checked against an historical record of disambiguation patterns matched by the disambiguation automaton. Specifically, for each record of a matched disambiguation pattern in the historical record, a session identifier is compared with a current session identifier and only matches made within the current session are employed.

Such an approach implies a need to refer to historical disambiguation pattern matches, and so involves a method of non-linear time complexity. In one embodiment an efficient approach to such verifying historical disambiguation pattern matches is provided that can operate in constant time. To achieve such constant time verification, an array data structure is created with an entry for each disambiguation pattern in the disambiguation dictionary and a session identifier for each disambiguation pattern. Subsequently, when the disambiguation automaton matches a disambiguation pattern, a session identifier is updated in the array for the matched disambiguation pattern. Accordingly, when it is necessary to verify a set of disambiguation patterns for a conditional mapping a method can determine if the set of disambiguation patterns have associated the current session identifier in the array. In this way the satisfaction of a set of disambiguation patterns for a conditional mapping and the verification that the patterns were matched in a current session can be achieved in constant time.

Further, a list or array of disambiguation pattern matches could be implemented by adding each disambiguation pattern to a list or dynamic array as they are found. This may be more space efficient in most cases as only the memory required to store the disambiguation patterns matched, rather than results from every possible pattern, would need to be allocated. However, in order to query for a particular disambiguation pattern the list would need to be traversed until either an entry containing the required pattern is located (and its position in the list would depend on the order in which it was found), or the end of the list is reached.

Figure 30:
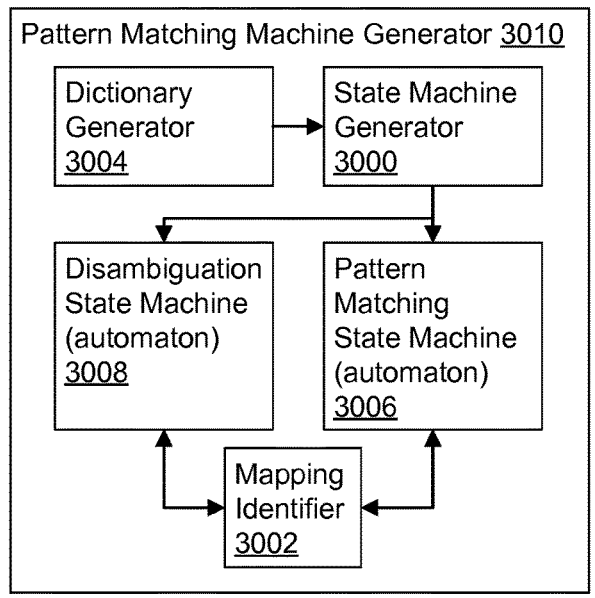
FIG. 30 illustrates an exemplary arrangement of components for generating a pattern matching machine in accordance with embodiments of the present disclosure.

FIG. 30 illustrates an exemplary arrangement of components for generating a pattern matching machine in accordance with embodiments of the present disclosure. A pattern matching machine generator 3010 is a hardware or software component for generating a pattern matching machine for identifying matches of a plurality of symbol patterns in a sequence of input symbols. The pattern matching machine generator 3010 includes a state machine generator 3000 as a hardware or software component arranged to generate a pattern matching state machine 3006 as a pattern matching automaton and a disambiguation state machine 3008 as a disambiguation automaton. The State machine generator 3000 generates the disambiguation state machine 3008 on the basis of a disambiguation dictionary generated by a dictionary generator 3004. The dictionary generator 3004 is a hardware or software component such as a component arranged to perform the Generate_Disam_Dictionary function of Algorithm 6. The pattern matching machine further includes a mapping identifier 3002 as a hardware or software component arranged to identify one or more mappings between states of the pattern matching state machine 3006 such that a state representing a sequence of symbols is mapped to other states constituting a proper suffix of the sequence of symbols. Mappings for states representing a sequence of symbols including wildcard symbols include conditional mappings based on input symbols to be received, by the pattern matching state machine in use, to constitute the wildcard symbols.

The method of FIG. 29 includes considerable inefficiencies in the iterations of 2906 and 2920 which loop through conditional mappings. Further, the tests at 2908 and 2922, where disambiguation patterns matched by the disambiguation automaton are tested, can similarly involve iterative (and potentially repetitious) processes to determine if all disambiguation patterns for a conditional mapping are matched by the disambiguation automaton. For symbol patterns having large number of wildcards, such as patterns with iterations of wildcard metacharacters, the processing required to undertake these iterations and tests will grow considerably and will present an unacceptable burden at a match time of the pattern matching machine.

In one embodiment this problem is alleviated by providing a prediction of whether a condition of at least one of a set of conditional mappings will be satisfied, such predication being based on a count, for each state in the disambiguation dictionary, of a minimum number of disambiguation patterns that must be matched for any conditional mapping to be satisfied. For simple patterns, as described by way of example hereinbefore, such a minimum number will often be one, for a single disambiguation pattern. However, where pattern symbol sequences are sought having potentially many wildcard metacharacters interspersed with literals characters, a minimum number of disambiguation patterns can be greater than one and can used to predict whether any of a set of conditional mappings for a state will be satisfied. To achieve this, at runtime of a pattern matching machine, a number of disambiguation patterns matched by the disambiguation automaton for a current session can be maintained. Then a comparison of the number of matched disambiguation patterns can be made with a minimum number of matched disambiguation patterns for a state in the pattern matching automaton before a process embarks on verifying the satisfaction of conditions for conditional mappings. In this way the verification process can be avoided where a number of matches by the disambiguation automaton falls short of a minimum required number, so avoiding unneccesary checking of conditions associated with conditional mappings (whether output mappings or failure mappings).

Figure 31:
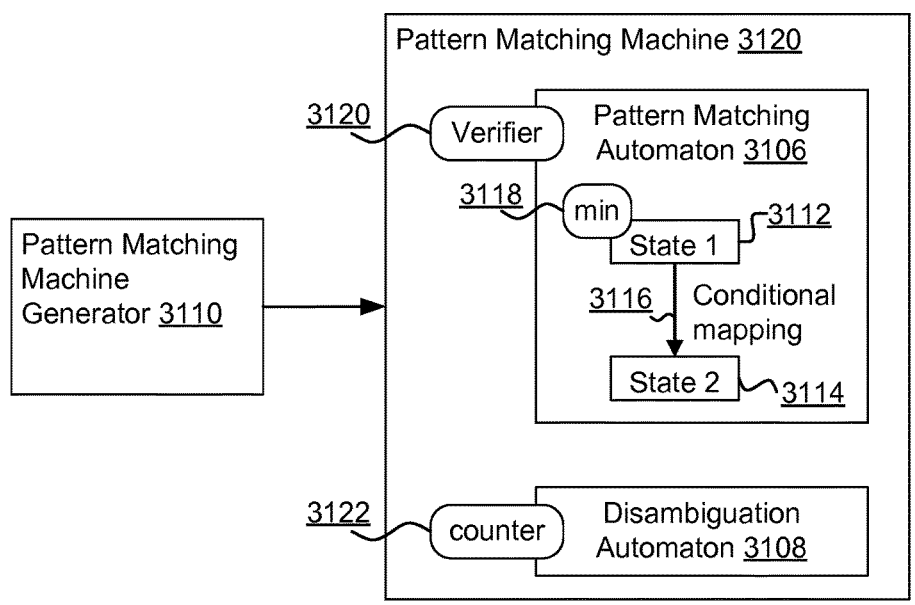
FIG. 31 illustrates an exemplary arrangement of a pattern matching machine in accordance with embodiments of the present disclosure.

FIG. 31 illustrates an exemplary arrangement of a pattern matching machine 3120 in accordance with embodiments of the present disclosure. A pattern matching machine generator 3110 is arranged to generate a pattern matching machine 3120 having a pattern matching automaton 3106 and a disambiguation automaton 3108 substantially as hereinbefore described. The pattern matching automaton 3106 includes a first state, state 1 3112, mapped to a second state, state 2 3114, by way of a conditional mapping 3116. For example, the conditional mapping is a conditional output mapping or a conditional failure mapping. Thus it will be appreciated that the relationship between the two states 3112, 3114 is not formed by normal transitions between states in the pattern matching automaton 3106 but is rather formed by way of conditional mappings such as are described in detail above. As such, when occasioned by the pattern matching automaton 3106, the conditional mapping 3116 is used to determine if a mapping between the first state 3112 and the second state 3114 is appropriate (such as a mapping to indicate a pattern symbol match for a pattern symbol constituting a suffix of a pattern symbol sequence represented by the first state, and the like). Thus it is necessary to verify, by a verifier 3120, one or more conditions associated with the conditional mapping 3116. Such conditions can include a number of disambiguation patterns matched by the disambiguation automaton 3108, for example. This verification can be costly since it can involve testing multiple conditions such as may be associated with conditional mapping 3116 for multiple conditional mappings (not shown). Thus, according to the embodiment of FIG. 31 the pattern matching machine generator 3110 is adapted to associate a minimum 3118 number of disambiguation patterns required to be matched by the disambiguation automaton 3108 in order to satisfy the condition of the conditional mapping 3116. Further, the pattern matching machine generator 3110 is adapted to associate a counter 3122 component, such as a counter software method, function or routine, with the disambiguation automaton 3108 to count a number of patterns matched by the disambiguation automaton 3108. Specifically, the number of patterns counted by the disambiguation automaton 3108 is a number of patterns for a current pattern matching session of the pattern matching machine, as hereinbefore described. The verifier 3120 is arranged to undertake the verification of the conditional mapping 3116 in response to the count of the counter 3122 such that the verification is only undertaken when the counter 3122 indicates that a number of disambiguation patterns matched by the disambiguation automaton 3108 meets or exceeds a minimum 3118 number required for the conditional mapping. In this way the iterative verification of conditional mappings between states in the pattern matching automaton 3106 can be reduced such that verification only takes place when the count of the counter 3122 of the disambiguation automaton 3108 satisfies the minimum 3118 requirement.

Even where the need to verify conditional mappings between states in the pattern matching automaton is responsive to the counter 3122, a number of conditions checked iteratively at 2906 and 2920 (FIG. 29) can still be large where a large number of wildcard symbols are included in symbol patterns represented by the pattern matching automaton. In one embodiment the disambiguation patterns required for satisfaction of conditional mappings for a pattern matching automaton state are represented in a tree data structure associated with the state. That is to say that a set of all disambiguation patterns required for all conditional mappings for a pattern matching automaton state are modeled or encoded in a condition tree data structure such that each pattern is represented as a node in the data structure in sequences representing multiple patterns required in individual conditional mappings.

Consider, for example, the consolidated pattern matching machine of FIG. 23a. The node r4' of FIG. 23a includes three conditional output mappings 2392, 2394 and 2396 resulting from the consolidation of the pattern matching automaton on the left of FIG. 23a. Notably, the automaton on the right of FIG. 23a is not complete in the sense that conditional failure mappings have not been determined and added to the automaton by the processing of algorithms and methods described above, but the automaton of FIG. 23a is nonetheless used in this simplified form for clarity. Thus, conditional mapping 2392 requires, for satisfaction of the condition, that an input symbol at wildcard position 1 ('wc1') has a value "f". Accordingly, a dictionary of disambiguation patterns can be generated from the guard stacks of the conditional mappings for state r4' as follows:

condition 2392 "wc1=f" results in disambiguation pattern "f" (pattern p1) at wildcard position 0;
condition 2394 "wc0=a & wc1=f" results in disambiguation pattern "af" (pattern p2) at wildcard position 1;
condition 2396 "wc0=a & wc2=b" results in disambiguation pattern "a" (pattern p3) at wildcard position 0 and disambiguation pattern "b" (pattern p4) at wildcard position 2.

Figure 34:
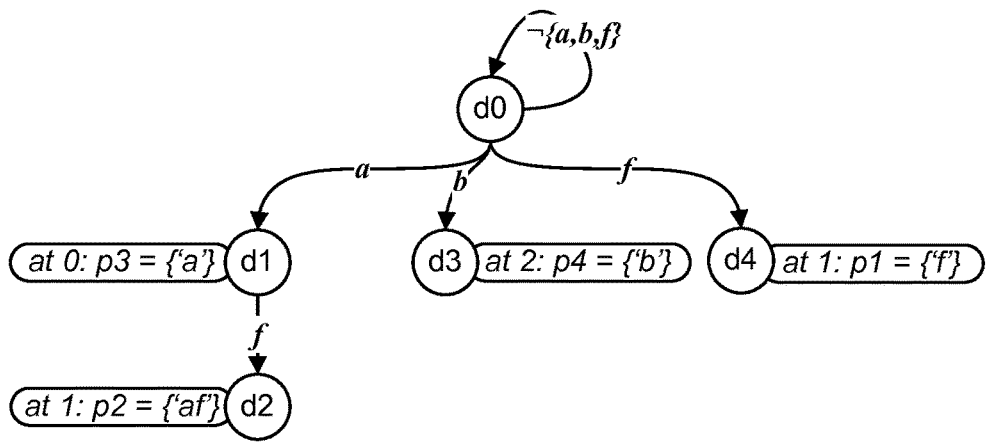
FIG. 34 illustrates a disambiguation automaton for a dictionary of disambiguation patterns derived from the conditional mappings of FIG. 23a in accordance with embodiments of the present disclosure.

FIG. 34 illustrates a disambiguation automaton for a dictionary of disambiguation patterns derived from the conditional mappings of FIG. 23a in accordance with embodiments of the present disclosure. Thus, conditional output mappings for state r4' of FIG. 23a can be expressed as:

{({p1}, "g.f."), ({p2}, "gaf"), ({p3, p4}, "ga.b")}

That is to say that, at state r4' of the pattern matching automaton of FIG. 23a, identification, by the disambiguation automaton of FIG. 34, of pattern p1 (occurring only at state d4 of the automaton and only if state d4 is reached for wildcard transition 1, being the wildcard transition from state r2' to r3') will result in the output symbol pattern "g.f.". Further, identification, by the disambiguation automaton of FIG. 34, of pattern p2 (occurring only at state d2 of the automaton and only if state d2 is reached for wildcard transition 1, being the wildcard transition from state r2' to r3') will result in the output symbol pattern "gar". Further, identification, by the disambiguation automaton of FIG. 34, of pattern p4 (occurring only at state d3 of the automaton and only if state d3 is reached for wildcard transition 2, being the wildcard transition from state r3' to r4') will result in the output symbol pattern "ga.b".

In accordance with an embodiment of the present disclosure these conditions will now be encoded in a tree data structure for association with the node r4' such that identification of satisfaction of these conditions can be more efficiently determined without iteration through each condition. It will be appreciated that such efficiency provided by the tree data structure is more readily apparent and advantageous for larger numbers of wildcard transitions in a pattern matching automaton, though the approach is described here for the automaton illustrated at the right of FIG. 23a for the purpose of demonstration.

Prior to insertion of the conditional mappings into a tree, the disambiguation patterns in a set of all disambiguation patterns for all conditions for the node r4' must be sorted in order of the position in which the pattern will be identified by the disambiguation automaton at match time. The set of all disambiguation patterns is {p1, p2, p3, p4}. Referring to the disambiguation dictionary it can be seen that: p1 must occur at wildcard position 1 (which can be expressed as p1@1); p2 must occur at wildcard position 1 (expressed as p2@1); p3 must occur at wildcard position 0 (expressed as p3@0); and p4 must occur at wildcard position 2 (expressed as p4@2). Thus a sorted set of disambiguation patterns is {p3, p2, p1, p4}.

Figure 35:
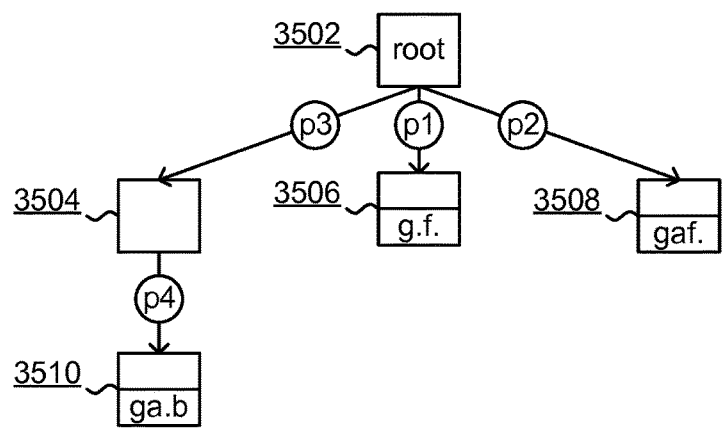
FIG. 35 illustrates a tree data structure encoding mapping conditions for state r4' of FIG. 23a in accordance with embodiments of the present disclosure.

Subsequently, the sorted set of disambiguation patterns is used to generate a tree data structure. FIG. 35 illustrates a tree data structure encoding mapping conditions (a "condition tree data structure") for state r4' of FIG. 23a. The tree data structure encodes sequences of disambiguation patterns and, where appropriate, output symbol sequences to be generated at the end of a sequence of disambiguation patterns. Thus, the conditional output 2396 of FIG. 23a is encoded in the tree data structure as sequence of nodes 3502 to 3504 to 3510 corresponding to patterns p3 ("a" occurring at wildcard position 0) and p4 ("b" occurring at wildcard position 2) and generating symbol sequence output "ga.b". Similarly, the conditional output 2394 of FIG. 23a is encoded in the tree data structure as sequence of nodes 3502 to 3508 corresponding to pattern p2 ("af" occurring at wildcard position 1) and generating symbol sequence output "gaf.". Further, the conditional output 2392 of FIG. 23a is encoded in the tree data structure as sequence of nodes 3502 to 3506 corresponding to pattern p1 ("f" occurring at wildcard position 1) and generating symbol sequence output "g.f". In use at a matching time of the pattern matching machine of FIG. 23a the tree data structure of FIG. 35 is used to identify conditional output mappings based on disambiguation patterns matched by the disambiguation automaton of FIG. 34. The tree data structure is traversed in a parent-to-child manner only, as a regular tree based on disambiguation patterns matched by the disambiguation automaton. Notably, the tree data structure is not an automaton and there can be no failure transitions or the like: a tree data structure encoding conditional mappings is traversed when the pattern matching automaton arrives at a state having a tree data structure, and the tree is traversed on the basis of all disambiguation patterns matched by the disambiguation automaton (preferably within a current matching session, as hereinbefore described) in the order in which such patterns are matched. Where traversal of the tree fails at a node of the tree (i.e. a current node of the tree during traversal of the tree cannot transition to a child node due to the absence of a child node matching a next matched disambiguation pattern in a list or sorted set of matched disambiguation patterns), then traversal of the tree terminates. Such traversal has no such facility as failure mappings or the like.

In one embodiment, disambiguation patterns matched by the disambiguation automaton are recorded in a table, array or similar, preferably in association with a session identifier as previously described. The order of the patterns matched by the disambiguation automaton for a particular session will be aligned with the order of the patterns used to generate the table data structure of FIG. 35 (such patterns being sorted as described above). Accordingly the pattern matching machine of FIG. 23a in state r4' can test the conditions associated with the conditional output mappings for state r4' by traversing the tree data structure of FIG. 35 based on the disambiguation patterns matched by the disambiguation automaton for a current session in the order that they were matched. Where output symbol sequences are identified in a node of the tree data structure during traversal thereof, such output symbol sequences are output by the pattern matching machine. Thus, the table data structure provides an efficient mechanism for testing occasioned conditions for conditional output mappings of the pattern matching machine that does not involve iterating through all such conditions (even when such iteration is occasioned by a prediction technique as hereinbefore described). Notably, while the table data structure is used to encode conditions associated with conditional output mappings for a pattern matching automaton, such a table data structure can be equally applicable for encoding conditions associated with conditional failure mappings also.

Consider, for example, the input symbol sequence "gadb" received by the pattern matching machine of the right side of FIG. 23a. He input sequence would result in arrival at state r4' with disambiguation patterns p3 and p4 being identified by the disambiguation automaton. Accordingly, at state r4' the tree data structure will be traversed from the rood node 3502 to node 3504 in accordance with pattern p3 matched by the disambiguation automaton, then from node 3504 to node 3510 matched in accordance with pattern p4 matched by the disambiguation automaton. At note 3510 the tree data structure indicates output symbol sequence "ga.b" for the pattern matching machine. In this way the conditional output mapping 2396 is encoded in the tree data structure and is identified much more quickly without a need to iterate through all conditional mappings associated with the node r4'.

Notably, the tree data structure of FIG. 35 is only partially complete and requires adjustment for completeness since there are situations (input symbol sequences) for which the tree data structure of FIG. 35 is unable to correctly identify all applicable conditional mappings. For example, where the pattern matching automaton receives the input symbol sequence "gafd", the disambiguation automaton of FIG. 34 would identify the disambiguation patterns: p3 (pattern "a" at wildcard position 0); p1 (pattern "f" at wildcard position 1); and p2 (pattern "af" at wildcard position 1). Considering now the pattern matching automaton of FIG. 23a, the pattern matching automaton in state r4' undertaking to traverse the tree data structure of FIG. 35 to identify applicable conditional mappings would transition as follows: initially, starting at the root node 3502, the first matched disambiguation pattern p3 causes the tree to traverse to node 3504; the next matched disambiguation pattern p1 cannot result in a further traversal of the tree since there is no child node having a transition for pattern p1 from node 3504. Thus the tree traversal ceases at this point. Thus the pattern matching automaton incorrectly fails to identify any matches for the input string "gafd". This is because the tree data structure of FIG. 35 fails to take account of the fact that unrelated disambiguation patterns occurring at different wildcard positions in the pattern matching automaton may be interleaved.

Figure 36:
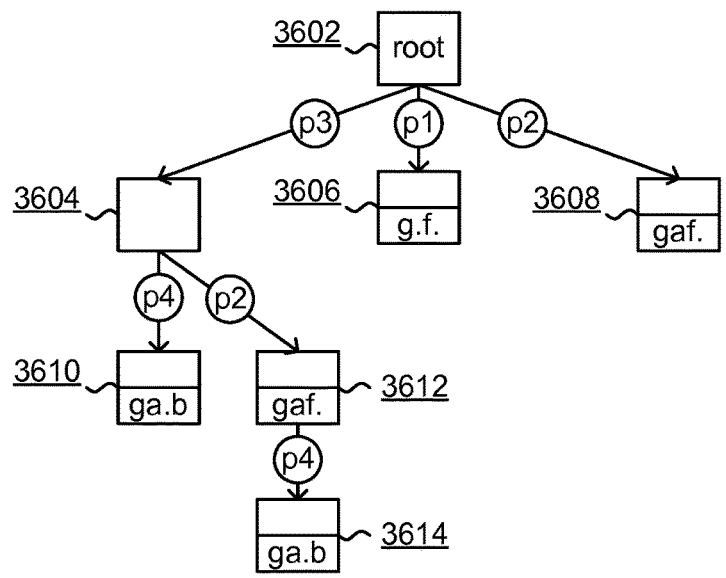
FIG. 36 illustrates a tree data structure encoding mapping conditions for state r4' of FIG. 23a being modified to account for interleaving of disambiguation patterns in accordance with embodiments of the present disclosure.

Thus the tree data structure of FIG. 35 requires modification. In particular, where a first disambiguation pattern occurring in the tree data structure that must be identified by the disambiguation automaton at a particular wildcard position n, where the tree data structure also includes one or more other disambiguation patterns that must be identified by the disambiguation automaton at wildcard positions <n, the first disambiguation pattern must be represented in the tree as a descendant (e.g. child) of nodes representing such other disambiguation patterns associated with lower (<n) positions. Accordingly, FIG. 36 illustrates a tree data structure encoding mapping conditions for state r4' of FIG. 23a being modified to account for interleaving of disambiguation patterns in accordance with embodiments of the present disclosure. Notably, the disambiguation pattern P2 is represented by node 3612 and the disambiguation matches identified by the disambiguation automaton can be correctly used to disambiguate input symbols corresponding to wildcards regardless of which disambiguation patterns match.

Note that, in the tree data structure of FIG. 36, there could additionally be a transition for disambiguation pattern p1 from node 3604 though such a transition would be redundant in view of the fact that it would never be followed due to the disambiguation patterns associated with node 3612 being equivalent. In this instance, the pattern matching results of the pattern matching automaton that would have been identified by node 3608 are instead identified by node 3612.

In the same way that branches within a pattern matching automaton may be subsets of other branches in the same automaton, and thus output functions within such subset branches must be replicated in their superset branches, tree data structure branches for a state in the pattern matching automaton may also be subsets of other tree data structure branches of the state. Thus, any conditional output (or failure) mapping associated with such a subset branch must also be associated with superset branches.

It can be desirable to define pattern symbol search sequences such as regular expressions to match a range of symbols. For example, the symbol sequence "[a-f]" matches all characters from "a" to "f". This can be known as a symbol class. Such functionality can be supported using alternation. For example, the symbol pattern "[a-f]" is equivalent to "a|b|c|d|e|f". However, this is impractically space inefficient due to state explosion caused by the 'power of n' problem. For example, the following regular expression matches 10 lower-case alphabetical characters in sequence:

[a-z][a-z][a-z][a-z][a-z][a-z][a-z][a-z][a-z][a-z]

Expanding this expression using alternation syntax results in an automaton with over 140 trillion states ($26^{10}$=141,167,095,653,376). One approach to addressing this problem is to represent symbol classes with specialized states that have associated with them low and high integers denoting the range of character values that can cause a transition to them to be followed. Such specialized states are herein referred to as 'ranged wildcards'. Implementing ranged wildcards in a pattern matching machine that uses a disambiguation automaton is complex because any trivial implementation would simply transfer the 'power of n' problem to the disambiguation automaton. For example, a disambiguation automaton required for the symbol patterns " . . . xyz" and "[a-z][a-z][a-z][a-z]" would contain $26^4$=456,976 states, since the disambiguation automaton is required to identify all combinations of [a-z] for each wildcard transition in the pattern matching automaton and, for each combination, all combination of [a-z] for each subsequent wildcard transition and so on.

In embodiments of the present disclosure, where one or more states after ranged wildcard transitions are siblings with one or more states after non-ranged wildcard transitions, the absolute complement of the symbol set matched by the ranged wildcard transitions (determined based on the entire symbol alphabet) is used to replace the states following wildcard transitions with one or more new states following new ranged wildcard transitions. The descendant states of the original wildcard states are then copied to follow the new ranged wildcard states' other ranged wildcard siblings.

Figure 32:
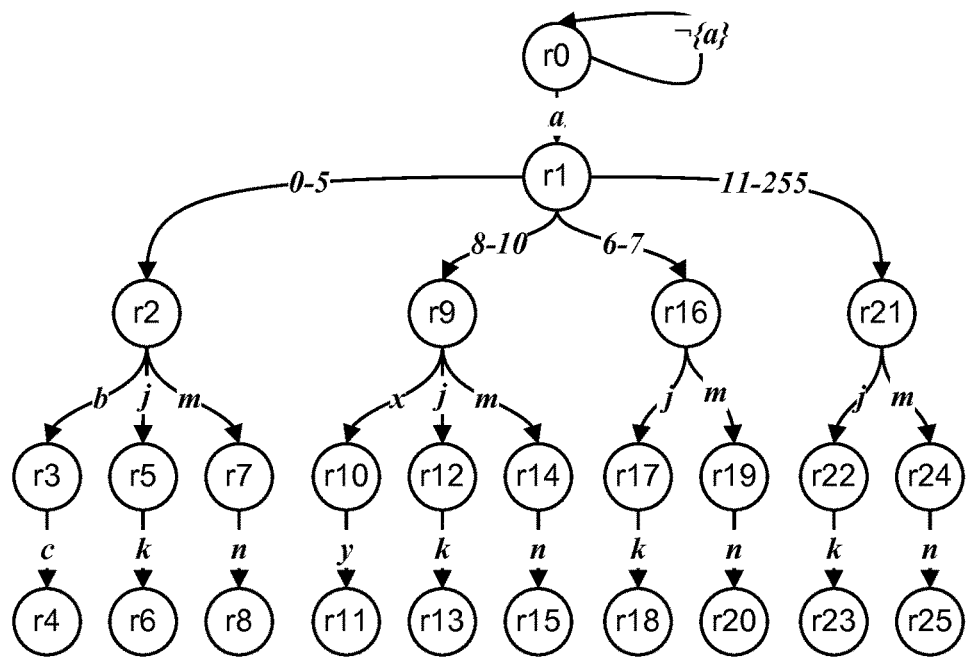
FIG. 32 is a pattern matching automaton for the symbol patterns "a[0-5]bc", "a.mn", "a[8-10]xy" and "a.jk" generated using techniques in accordance with embodiments of the present disclosure.

FIG. 32 is a pattern matching automaton for the symbol patterns "a[0-5]bc", "a.mn", "a[8-10]xy" and "a.jk" generated using techniques in accordance with embodiments of the present disclosure. The absolute complement of the symbol values matched by the ranged wildcard states is "[6-7]" and "[11-255]". The two non-ranged wildcards are thus replaced by two ranged wildcards representing these character values, with transitions to states r16 and r21 respectively. All states within the sub-graphs for the symbol patterns containing wildcards ("a.mn" and "a.jk") are replicated underneath both the new states (r16 and r21) and also underneath the states for the existing ranged wildcard transitions (r2 and r9). The resulting automaton thus has the following properties:

1. There is no ambiguity as to which state to transition to from state r1 as there is no wildcard transition.
2. The ranged wildcard transitions following state r1 represent symbol values that span the entire range of possible character values.
3. All states representing matches for the expressions containing wildcards are reachable regardless of the transition taken from state r1.
4. No disambiguation is required to identify any matches.

Notably, to reduce storage space requirements, it is also possible to merge states r16 and r21 as long as ranged wildcard transitions could be associated with multiple symbol value ranges. This would incur a matching time cost as iteration over the set of ranges would be required to determine a correct transition to follow.

Notably, if one or more states following ranged wildcard transitions are siblings with one or more other states following other ranged wildcard transitions and the symbol values associated with these transitions intersect, additional ranged wildcard transitions (and associated states) are created to represent the intersections and have the descendants of all ranged wildcard states associated with the applicable symbols copied under them.

Figure 33:
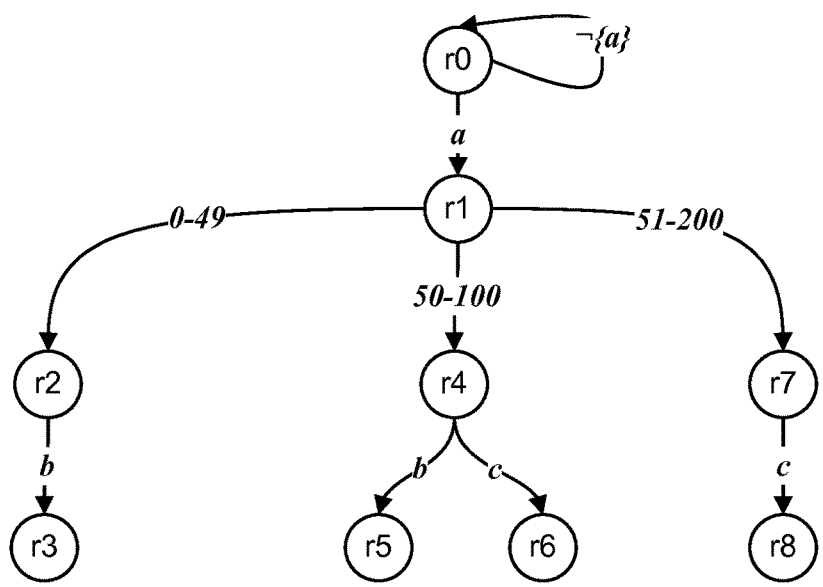
FIG. 33 is a pattern matching automaton for the symbol patterns "a[0-100]b" and "a[50-200]c" generated using techniques in accordance with embodiments of the present disclosure.

FIG. 33 is a pattern matching automaton for the symbol patterns "a[0-100]b" and "a[50-200]c" generated using techniques in accordance with embodiments of the present disclosure. It can be seen that state r4 and transition to state r4 for symbols "[50-100]" have been created to correspond to the intersection between the symbol patterns, with all subsequent states and transitions for the first symbol pattern (transition for symbol "b") and the second symbol pattern (transition for symbol "c") copied under the new state r4.

Ranged wildcards need to be disambiguated for use in identifying possible matches and selecting possible state mappings in the same way that non-ranged wildcards do. When identifying conditional output mappings for a symbol pattern with ranged wildcards within a pattern matching automaton branch with non-ranged wildcard transitions or ranged wildcard transitions associated with a greater symbol range than a possible suffix symbol pattern, using the disambiguation automaton approach based on a disambiguation dictionary hereinbefore described can result in "state explosion" within the disambiguation automaton (i.e. a large number of states). For example, consider the symbol patterns:

1. "[a-d][a-d]x"
2. "kl..x"

In order to find pattern 1 within a state branch of a pattern matching automaton representing pattern 2 (of which pattern 1 is a subset), the following disambiguation dictionary would be necessary (only partially illustrated):

1. aa@1
2. ab@1
3. ac@1
4. ad@1
5. ba@1
6. bb@1
7. bc@1
8. bd@1
9. . . .

It is possible to disambiguate ranged wildcard states by building ranged wildcard lookup tables during the generation of the automata for a pattern matching machine. Each state following a ranged and non-ranged transition that has descendants which might need to disambiguate suffix patterns containing ranged wildcards at their position is associated with a "ranged wildcard lookup table". This lookup table can be made up of n lists of integers uniquely identifying each unique range used in the symbol patterns (where n is the maximum number of character values to be matched, for example 256).

During the build process, any state associated having a conditional mapping (conditional output mapping or conditional failure mapping) that requires ranged wildcards to be disambiguated has a list of required range IDs and associated required positions at which these range IDs are to be found (as offsets from a first wildcard state in the branch of the pattern matching automaton) associated with the possible match or suffix in question.

The pattern matching machine can maintain an array for ranged wildcard results of size $$r \times d$$

where r is the total number of unique ranges in the pattern matching machine symbol patterns and d is the deepest ranged or non-ranged wildcard offset requiring disambiguation of a ranged wildcard state in another branch.

During matching, when the pattern matching machine reaches a ranged or non-ranged wildcard that satisfies these criteria it uses a current input symbol as a key to the ranged wildcard lookup table. For each range in the resulting list, it records the range ID, position and session in the ranged wildcard result array as follows:

For each rangeId in rangeIdList:

rangedWildcardResult
        [rangeId*currentWildcardStateDepth+currentWildcardStateDepth]=currentDisamSessionId In this way range results are automatically invalidated when the session in which they are created ends. This ensures that irrelevant results are discarded after following failure state mappings to different branches of the pattern matching automaton (i.e. when a session identifier is modified).

When the matcher reaches a state associated with a possible match or possible suffix requiring a wildcard range result, it uses the ranged wildcard result lookup table to query the presence of a result for the required position and range ID from the current disambiguation session. If all required ranged results are present, and any required disambiguation results are present, the possible match is recorded or possible failure mapping is followed.

An alternative approach is also considered. By splitting the disambiguation patterns across symbol boundaries in the same way in which this is done across overlapping wildcards, the disambiguation automaton can be "flattened". The disambiguation dictionary for the symbol patterns 1 and 2 above would thus appear as follows:

1. a@0
2. a@1
3. b@0
4. b@1
5. c@0
6. c@1
7. d@0
8. d@1

The possible match entry for state "kl..x" corresponding to pattern 1 would then be associated with 2 sets of possible required disambiguation matches: either 1, 3, 5 or 7 and either 2, 4, 6 or 8.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to determine whether a verification is to be performed of the satisfaction of one or more mapping conditions mapping a first state in a first pattern matching automaton to a second state in the first automaton, the verification being based on patterns matched by a second pattern matching automaton having states corresponding to wildcard symbols in the first automaton, the method comprising:

associating, with the first state, a range of numbers of patterns required to be matched by the second automaton to satisfy a mapping condition of the state, the range defined by a minimum number or more of patterns and being specific to the first state;

providing a pattern match counter in association with the second automaton, the counter being arranged to count a number of patterns matched by the second automaton; and providing a verifier in association with the first automaton, the verifier being arranged to perform the verification, the verifier being responsive to the counter such that the verification of the mapping condition is only undertaken when the count of the counter is in the range of numbers of patterns specific to the first state.

2. The method of claim 1 wherein the first automaton has states and directed transitions between states, the directed transitions corresponding to symbols in a plurality of symbol patterns.

3. The method of claim 1 wherein the mapping conditions define when the first automaton should generate an output associated with a mapped state without transitioning to the mapped state.

4. The method of claim 1 wherein the mapping conditions define one or more failure states when the first automaton fails to transition via a directed transition based on an input symbol received by the first automaton.

5. The method of claim 1 wherein the first state represents a sequence of symbols including one or more wildcard symbols and the second state represents a proper suffix of the sequence of symbols of the first state, wherein the conditional mappings include conditions based on input symbols to be received, by the first automaton in use, to constitute the wildcard symbols.

6. The method of claim 1 wherein, in execution, the first and second automata are jointly associated with a session identifier to identify a pattern matching session, the session identifier being changed whenever the first automaton transitions states by way of a mapping between states.

7. A pattern matching machine generator including at least one processor and a memory operably coupled to the at least one processor and arranged to generate a first pattern matching automaton having one or more mapping conditions mapping a first state in a first automaton to a second state in the first automaton, the generator being further arranged to:
generate a second pattern matching automaton having states corresponding to wildcard symbols in the first automaton;
generate a verifier arranged to verify the satisfaction of the one or more mapping conditions;
associate, with the first state, a range of numbers of patterns required to be matched by the second automaton to satisfy a mapping condition of the state, the range defined by a minimum number or more of patterns and being specific to the first state; and
provide a pattern match counter in association with the second automaton, the counter being arranged to count a number of patterns matched by the second automaton, wherein the verifier is responsive to the counter such that the verification of the mapping condition is only undertaken when the count of the counter is in the range of numbers of patterns specific to the first state.

8. The pattern matching machine generator of claim 7 wherein the first automaton has states and directed transitions between states, the directed transitions corresponding to symbols in a plurality of symbol patterns.

9. The pattern matching machine generator of claim 7 wherein the mapping conditions define when the first automaton should generate an output associated with a mapped state without transitioning to the mapped state.

10. The pattern matching machine generator of claim 7 wherein the mapping conditions define one or more failure states when the first automaton fails to transition via a directed transition based on an input symbol received by the first automaton.

11. The pattern matching machine generator of claim 7 wherein the first state represents a sequence of symbols including one or more wildcard symbols and the second state represents a proper suffix of the sequence of symbols of the first state, wherein the conditional mappings include conditions based on input symbols to be received, by the first automaton in use, to constitute the wildcard symbols.

12. The pattern matching machine generator of claim 7 wherein, in execution, the first and second automata are jointly associated with a session identifier to identify a pattern matching session, the session identifier being changed whenever the first automaton transitions states by way of a mapping between states.

13. A non-transitory computer-readable storage medium storing a computer program element comprising computer program code which, when loaded into a computer system and executed thereon, causes the computer to perform the method as claimed in claim 1.

* * * * *